(12) United States Patent
Ausubel et al.

(10) Patent No.: US 8,566,211 B2
(45) Date of Patent: Oct. 22, 2013

(54) SYSTEM AND METHOD FOR A DYNAMIC AUCTION WITH PACKAGE BIDDING

(75) Inventors: Lawrence M. Ausubel, Washington, DC (US); Paul R. Milgrom, Stanford, CA (US)

(73) Assignee: Efficient Auctions, LLC, Washington, DC (US)

(*) Notice: Subject to any disclaimer, the term of this patent is extended or adjusted under 35 U.S.C. 154(b) by 2700 days.

(21) Appl. No.: 10/432,250

(22) PCT Filed: Nov. 23, 2001

(86) PCT No.: PCT/US01/43838
§ 371 (c)(1),
(2), (4) Date: May 22, 2003

(87) PCT Pub. No.: WO02/42981
PCT Pub. Date: May 30, 2002

(65) Prior Publication Data
US 2004/0054551 A1   Mar. 18, 2004

Related U.S. Application Data

(60) Provisional application No. 60/252,718, filed on Nov. 22, 2000, provisional application No. 60/322,649, filed on Sep. 12, 2001, provisional application No. 60/330,672, filed on Oct. 26, 2001.

(51) Int. Cl.
*G06Q 40/00* (2012.01)
(52) U.S. Cl.
USPC .................. 705/37; 705/14.51; 705/14.71

(58) Field of Classification Search
USPC ...................... 705/14.51, 14.71, 37
See application file for complete search history.

(56) References Cited

U.S. PATENT DOCUMENTS

| | | | |
|---|---|---|---|
| 5,689,652 A | 11/1997 | Lupien et al. | |
| 5,727,165 A | 3/1998 | Ordish et al. | |
| 5,924,083 A | 7/1999 | Silverman | |
| 6,012,045 A | 1/2000 | Barzilai et al. | |
| 6,023,685 A | 2/2000 | Brett et al. | |
| 6,023,686 A * | 2/2000 | Brown | 705/37 |
| 6,408,283 B1 * | 6/2002 | Alaia et al. | 705/37 |
| 6,415,270 B1 * | 7/2002 | Rackson et al. | 705/36 R |
| 6,718,312 B1 * | 4/2004 | McAfee et al. | 705/37 |
| 7,409,360 B1 * | 8/2008 | Lark et al. | 705/26.3 |

OTHER PUBLICATIONS

Willaim S Penn. Research in Marketing. Journal of Marketing (pre-1986); 1956; 21, ProQuest Central. p. 86.*

(Continued)

*Primary Examiner* — Muriel Tinkler
(74) *Attorney, Agent, or Firm* — Manatt, Phelps & Phillips, LLP

(57) ABSTRACT

The present invention is a system and method for a computer-implemented auction, based on a system with multiple bidder and auctioneer computers or terminals (20*a-n*,30) communicating with the server (10) over a network (40). The computers (20*a-n*) are employed by bidders, the computer (30) is employed by the auctioneer, and the server (10) is the auction computer. That server consist of a CPU (11), memory (12), a data storage device (13), a communication interface (140), a clock (150), an operating system (16), and an auction program (17). In one embodiment, the system architecture is as a client-server system: the auction computer is a server; and the bidder and auctioneer are clients.

63 Claims, 20 Drawing Sheets

(56) References Cited

OTHER PUBLICATIONS

Bratton et al. The New Economics of Jurisdictional Comeptition: Devolutionary Federalism in a Second-Best World. Georgetown Law Journal; Nov. 1997; 86, 2; ProQuest Central. p. 201.*
Sushil Bikhchandani and Joseph M. Ostroy, "The Package Assignment Model", Journal of Economic Theory 107, pp. 377-406 (2002).
Gopal Das Varma, "Standard auctions with identity-dependent externalities", RAND Journal of Economics, vol. 33, No. 4, Winter 2002, pp. 689-708.
Philippe Jehiel and Benny Moldovanu, The European UMTS/IMT-2000License Auctions, Jan. 21, 2001, pp. 1-27.
Paul R. Milgrom and Robert J. Weber, "A Theory of Auctions and Competitive Bidding" Econometrica, vol. 50, No. 5, Sep. 1982, pp. 1089-1122.
Charles R. Plott, "Laboratory Experimental Testbeds: Application To The PCS Auction", Journal of Economics and Management Strategy, vol. 6, No. 3, Fall 1997, pp. 605-638.
Robert J. Weber, Making More from Less: Strategic Demand Reduction in the FCC Spectrum Auctions, Journal of Economics & Management Strategy, vol. 6, No. 3, Fall 1997, pp. 529-248.
Alvin E. Roth and Marilda A. Oliveira Sotomayor "Two-Sided Matching A Study in Game-Theoretic Modeling and Analysis", Cambridge University Press 1990, pp. i-xiii and 1-265.
Ralph Cassady, Jr., "Auctions and Auctioneering", Berkely: University of California Press, 1967, pp. iii-x and 1-325.
Yeon-Koo Che and Ian Gale, "Standard Auctions with Financially Constrained Bidders" Review of Economic Studies (1998) 65, pp. 1-21.
Sven de Vries and Rakesh V. Vohra, "Combinatorial Auctions: A Survey", Oct. 25, 2001, pp. 1-66.
John O. Ledyard, David Porter and Antonio Rangel, "Experiments Testing Multiobject Allocation Mechanisms", Journal of Economics and Management Strategy, vol. 6, No. 3, Fall 1997, pp. 639-675.

Noam Nisan, "Bidding and Allocation in Combinatorial Auctions", Apr. 17, 2000, pp. 1-25.
David P. Porter, "The Effect of Bid Withdrawal in a Multi-Object Auction", Review Economic Design 4, 1999, pp. 73-97.
Steven R. Williams, "A Characterization of Efficient, Bayesian Incentive Compatible Mechanisms", Economic Theory 14, 1999, pp. 155-180.
Faruk Gul and Ennio Stacchetti, "The English Auction with Differentiated Commodities" Journal of Economic Theory 92, 2000, pp. 66-95.
Paul Milgrom and John Roberts, "Adaptive and Sophisticated Learning In Normal Form Games", 1991, Games and Economic Behavior 3, pp. 82-100.
Thomas R. Palfrey, "Bundling Decisions By A Multiproduct Monopolist with Incomplete Information", Mar. 1983, Econometrica, vol. 51, No. 2, pp. 463-483.
Alvin E. Roth and Elliot Peranson, "The Redesign of the Matching Market for American Physicians: Some Engineering Aspects of Economic Design", 1999, American Economic Review, vol. 89, No. 4, pp. 748-780.
Gopal Das Varma, "Who else is bidding? The Pareto Optimality of Disclosing Bidder Identities", 2002, Review of Economic Design, 7, pp. 155-171.
Bengt Holstrom, "Groves' Scheme on Restricted Domains", Sep. 1979, Econometrica, vol. 47, No. 5, pp. 1137-1144.
Paul Milgrom and Ilya Segal, "Envelope Theorems For Arbitrary Choice Sets", Mar. 2002, Econometrica, vol. 70, No. 2, pp. 583-601.
David C. Parkes, "iBundle: An Efficient Ascending Price Bundle Auction", Nov. 1999, Proceedings ACM Conference on Electronic Commerce (EC-99), pp. 148-157.
Edward H. Clarke, "Multipart Pricing of Public Goods", 1971, Public Choice, XI, pp. 17-33.

* cited by examiner

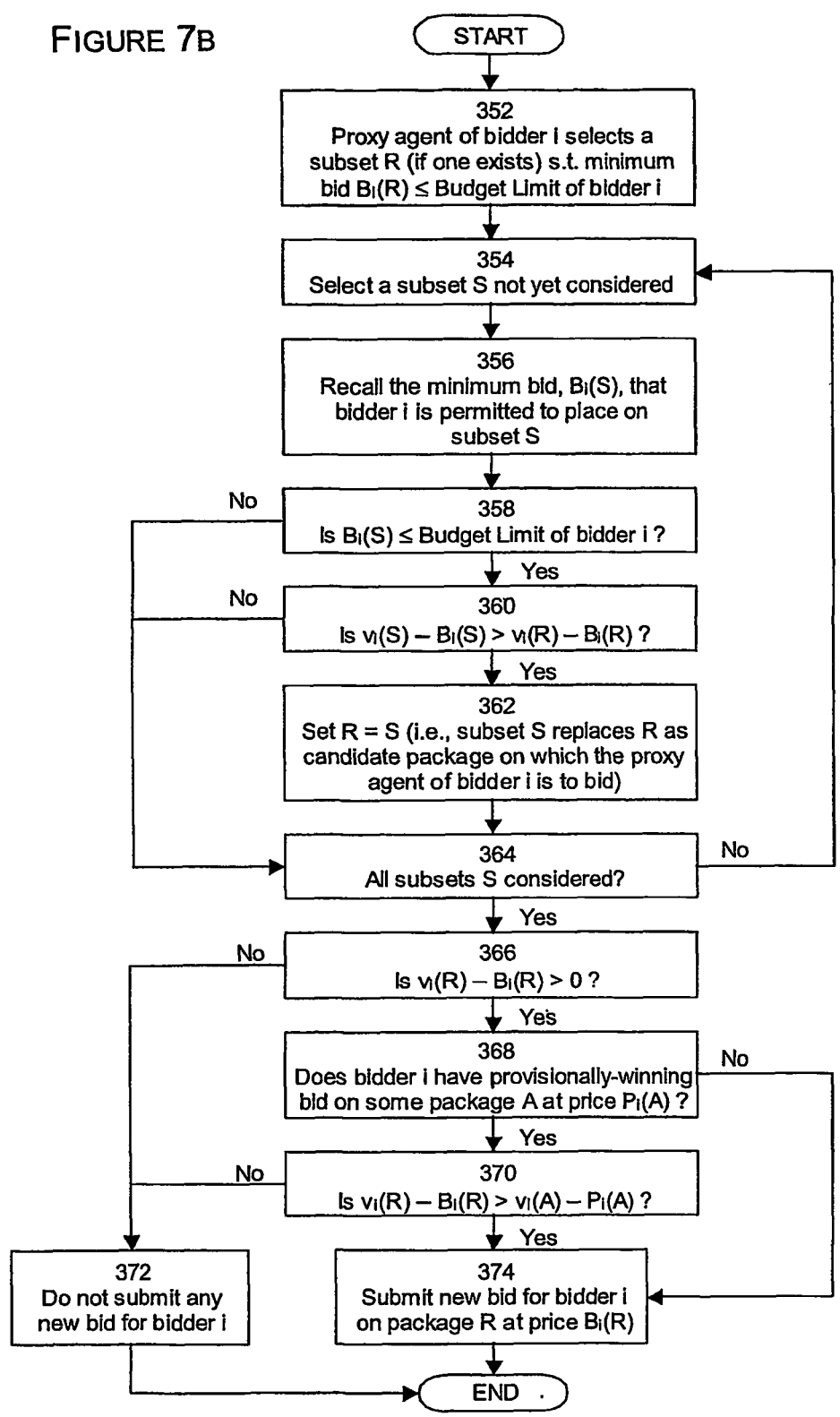

SYSTEM AND METHOD FOR A DYNAMIC AUCTION WITH PACKAGE BIDDING

RELATED APPLICATIONS

This application claims the benefit of the filing dates of the following co-pending provisional applications:

Milgrom, "METHOD AND SYSTEM FOR ASCENDING AUCTIONS WITH PACKAGE BIDDING", Application Ser. No. 60/252,718 Filed: Nov. 22, 2000;

Milgrom and Ausubel, "METHOD AND SYSTEM FOR ASCENDING PROXY AUCTIONS", Application Ser. No. 60/322,649 Filed: Sep. 12, 2001;

Ausubel and Milgrom, "SYSTEM AND METHOD FOR A DYNAMIC AUCTION WITH PACKAGE BIDDING", Application Ser. No. 60/330,672 Filed: Oct. 26, 2001.

FIELD OF THE INVENTION

The present invention relates to improving computer-implemented auctions and, more particularly, to computer implementation of a dynamic auction with package bidding.

BACKGROUND OF THE INVENTION

Sellers of large or complex assets need to consider how to divide and package the assets. Packaging decisions are potentially important whenever there are value dependencies among items in the sense that a bidder's value for a package is different from the sum of the values of the separate parts. For example, a wireless telephone company purchasing radio spectrum rights may realize synergies from obtaining geographically-adjacent licenses. A flower wholesaler in Holland may incur fixed costs for shipping, handling and overhead that make single lot transactions unprofitable. Since flowers are highly perishable, it may also want to limit its purchases to what it can quickly resell. In real estate sales, some potential buyers may be interested in a whole complex of properties while others simply want space for individual homes or businesses. All of these are examples of value dependencies and all can make buyers interested in the way items are packaged for sale.

In practice, sellers accommodate these packaging preferences in a variety of ways. For example, government-run spectrum auctions are invariably preceded by political processes in which potential buyers press their cases about such matters as the allowed uses of the spectrum and the scope of the licenses in terms of bandwidth, band composition, and geographic coverage. In private auctions of relatively homogeneous goods, winning bidders may be allowed to purchase as many similar lots as they like at the winning price before bids are taken for the remaining lots. In the real estate example, bids might be taken both for a whole complex and for its individual properties, and the two constellations of prices compared.

In the last few years, there has been growing interest in auction processes that allow bidders much greater freedom to name the packages on which they bid during the auction. Processes like that described for the real estate example, which determine the packaging, pricing and allocation decisions, can be called "package auctions" or "auctions with package bidding." Typically, bidders in these auctions describe the packages that they wish to acquire and make bids for the named packages.

The package auction that is best known among economists is a sealed-bid auction. The items for sale are taken to be M exogenously given "goods" and each bidder submits bids on every one of the $2^M-1$ possible packages. With distinct goods, such an auction can become impractically complicated for the bidders when M is still a single digit number. Although there are special cases in which the sealed-bid auction works well with larger numbers of goods, the sheer complexity of the general problem with many distinct kinds of goods has led auction designers to investigate alternative, dynamic auctions, which are often easier for bidders to comprehend and manage.

There is another practical issue that recommends package auctions. It is that the current alternatives to package bidding adopted by spectrum and electricity regulators have significant drawbacks of their own that package auctions can avoid. When the items for sale are substitutes, large bidders in multi-unit auctions find it in their interest to withhold some of their demand, in order to avoid driving up prices or to divide the spoils with other large bidders. Such "demand reduction" leads to inefficiency of the final allocation.

The present invention primarily concerns dynamic auctions with package bidding. These are multi-item auctions in which bidders may bid on packages (as well as single items) and may improve their bids or add new packages during the course of the auction. The eventual winning bids are traditionally the ones that optimize the total price of the goods.

There are several goals that arise repeatedly in the design of package auctions. The first is computational: there must be some sense in which, if bidders bid straightforwardly and bid evaluation costs are trivial, the auction outcome will be good ones according to revenue and efficiency criteria. Second, because package bidding is often very complex, simplicity is an important objective of auction design. Dynamic designs are sometimes favored over similar one-shot designs, for their relative comprehensibility and because they eliminate the need for bidders to evaluate closely every possible package. Third, the incentives for individuals or coalitions to deviate from straightforward bidding should be small or zero. Finally, the incentives for individuals and coalitions to deviate from efficient pre-auction investment decisions should also be small or zero.

Various systems and methods in the art facilitate the operation of computer-implemented auctions. The implementation of auctions on computers holds numerous advantages over the earlier art. It facilitates the simultaneous auctioning—in a single, combined auction process—of a plurality of items that are related, for example, in the sense that bidders may value the items as substitutes or complements. It permits a dynamic bidding process for such a plurality of items, in which bidders in diverse locations across the continent or the globe are able to actively participate and to receive feedback in real time about their opponents' bids. It enables the practical introduction of auctions with package bidding. And in accomplishing the above, it encourages bidders to bid aggressively and straightforwardly for the packages they want, incorporating all available information, and resulting in items being allocated to the bidders who value them the most, while also ensuring a competitive price for the seller or sellers.

However, there are various important limitations to the systems and methods for computer-implemented auctions in the art. This poses a technical problem to be addressed by the present invention. In particular:

Systems and methods for auctions of dissimilar items generally lack effective mechanisms whereby bidders can have computers place bids on their behalf.

Many auction systems and methods in the art are susceptible to tacit collusion among bidders, much to the detriment of allocative efficiency and revenue maximization.

Many auction systems and methods in the art lack effective "activity rules" that would constrain bidders to bid seriously in the early stages of the auction.

Systems and methods for auctions with package bidding generally require lengthy computations which limit the scalability of the process to auctions of a large number of items.

Systems and methods for dynamic auctions with package bidding generally accept only bids comprising packages of items and associated prices for the package.

The present invention is an improved system and method for a computer-implemented auction, particularly for a computer-implemented dynamic auction with package bidding. Various preferred embodiments of the present invention resolve a number of important limitations to the systems and methods for computer-implemented auctions in the art. Thus, the present invention offers the further technical effect of improving computer-implemented auctions, making them operate more efficiently in terms of the ability of bidders to readily participate and to express their needs and preferences, more efficiently in terms of the allocation of items determined by the computer, and more quickly in terms of computer time. In particular:

Some preferred embodiments provide effective "proxy agents" for auctions of a plurality of dissimilar items, whereby bidders can have computers place bids on their behalf.

Some preferred embodiments introduce mandatory proxy bidding for auctions, requiring bids to be intermediated by proxy agents and limiting changes of bid information, thereby curtailing possibilities for tacit collusion among bidders and also accelerating the auction process.

Some preferred embodiments introduce "bid improvement rules," "revealed-preference-based bidding constraints," and "price-based bidding constraints" that help to constrain bidders to bid seriously in the early stages of the auction.

Some preferred embodiments provide limitations on the number of bids that need to be considered at each calculation step, reducing the computation time for determining provisional winners and thereby improving scalability to large numbers of items.

Some preferred embodiments include augmented dynamic package-bidding auction processes in which other information (besides prices and quantities) may be explicitly included in bids, bidder-specific attributes may be implicitly included in bids, and both may be included in the auction computer's objective function and selection constraints.

The present invention is useful for "reverse auctions" conducted by or for buyers to acquire various kinds of items or resources, "standard auctions" conducted by sellers in which items are offered for sale, and "exchanges" in which both buyers and sellers place bids. Although terms such as "items or quantities demanded" (by a bidder) and "demand curve" (of a bidder) are used to describe the present invention, the terms "items or quantities offered" (by a bidder) and "supply curve" (of a bidder) are equally applicable. In some cases, this is made explicit by the use of both terms, or by the use of the terms "items or quantities transacted" (by a bidder) and "transaction curve" (of a bidder). The term "items or quantities transacted" includes both "items or quantities demanded" and "items or quantities offered". The term "bid" includes both offers to sell and offers to buy. The term "transaction curve" includes both "demand curve" and "supply curve". Moreover, any references to "items or quantities being offered" includes both "items or quantities being sold" by the auctioneer, in the case this is a standard auction for selling items, as well as "items or quantities being bought or procured" by the auctioneer, in the case this is a reverse auction for buying items or procuring items.

Moreover, while standard auctions to sell typically involve ascending prices, the present invention may utilize prices that ascend and/or descend.

Throughout this document, the terms "objects", "items", "units" and "goods" are used essentially interchangeably. The inventive system and method may be used both for tangible objects, such as real or personal property, and intangible items, such as telecommunications licenses or electric power. The inventive system and method may be used in auctions where the auctioneer is a seller, buyer or broker, the bidders are buyers, sellers or brokers, and for auction-like activities which cannot be interpreted as selling or buying. The inventive system and method may be used for items including, but not restricted to, the following: public-sector bonds, bills, notes, stocks, and other securities or derivatives; private-sector bonds, bills, notes, stocks, and other securities or derivatives; communication licenses and spectrum rights; clearing, relocation or other rights concerning encumbrances of spectrum licenses; electric power and other commodity items; rights for terminal, entry, exit or transmission capacities or other rights in gas pipeline systems; airport landing rights; emission allowances and pollution permits; and other goods, services, objects, items or other property, tangible or intangible. It may also be used for option contracts on any of the above. It may be used in initial public offerings, secondary offerings, and in secondary or resale markets.

The network used, if any, can be any system capable of providing the necessary communication to/from a Bidding Information Processor (BIP), a Bidding Terminal (BT), and an Auctioneer's Terminal (AT). The network may be a local or wide area network such as, for example, Ethernet, token ring, the Internet, the World Wide Web, the information superhighway, an intranet or a virtual private network, or alternatively a telephone system, either private or public, a facsimile system, an electronic mail system, or a wireless communications system, or combinations of the foregoing.

The following patents and published applications are related to the present invention:

Ausubel, Lawrence M., U.S. Pat. No. 5,905,975, May 1999.
Ausubel, Lawrence M., U.S. Pat. No. 6,021,398, February 2000.
Ausubel, Lawrence M., U.S. Pat. No. 6,026,383, February 2000.
Ausubel, Lawrence M., Application No. 00304195.1 at the European Patent Office, May 2000.

The following other references are related to the present invention:

Arrow, Kenneth, H. D. Bloch and Leonid Hurwicz (1959), "On the Stability of Competitive Equilibrium, II," *Econometrica* 27: 82-109.
Ausubel, Lawrence M. (1997a), "An Efficient Ascending-Bid Auction for Multiple Objects," Working Paper 97-06, University of Maryland, http://www.ausubel.com/auction-papers/97wp-efficient-ascending-auction.pdf.
Ausubel, Lawrence M. (1997b), "On Generalizing the English Auction," working paper, http://www.ausubel.com/auction-papers/97wp-generalizing-the-english-auction.pdf.

Ausubel, Lawrence M. (2000), "An Efficient Dynamic Auction for Heterogeneous Commodities," Working Paper, University of Maryland, www.ausubel.com.

Ausubel, Lawrence M. and Peter Cramton (1996), "Demand Reduction and Inefficiency in Multi-Unit Auctions," Working Paper No. 96-07, http://www.cramton.umd.edu/papers1995-1999/98wp-demand-reduction.pdf Ausubel, Lawrence M., Peter Cramton, R. Preston McAfee, and John McMillan (1997), "Synergies in Wireless Telephony: Evidence from the Broadband PCS Auctions," *Journal of Economics and Management Strategy*, 6:3, 497-527.

Banks, Jeffrey S., John O. Ledyard and David P. Porter, "Allocating Uncertain and Unresponsive Resources: An Experimental Approach," *Rand Journal of Economics*, 20: 1-25.

Bernheim, B. Douglas and Michael Whinston (1986), "Menu Auctions, Resource Allocation and Economic Influence," *Quarterly Journal of Economics*, 101: 1-31.

Bikhchandani, Sushil and Joseph M. Ostroy (1999), "The Package Assignment Problem," working paper, UCLA.

Bulow, Jeremy, Ming Huang and Paul Klemperer (1999), "Toeholds and Takeovers," *Journal of Political Economy*, 107(3): 427-454.

Cassady, Ralph (1967). *Auctions and Auctioneering*. Berkeley: University of California Press.

Charles River Associates and Market Design Inc. (1997), "Package Bidding for Spectrum Licenses," Report to the Federal Communications Commission. Available at http://www.fcc.gov/wtb/auctions/combin/cr_2.pdf.

Che, Yeon-Koo and Ian Gale (1998), "Standard Auctions with Financially Constrained Bidders," *Review of Economic Studies*, 65: 1-21.

Clarke, E. H. (1971), "Multipart Pricing of Public Goods," *Public Choice*, XI, 17-33.

Cybernomics (2000), "An Experimental Comparison of the Simultaneous Multiple Round Auction and the CRA Combinatorial Auction." Report to the Federal Communications Commission. Available at http://www.fcc.gov/wtb/auctions/combin/98540191.pdf.

DasVarma, Gopal (2000a), "Standard Auctions with Identity-Dependent Externalities," working paper, Duke University.

DasVarma, Gopal (2000b), "The Pareto Optimality of Disclosing Bidder Identities," working paper, Duke University.

G. Demange, D. Gale and M. Sotomayer, "Multi-Item Auctions," Journal of Political Economy, vol. 94, No. 4, 1986, pp. 863-872.

DeMartini, Christine, Anthony Kwasnica, John Ledyard, and David Porter (1999), "A New and Improved Design for Multi-Object Iterative Auctions," Cal Tech working paper.

DeVries, Sven and Rakesh Vohra (2001), "Combinatorial Auctions: A Survey." Working paper. Available at http://www-m9.ma.tum.de/~devries/comb_auction_supplement/comauction.pdf.

Federal Commiunications Commission (1995), "Bidder Information Packet for FCC Auction Scheduled for Aug. 2, 1995."

Federal Communications Commission (1995), "Bidder Information Packet for FCC Auction Scheduled for Dec. 11, 1995."

Federal Communications Commission (2000), "Bidder Information Packet for FCC Auction No. 31."

Groves, Theodore (1973), "Incentives in Teams," *Econometrica* 61: 617-31.

Gul, Faruk and Ennio Stacchetti (1999), "Walrasian Equilibrium with Gross Substitutes,"*Journal of Economic Theory*, 87, 9-124.

F. Gul and E. Stachetti (2000), "English and Double Auctions with Differentiated Commodities", *Journal of Economic Theory*, 92, 66-95.

Holmstrom, Bengt (1979), "Groves Schemes on Restricted Domains," *Econometrica* 47: 1137-1144.

Jehiel, Philippe and Benny Moldovanu (2001), "The European UMTS/IMA-2000 License Auctions," working paper.

Kelso, Alexander S. and Vincent P. Crawford (1982), "Job Matching, Coalition Formation, and Gross Substitutes," *Econometrica* 50: 1483-1504.

Ledyard, John, David Porter and Antonio Rangel (1997), "Experiments Testing Multi-object Allocation Mechanisms," *Journal of Economics and Management Strategy*, 6: 639-675.

R. P. McAfee and J. McMillan, "Auctions and Bidding," Journal of Economic Literature, vol. 25, June 1987, pp. 699-738.

K. A. McCabe, S. J. Rassenti and V. L. Smith, "Testing Vickrey's and Other Simultaneous Multiple Unit Versions of the English Auction," Research in Experimental Economics, vol. 4, Greenwich, Conn.: JAI Press, 1991, pp. 45-79.

McMillan, John (1994), "Selling Spectrum Rights," *Journal of Economics Perspectives*, 8: 145-162.

Milgrom, Paul (1981), "Rational Expectations, Information Acquisition, and Competitive Bidding,"*Econometrica*, 49: 921-43.

F. M. Menezes, *Four Essays on Auction Theory*, University of Illinois doctoral dissertation, February 1993, pp. 1-97 and 143-152.

Milgrom, Paul (1996), "Auctioning the Radio Spectrum," www.market-design.com.

Milgrom, Paul (2000). "Putting Auction Theory to Work: The Simultaneous Ascending Auction," *Journal of Political Economy*, 108:2, 245-272.

Milgrom, Paul and John Roberts (1991), "Adaptive and Sophisticated Learning in Repeated Normal Form Games," *Games and Economic Behavior*, 3: 82-100.

Milgrom, Paul and Ilya Segal (2000), "Envelope Theorems for Arbitrary Choice Sets," forthcoming in *Econometrica*.

Milgrom, Paul and Robert Weber (1982), "A Theory of Auctions and Competitive Bidding," Econometrica 50: 1089-1122.

Nisan, Noam (1999), "Bidding and Allocation in Combinatorial Auctions," working paper, http://www.cs.huji.ac.il/~noam/mkts.html.

Palfrey, Thomas (1983), "Bundling Decisions by a Multiproduct Monopolist with Incomplete Information,"*Econometrica*, 51: 463-483.

D. C. Parkes (1999), "iBundle: An Efficient Ascending Price Bundle Auction", Proceedings ACM Conference on Electronic Commerce (EC-99), Denver, 148-157.

Plott, Charles (1997), "Laboratory Experimental Testbeds: Application to the PCS Auction," *Journal of Economics and Management Strategy*, 6: 605-638.

Porter, David (1997), "The Effect of Bid Withdrawal in a Multi-Object Auction," working paper, University of Arizona.

Rassenti, S. J., V. L. Smith, and R. L. Bulfin (1982), "A Combinatorial Auction Mechanism for Airport Time Slot Allocation," *Bell Journal of Economics* XIII: 402-417.

Roth, Alvin E. and Elliott Peranson (1999), "The Redesign of the Matching Market for American Physicians: Some Engineering Aspects of Economic Design," *American Economic Review*, 89: 748-780.

Roth, Alvin E. and Marilda A. Oliveira Sotomayor (1990), *Two-Sided Matching: A Study in Game-Theoretic Modeling and Analysis*, Cambridge: Cambridge University Press.

M. H. Rothkopf, A. Pekec and R. M. Harstad (1998), "Computationally Manageable Combinatorial Auctions", *Management Science*, Vol. 44, No. 8, 1131-1147.

Rothkopf, Michael, Thomas Teisberg and Edward Kahn (1990), "Why Are Vickrey Auctions Rare?" *Journal of Political Economy*, 98: 94-109.

Scarf, Herbert (1960), "Some Examples of Global Instability of the Competitive Equilibrium," *International Economic Review*, 1: 157-172.

Sholtz & Associates, LLC, "ACE Market Operations Guide," Jan. 3, 1996, pp. 1-5.

U.S. Department of the Treasury, U.S. Securities and Exchange Commission, and Board of Governors of the Federal Reserve System, *Joint Report on the Government Securities Market*, Washington, D.C.: U.S.G.P.O., January 1992.

Vickrey, William (1961), "Counterspeculation, Auctions and Competitive Sealed Tenders," *Journal of Finance*, XVI, 8-37.

W. Vickrey, "Auctions and Bidding Games," Recent Advances in Game Theory, Princeton: Princeton University Conference, 1962, pp. 15-29.

W. Vickrey, "Auctions, Markets, and Optimal Allocation," Bidding and Auctioning for Procurement and Allocation, New York: New York University Press 1976, pp. 13-20.

R. J. Weber, "Multiple-Object Auctions," Auctions, Bidding, and Contracting: Uses and Theory, New York: New York University Press, 1983, pp. 165-191.

Weber, Robert (1997), "Making More from Less: Strategic Demand Reduction in the FCC Spectrum Auctions," *Journal of Economics and Management Strategy*, 6:529-548.

Williams, Steven (1999), "A Characterization of Efficient, Bayesian Incentive Compatible Mechanisms," *Economic Theory* XIV: 155-180.

R. Wilson, "Auction of Shares," *Quarterly Journal of Economics*, vol. 94, 1979, pp. 675-689.

BRIEF DESCRIPTION OF THE DRAWINGS

FIGS. 7a and 7b are flow diagrams illustrating, in greater detail, elements of the flow diagrams of FIGS. 5b and 5c;

DETAILED DESCRIPTION OF PREFERRED EMBODIMENTS

Overall Structure of Auction System

Earlier auction methods and systems are described in U.S. Pat. Nos. 5,905,975, 6,021,398 and 6,026,383. The following description will detail the flow of the novel features of the preferred embodiments of the present method and system for a dynamic auction with package bidding.

Figure 1:
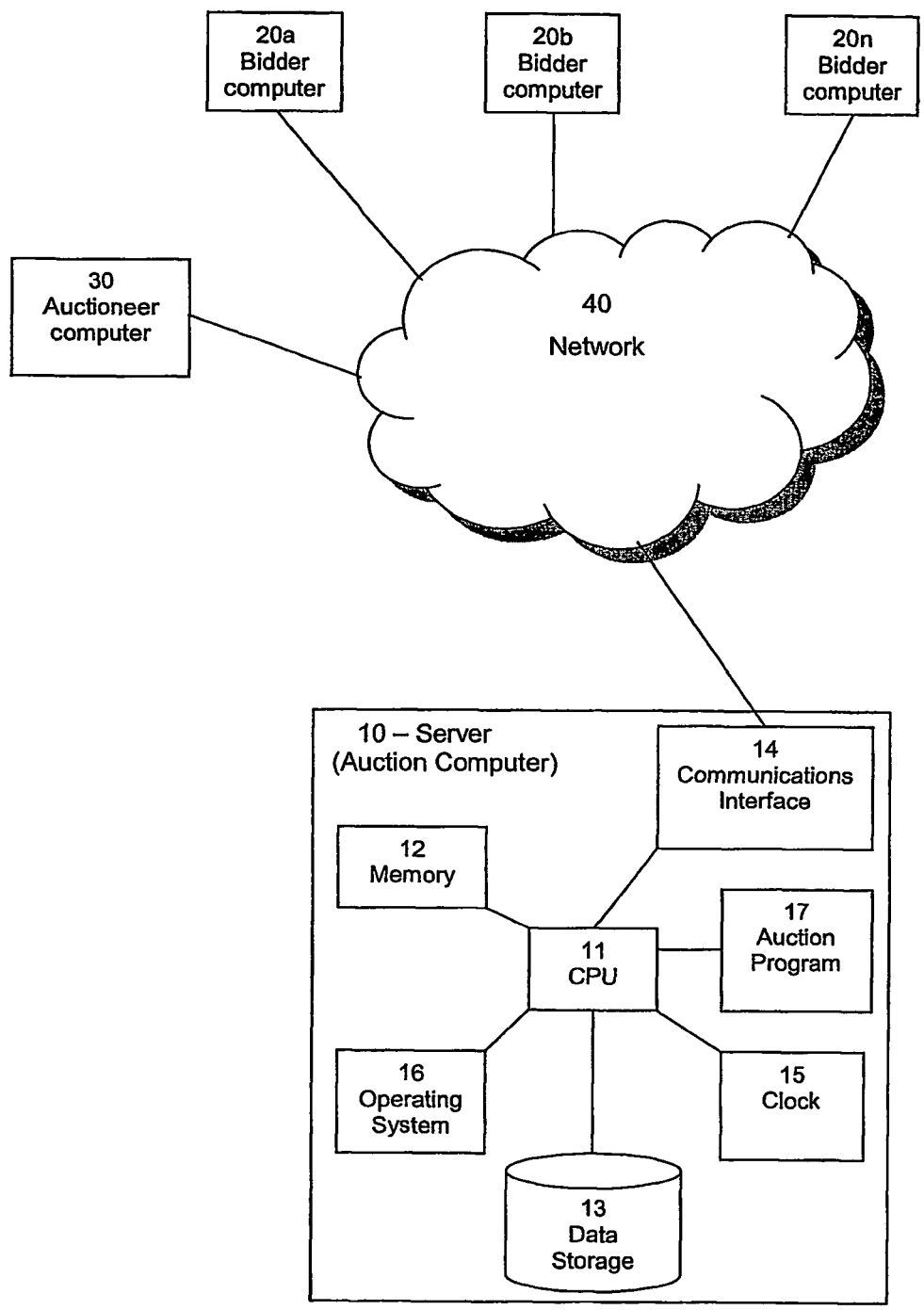
FIG. 1 is a graphical depiction of the architecture of an exemplary computer system in accordance with an embodiment of the invention.

Before describing the auction process in detail, reference is made to FIG. 1 to describe the architecture of an exemplary computer system in accordance with an embodiment of the present invention. In the graphical depiction of FIG. 1, the computer system consists of multiple bidder and auctioneer computers or terminals 20a-n and 30 communicating with the server (or auction computer) 10 over a network 40. The computers or terminals 20a-n are employed by bidders, the computer or terminal 30 is employed by the auctioneer, and the server 10 is the auction computer. The server 10 consists of a CPU 11, memory 12, a data storage device 13, a communications interface 14, a clock 15, an operating system 16, and an auction program 17. In one embodiment, the system architecture is as a client-server system: the auction computer is a server; and the bidder and auctioneer computers are clients.

Figure 2:
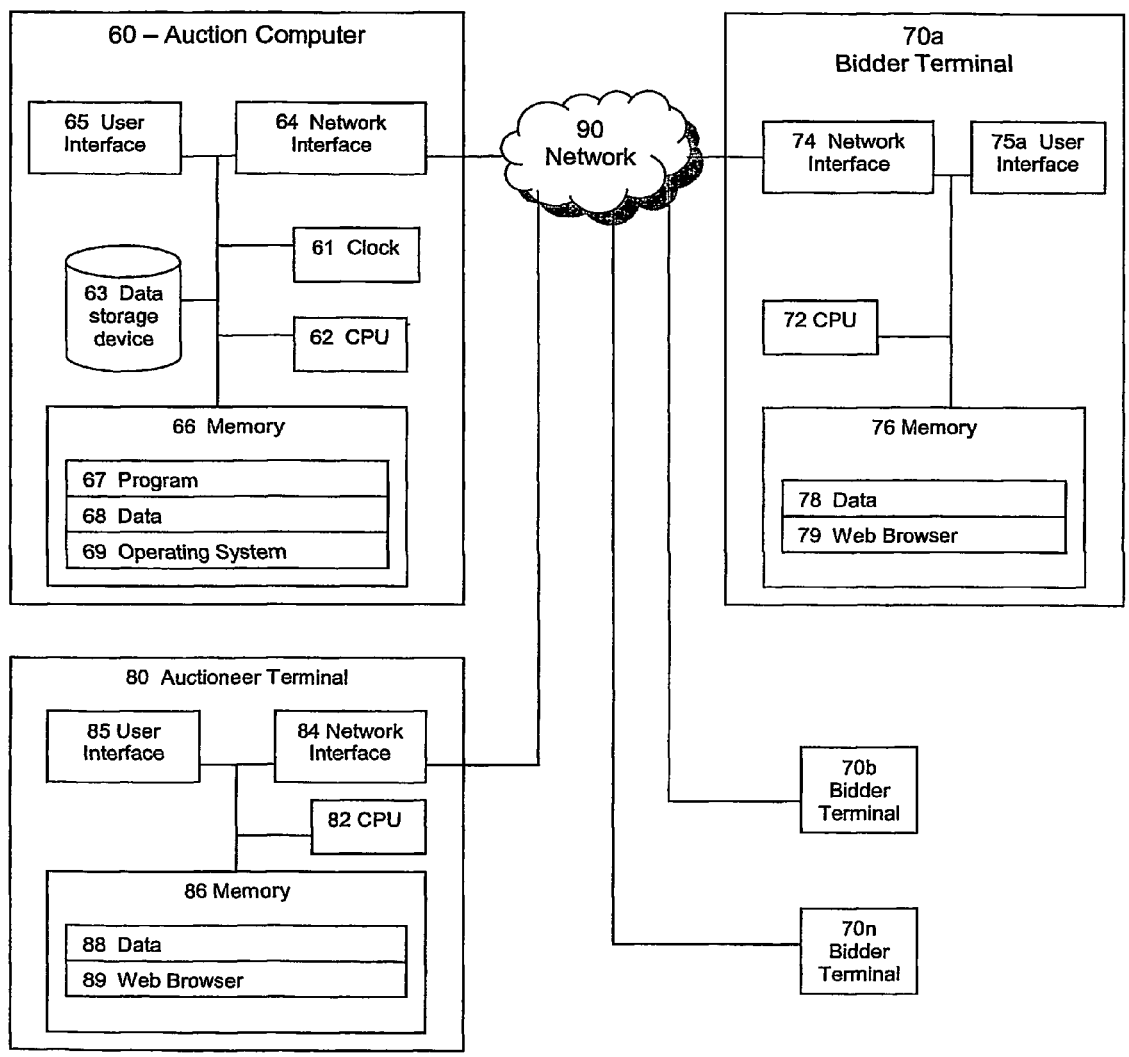
FIG. 2 is a graphical depiction of another exemplary computer system in accordance with an embodiment of the invention.

FIG. 2 is another graphical depiction of an exemplary computer system in accordance with an embodiment of the present invention. The auction system of FIG. 2 includes an auction computer 60 (sometimes also referred to as a Bidding Information Processor or BIP), a plurality of user systems 70a, 70b and so on (sometimes also referred to as Bidder Terminal or BT), each user system 70a-n representing an individual bidder, and a user system 80 (sometimes also referred to as an Auctioneer Terminal or AT). The systems 60, 70a-n, and 80 communicate over a network 90. The network represents any system capable of providing the necessary communication to/from BIP, BT, and AT. The network may be a local or wide area network such as, for example, ethernet, token ring, the Internet, the World Wide Web, the information superhighway, an intranet or a virtual private network, or alternatively a telephone system, either private or public, a facsimile system, an electronic mail system, or a wireless communications system. Each of the systems 60, 70a-n, and 80 may include a typical user interface 65, 75a-n, 85 for input/output which may include a conventional keyboard, display, and other input/output devices. Within each of the systems, the user interface (65, 75a-n, 85) is coupled to a network interface (64, 74a-n, 84), which in turn communicates via the network 90. Both the user interface and network interface connect, at each system, to a CPU (62, 72a-n, 82). Each system includes a memory (66, 76a-n, 86). The BIP 60 also includes a clock 61 and a data storage device 63, which will ordinarily contain a database. (However, in some embodiments the database might instead be stored in memory 66.) The memory 66 of the BIP 60 can further be broken down into a program 67, data 68 and an operating system 69. The memory (76a-n, 86) of the BT's 70a-n and the AT 80 may include a web browser (for example, Internet Explorer or Netscape) (79, 89) or other general-purpose software, but not necessarily any computer program specific to the auction process. In each system the CPU (62, 72a-n, 82) represents a source of intelligence when executing instructions from the memory (66, 76a-n, 86) so that appropriate input/output operations via the user interface and the network interface take place as is conventional in the art. The particular steps used in implementing the inventive auction system and method are described in more detail below. In one embodiment, each of the user systems is a personal computer or workstation.

Figure 3:
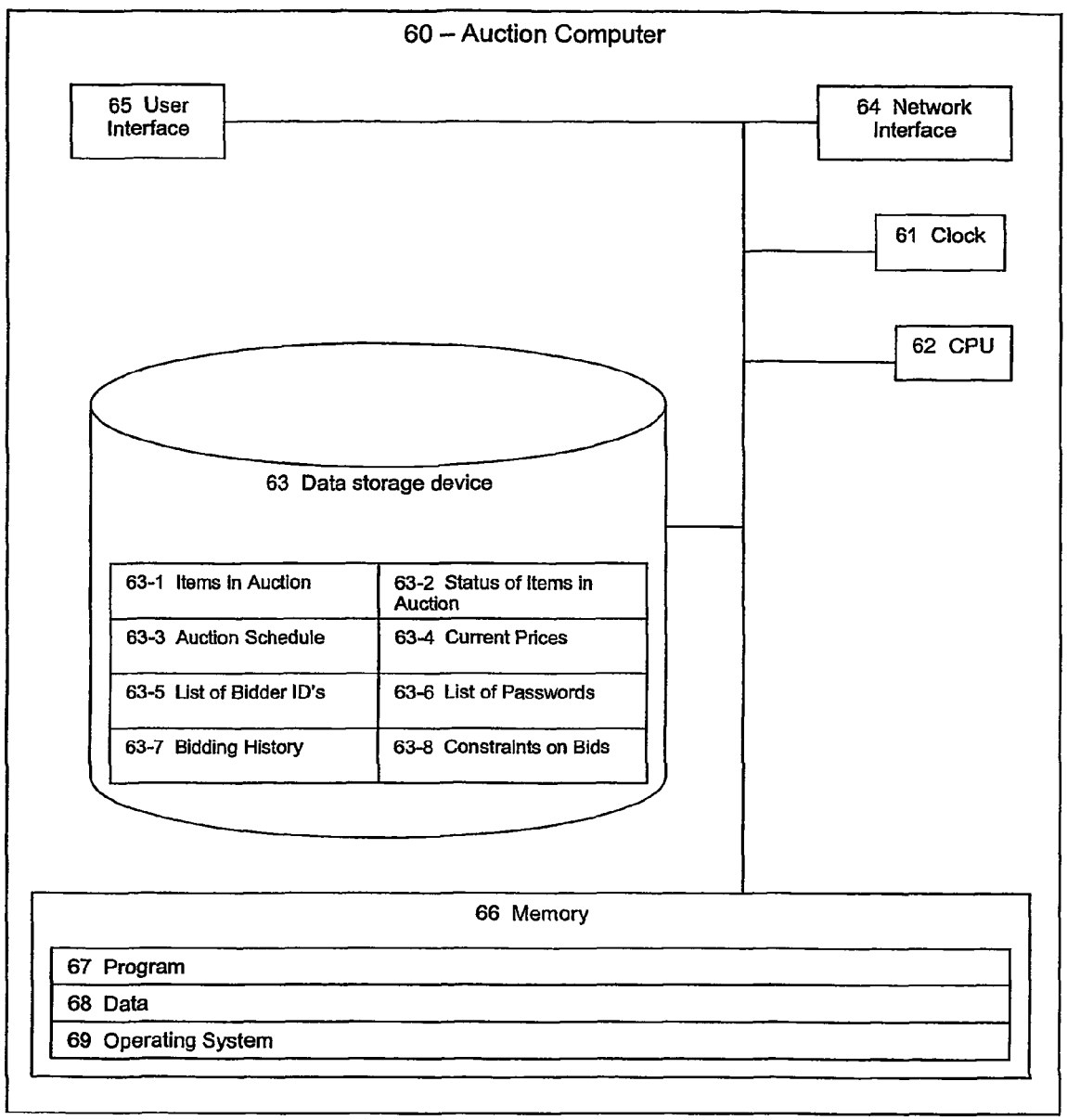
FIG. 3 is a detail of one element of the computer system of FIG. 2.

FIG. 3 is a more detailed illustration of an exemplary BIP 60 showing details of the database. As discussed for FIG. 2, the database is ordinarily stored on a data storage device 63, although in some embodiments it might instead be stored in memory 66. As depicted in FIG. 3, the database includes provision for creating, storing, and retrieving records representing Items in the Auction 63-1, Status of the Items in the Auction 63-2, Auction Schedule 63-3, Current Price(s) 63-4, List of Bidder ID's 63-5, List of Passwords 63-6, Bidding History 63-7, and Constraints on Bids 63-8. The particular set of data required for any particular auction and the format of that datum or data (such as scalar, vector, list, etc.) is more particularly specified by the detailed description of that auction.

Bidders, Items, and Package Bids

There are n bidders, often subscripted by i (i=1, ..., n), participating in the auction. Typically, we restrict n≥2, so that there are two or more bidders in the auction. Let $\Omega$ denote any set of items which are offered at auction. The object of the auction is to allocate, among the bidders, each element of the set $\Omega$. Often, but not always, $\Omega$ will comprise a set of dissimilar items meaning that if A and B are any two items in $\Omega$, then A and B are neither identical nor very close substitutes to one another.

In many preferred embodiments of the present invention, bids comprise pairs, (S, P), where $S \subset \Omega$ is a subset of the set of all items being auctioned and P is a price at which the bidder is offering to transact for the subset S. Stated differently, a bid comprises a package of items and an associated price for the package. Such a bid comprising a pair, (S, P), is defined to be a package bid.

In the event that some of the elements of the set $\Omega$ are identical, we may prefer instead to allow bids to comprise a quantity of each "type" of item. This requires using somewhat different notation. Type is defined as follows: within each type, all of the items are identical or very close substitutes; however, between different types, the items are permitted to be dissimilar. There are m (m≥1) types of items are being auctioned. If the bidders are superscripted by i, where (i= 1, ..., n), then in the "type" notation, a bid would comprise a quantity vector $(Q_1^i, \ldots, Q_m^i)$ of each type of item, and a price, P, at which the bidder is offering to transact for the entire quantity vector. Such a bid $(Q_1^i, \ldots, Q_m^i; P)$ is defined to be a package bid in the "type" notation.

Flexible Bid Information and Proxy Agents

Flexible bid information is data that a bidder selects for present or future use by entering into a computer (e.g., a bidder computer or a BT), but at least some of such data is stored in a database rather than being directly and immediately submitted as a bid in an auction. Flexible bid information can include a scalar value, a vector value or a function. The flexible bid information may be an expression of which (or how many units of) item(s) a bidder is willing to purchase at a given price(s), how much money a bidder is willing to pay for the purchase of a given item(s), or any other expression of the willingness-to-pay or value which a bidder places on item(s). It may also include an expression of how much money or other consideration a bidder is willing to spend in aggregate for all of the items purchased. Optionally, flexible bid information may include a bidding rule that contains a limitation (e.g., "I desire up to a quantity of x at a price P, but I do not want any positive quantity at all unless I receive a minimum quantity of y"). Thus, flexible bid information may include one or more bidding rules that may comprise unconditional bids or contingent bids, and may include one or more functions from available information to bid quantities (e.g. a function of the previous bid(s) submitted).

Within the specific context of an auction with package bidding, flexible bid information may include valuation information, budget information, and other information. Valuation information comprises data relating one or more subsets of the set of all items to indices of price or value, often measured in dollars or other monetary units. For example, valuation information in a package auction for the items {A,B,C} may include a measure of the valuation or cost that a bidder attaches to each of the subsets Ø, {A}, {B}, {C}, {A,B}, {A,C}, {B,C} and {A,B,C}. Budget information comprises data relating to an aggregate index of price or payment, often measured in dollars or other monetary units. For example, budget information in a package auction for the items {A,B, C} may include a measure of the overall budget limit or parameter for whatever items that a given bidder may sell or buy. Other information comprises data relating to the auction that is neither valuation information nor budget information.

The state of the auction system refers to the full history of bids and messages submitted by or on behalf of bidders in the auction process, the full history of messages submitted on behalf of the auctioneer, the fill history of constraints imposed by the auction system, and any other relevant information about the progress of the auction. In some of the preferred embodiments of the inventive system and method, bidders are permitted to change or are not permitted to change their flexible bid information, according to rules based on the state of the auction system. In that event, the state of auction system may itself include a list of the past time or times at which bidders were allowed to change their flexible bid information, as well as information about the progress of the auction since this time or these times. In some embodiments the state of the auction system is limited to information reaching the auction computer. However, in other embodiments it includes inputs from the bidder representing flexible bid information. The "state of the auction system" is sometimes referred to, more compactly, as the "auction state information."

The current auction information refers to the portion of the state of the auction system that is made available to bidders. In some preferred embodiments, the auction is conducted in discrete rounds, and bidders are provided with full information about previous rounds, so that the current auction information in a given auction round may include the history of bids and messages submitted by or on behalf of bidders in the auction process, up until and including the previous auction round. In other preferred embodiments, the auction is conducted in discrete rounds, but bidders are provided with less than fill information about previous rounds, and so the current auction information in a given auction round may include only a very abbreviated summary of the history of bids and messages submitted by or on behalf of bidders in the auction process, up until and including the previous auction round. In other preferred embodiments, the auction is conducted in continuous time, and the current auction information at a given time may include the history of bids and messages submitted by or on behalf of bidders in the auction process, with some amount of time lag.

A proxy agent is a computer-implemented system which may submit bids or send messages on behalf of a bidder, based on flexible bid information, current auction information, and/or the state of the auction system. Thus, the inputs of the proxy agent may include flexible bid information; and the outputs of the proxy agent may include bids or messages. Another way to describe this is that a proxy agent may take flexible bid information as instructions and may submit bids or send messages on behalf of a bidder. A proxy agent may be a subsystem of a larger computer-implemented auction system, or it may be a stand-alone, computer-implemented system that is capable of interacting with a computer-implemented auction system.

In some embodiments of the inventive system and method, the bidding may be intermediated by proxy agents. More precisely, a bidder may enter flexible bid information at a bidder computer or a BT, and a proxy agent may submit bids on behalf of the bidder: this process will often be referred to as proxy bidding. In such embodiments of the inventive system and method, proxy bidding may either be voluntary or mandatory. One purpose of voluntary proxy bidding is to facilitate participation by bidders in a dynamic auction. With voluntary proxy bidding, a bidder who expects to be busy during part or all of a dynamic auction can instruct a proxy agent to bid in his (or her) place. One purpose of mandatory proxy bidding is to limit the possibilities for collusion among bidders. For example, it may be believed that bidders can tacitly collude by making use of retaliatory strategies: if bidder ABC raises the high bid on an item of interest to bidder XYZ, an example of a retaliatory strategy would be for bidder XYZ to respond by raising the high bid on an item of interest to bidder ABC. With mandatory proxy bidding, the auctioneer may require bidder XYZ to input his (or her) valuation information into a proxy agent that is incapable of carrying out a retaliatory strategy, effectively limiting the possibilities for collusion among bidders.

Furthermore, in an auction system or method with proxy bidding, a bidder may be allowed to make changes to the flexible bid information that is used by its proxy agent, or a bidder may not be allowed to make such changes. Obviously, a restriction on changes to the flexible bid information has the greatest force in an auction system where proxy bidding is mandatory. Moreover, the setting on an auction system as to whether a bidder is allowed to make changes may itself be changed over time (or status), and may depend on the history of bidding (or on the identity) of the bidder. For example, bidder i may be allowed to change its flexible bid information early in the auction, but the same bidder i may not be allowed to make changes in its flexible bid information beyond a certain time in the auction. The change in setting for bidder i may depend on the course of bidder i's bidding in the auction. For example, the setting that bidder i is not allowed to make further changes to its flexible bid information may be triggered by the fact that bidder i (or its proxy agent) has submitted insufficiently few new bids between time t and time t+1 of the auction.

Figure 4:
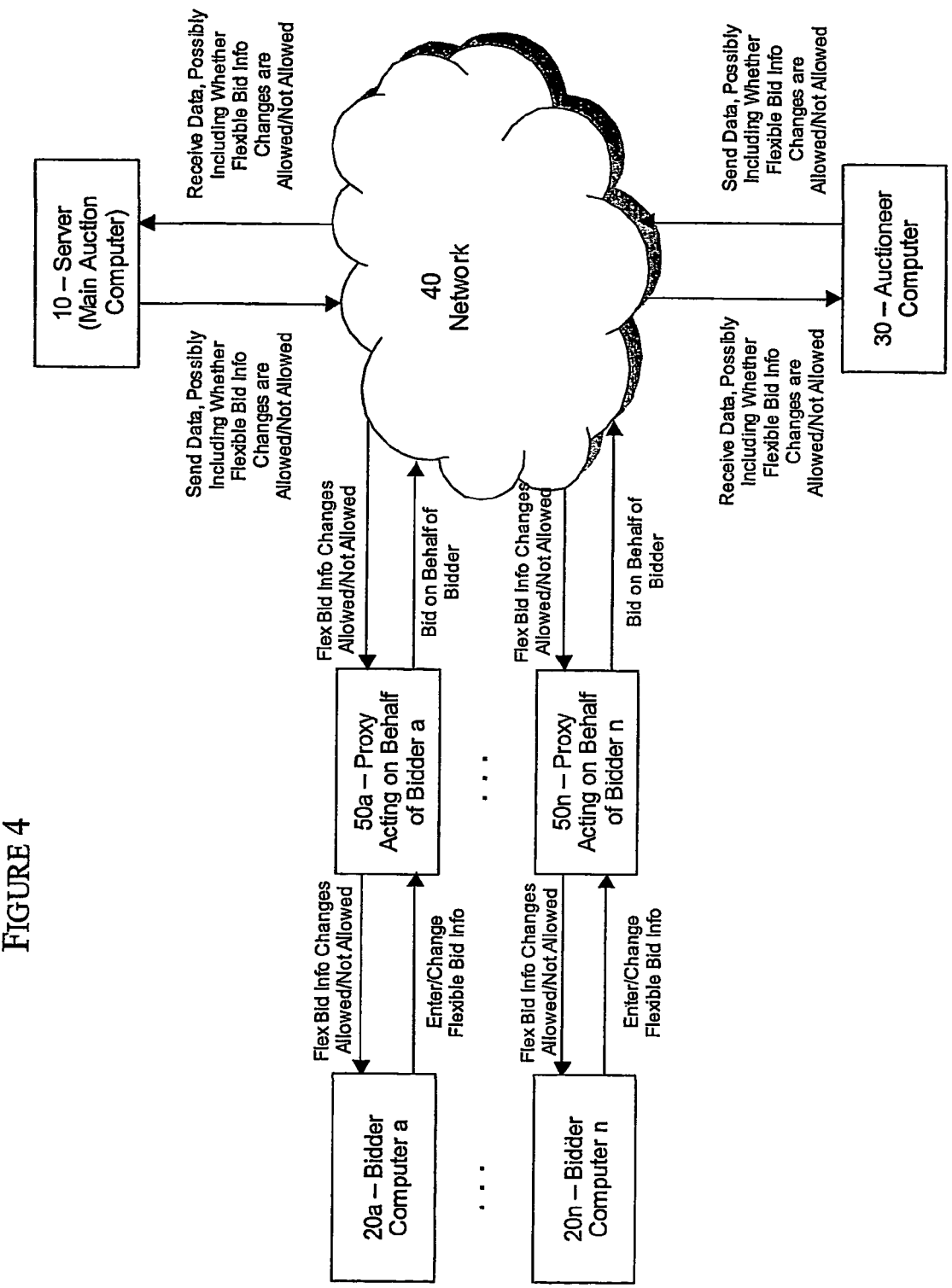
FIG. 4 is a graphical depiction of the architecture of an exemplary auction system in which bidding is intermediated by proxy agents, in accordance with an embodiment of the invention.

FIG. 4 is a high-level depiction of the architecture of an exemplary auction system in which bidding is intermediated by proxy agents, and in which changes to the instructions of proxy agents may be allowed or not allowed, in accordance with an embodiment of the present invention. In the exemplary graphical depiction of FIG. 4, the computer system consists of a server and multiple user computers or terminals. User 30 (the auctioneer) communicates with server 10 (the main auction computer) over a network 40. Users 20a-n (the bidders) also communicate with server 10 over a network 40, but all communications from the respective bidders to the auction process are intermediated through the corresponding proxy agents 50a-n. The proxy agents 50a-n are subsystems of the computer system, and they may physically reside on the bidder computers or terminals 20a-n, the server or auction computer 10, or any other computer.

In FIG. 4, bidders a-n participate in the auction by entering flexible bid information or making changes in their flexible bid information at their bidder computers or BT's (20a-n). The bidders can enter or change their flexible bid information at times when the auction system is set to allow changes in the flexible bid information of the respective bidders. The actual bidding on behalf of the respective bidders is performed by the proxy agents 50a-n acting on behalf of the respective bidders. Based on the respective bidder's flexible bid information, the proxy agent may compute a bid and submit it in the auction process by transmitting it via a network interface. Meanwhile, the server 10 or auctioneer computer or AT 30 may receive submitted bids, process submitted bids, and update the auction state. This is described in greater detail elsewhere in this application. The server 10 or auctioneer computer or AT 30 may also change the setting of the auction system so as to allow or to not allow bidders to make changes to their flexible bid information. One exemplary way in which this may be done is that the server 10 will compute, according to a predetermined rule, whether flexible bid information changes should be allowed and will send out data to the proxy agents 50a-n, the bidder computers or BT's 20a-n and the auctioneer computer or AT 30 indicating whether flexible bid information changes are allowed. The proxy agents or bidder computers carry out the server's instructions on whether flexible bid information changes are allowed. Meanwhile, the auctioneer has final authority over whether flexible bid information changes are allowed, and can override the server's determination in this regard, if desired.

The "server" (or auction computer) typically has a central role, especially with regard to communications. In some preferred embodiments, the server also does all of the computations and stores all of the data. In some embodiments the "auctioneer" is a live person who sits down at the auctioneer terminal, logs in, and makes decisions which affect the conduct of the auction. Decisions that the auctioneer makes include initialization decisions necessary to initialize an auction such as setting the size of bid increments that will be used and setting the round schedules. Other decisions include determining the "final call" and calling the end of the auction (both typically based on computations and a recommendation by the server). Finally the auctioneer can make decisions in exceptional circumstances such as sending out messages to bidders and placing bids on behalf of bidders whose Internet connections have failed. Thus aside from the initialization decisions and exceptional events, the auctioneer's decisions can be no more than merely confirming recommendations of other entities. Consequently, in many embodiments, the auctions may be completely automatic, i.e., with no need for human intervention by an auctioneer.

Flow Diagram of Auction Process without Proxy Bidding

Figure 5A:
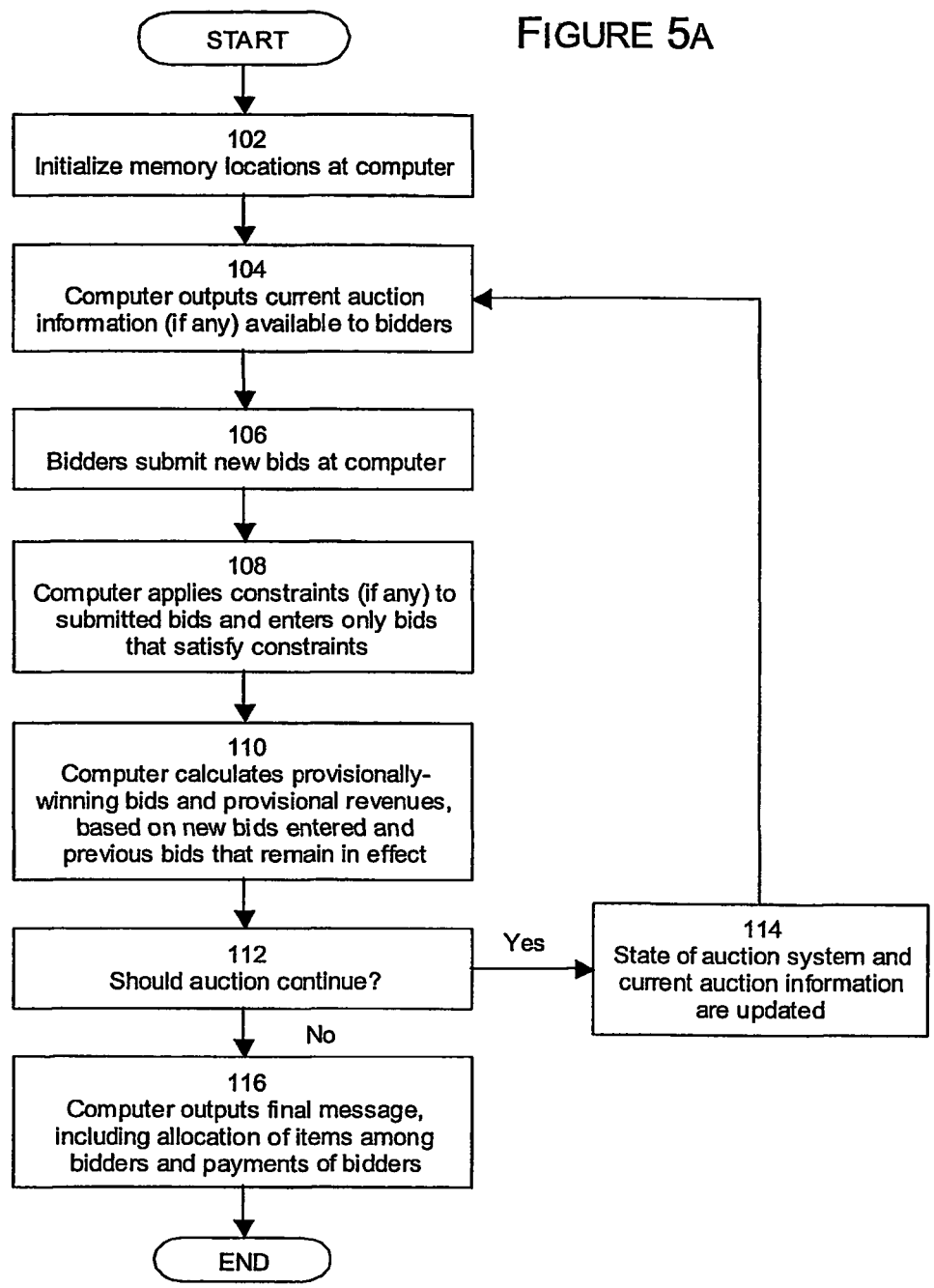
FIGS. 5a, 5b and 5c are flow diagrams of exemplary auction processes in accordance with embodiments of the invention.

FIG. 5a is a flow diagram of an auction in accordance with one embodiment of the present invention, in which proxy bidding is not used. The process starts with step 102, in which memory locations of a computer are initialized. In one preferred embodiment, the appropriate memory locations of the auction server are initialized with information such as the items in the auction, the auction schedule, the minimum opening bids or reserve prices, a list of bidder ID's, a list of passwords, and a list of constraints on bids. In step 104, a computer outputs the current auction information (if any) available to bidders, possibly including, for example, the minimum opening bids or current high bids. In one preferred embodiment, the auction server outputs the auction information through its network interface and transmits it via the network. The auction user computers then receive the auction information through their network interfaces and display the information to bidders and the auctioneer through their user interfaces. In step 106, bidders submit new bids at a computer. In many preferred embodiments; bids comprise pairs, (S, P), where $S \subset \Omega$ is a subset of the set of all items being auctioned and P is a price at which the bidder is offering to transact for the subset S. Stated differently, a bid comprises a package of items and an associated price for the package. As already defined above, such a bid comprising a pair, (S, P), is defined to be a "package bid." In one preferred embodiment, a bidder inputs his (or her) package bid(s) through the user interface of the associated bidder computer or terminal, which then outputs the bid(s) through its network interface and transmits it via the network to the auction server. In step 108, a computer applies constraints, if any, to the new bids submitted by bidders, and enters only those bids that satisfy said constraints. This process is illustrated in greater detail in FIG. 9 and in FIGS. 11*a*, *b* and *c*. In one preferred embodiment, the constraints are applied at the auction server, although they may also easily be applied at the bidder computers or terminals, or at other computers.

In step 110, a computer calculates the provisionally-winning bids and provisional revenues, based on the new bids entered and the previous bids that remain "in effect" (i.e., the previous bids that remain active, or remain subject to being selected as winning bids). In one preferred embodiment, all bids take the form of package bids, all bids that are entered at any time during the auction remain in effect for the duration of the auction, and all bids that are entered for a given bidder are treated as being mutually exclusive. Therefore, in this preferred embodiment, a computer (which may be the auction server or some other computer) calculates a solution to the following problem of optimizing bid revenues over compatible bids:

Find an n-tuple, $\{(S_1,P_1), \ldots, (S_n,P_n)\}$, of bids, one from each bidder i (i=1, . . . , n), which maximizes the sum $P_1 + \ldots + P_n$, subject to the constraint that the $S_i$ are disjoint subsets of $\Omega$. Stated differently, for every i (i= 1, . . . , n) and for every j≠i (j=1, . . . , n), it is required that $(S_i,P_i)$ be a new or previous bid entered by bidder i, $(S_j,P_j)$ be a new or previous bid entered by bidder j, and $S_i \cap S_j = \emptyset$, i.e. no item of set $S_i$ is a member of the set $S_j$ if i≠j.

In performing the above calculation, the computer may take as implicit the existence of a zero bid, i.e. the pair (∅,0), associated with each bidder. The calculated n-tuple, $\{(S_1, P_1), \ldots, (S_n,P_n)\}$, of bids solving the above optimization problem is defined to be the provisionally-winning bids; and the calculated sum $P_1 + \ldots + P_n$ is defined to be the provisional revenues. However, in other preferred embodiments: (a) only some of the bids that were previously entered into the auction remain in effect for subsequent calculations of the provisionally-winning bids; (b) not all bids that are entered by a given bidder are treated as being mutually exclusive, so that the optimization problem may allow two or more bids by a single bidder to be selected; and (c) the auction may be an auction to buy, a procurement auction or a reverse auction (rather than an auction to sell), so that the optimization problem for calculating provisionally-winning bids may involve the minimization of payments associated with selected bids, or some other optimization problem, rather than the maximization problem stated above. Also, in many preferred embodiments, a computer stores the calculated provisionally-winning bids and provisional revenues in memory or on a data storage device for future use. In step 112, a computer determines whether the auction should continue. One exemplary way to perform step 112 is for the auction server to compare the current provisional revenues with a function of the provisional revenues obtained in previous iteration(s) of the loop, and to continue the auction if and only if the current provisional revenues exceed the function of the provisional revenues obtained in previous iteration(s). However, this particular stopping rule is only exemplary, and many other embodiments are also possible: for example, the rule applied may be different, it may be performed on a different computer, and the computer may only produce a recommendation of stopping the auction which is then transmitted to the auctioneer computer or terminal for final approval.

If the auction should continue, the process goes to step 114, in which the state of the auction system and the current auction information are updated. In one preferred embodiment, the auction server: adds the newly-submitted bids that were entered in step 108 to the list of previous bids that remain in effect; replaces the previous provisionally-winning bids with the provisionally-winning bids that were calculated in the most recent execution of step 110; and replaces the previous provisional revenues with the provisional revenues that were calculated in the most recent execution of step 110. In a second preferred embodiment, the auction server additionally deletes some of the bids from the list of previous bids that remain in effect, in order to reduce the size of the problem that the computer will face at the next iteration of step 110. This step is illustrated in greater detail in FIG. 10*a*. The process then loops to step 104.

If the auction should not continue, the process goes to step 116, in which a computer outputs a final message, including the allocation of items among bidders and the payments of the bidders. In one preferred embodiment, the auction server recalls its calculation of the provisionally-winning bids at the most recent execution of step 110 and outputs this in a final message as the determined allocation of items among bidders and the payments of the bidders. The auction server outputs this final message through its network interface and transmits it via the network. The bidder and auctioneer computers or terminals then receive the final message through their network interfaces and display the information to bidders and the auctioneer through their user interfaces. The process then ends.

Flow Diagram of Auction Process with Mandatory Proxy Bidding

Figure 5B:
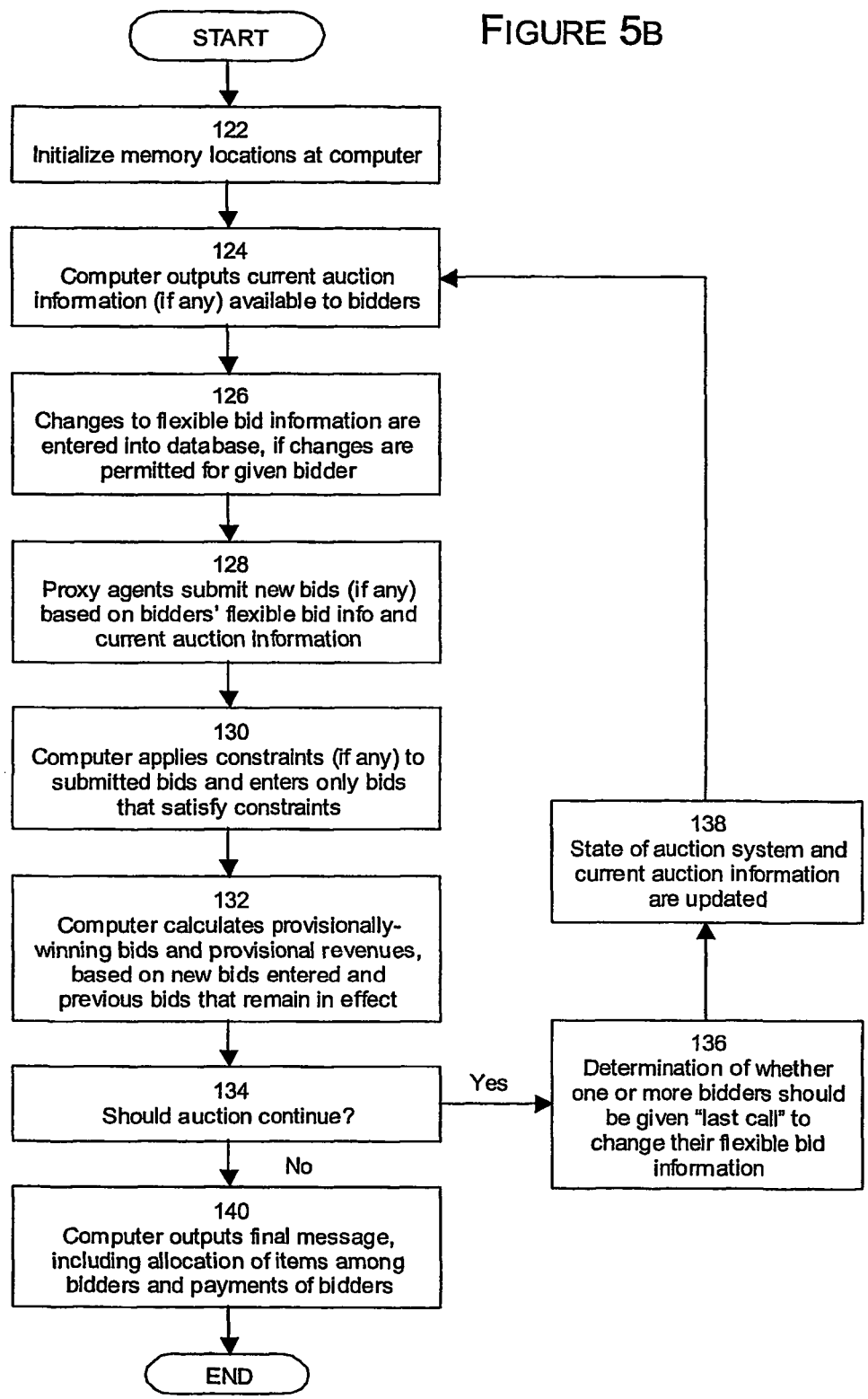

FIG. 5*b* is a flow diagram of an auction in accordance with another embodiment of the present invention, in which it is mandatory that bidding be intermediated by proxy agents. The process starts with step 122, in which memory locations of a computer are initialized. In one preferred embodiment, the appropriate memory locations of the auction server are initialized with information such as the items in the auction, the auction schedule, the minimum opening bids or reserve prices, a list of bidder ID's, a list of passwords, and a list of constraints on bids. In step 124, a computer outputs the current auction information (if any) available to bidders, possibly including, for example, the minimum opening bids or current high bids, and whether one or more bidders have been given a "last call" for making changes to their flexible bid information. In one preferred embodiment, the auction server outputs the auction information through its network interface and transmits it via the network. The user computers or terminals then receive the auction information through their network interfaces and display the information to bidders and the auctioneer through their user interfaces. In step 126, changes to the flexible bid information for given bidders are entered into computer databases or memory, provided that changes are permitted for the respective bidders (and provided that the bidders wish to make changes to their flexible bid information). This step is illustrated in greater detail in FIGS. 6a and 6b. In one preferred embodiment, a bidder inputs his (or her) flexible bid information through the user interface of the bidder computer or terminal, which then (if necessary) outputs the auction information through its network interface and transmits it via the network. The proxy agent corresponding to that bidder (if located on another computer) then receives the flexible bid information through its network interface for use in the next step. In step 128, the proxy agents compute new bids, based on the flexible bid information and the current auction information, to submit on behalf of their respective bidders, and the proxy agents submit new bids (if any) in the auction process on behalf of their respective bidders. This step is illustrated in greater detail in FIGS. 7a and 7b. In many preferred embodiments, bids comprise pairs (S,P), where $S \subset \Omega$ is a subset of the set of all items being auctioned and P is a price at which the bidder is offering to transact for the subset S. Stated differently, a bid comprises a package of items and an associated price for the package. As already defined above, such a bid comprising a pair, (S, P), is defined to be a "package bid." In one preferred embodiment, the proxy agents reside on the auction server, so that they can submit new package bids without making use of the network. In a second preferred embodiment, the proxy agents reside on the bidder computers or terminals, in which case the bidder computers or terminals output the submitted new bids through their network interfaces and transmit them via the network. The auction server then receives the submitted new bids through its network interface for use in the next step. In step 130, a computer applies constraints, if any, to the new bids submitted by the proxy agents, and enters only those bids that satisfy said constraints. This process is illustrated in greater detail in FIG. 9 and in FIGS. 11a, b and c. In one preferred embodiment, the constraints are applied at the auction server, although they may also easily be applied at the bidder computers or terminals, or at other computers.

In step 132, a computer calculates the provisionally-winning bids and provisional revenues, based on the new bids entered and the previous bids that remain "in effect" (i.e., the previous bids that remain active, or remain subject to being selected as winning bids). In one preferred embodiment, all bids take the form of package bids, all bids that are entered at any time during the auction remain in effect for the duration of the auction, and all bids that are entered on behalf of a given bidder are treated as being mutually exclusive. Therefore, in this preferred embodiment, a computer (which may be the auction server or some other computer) calculates a solution to the following problem of optimizing bid revenues over compatible bids:

Find an n-tuple, $\{(S_1,P_1), \ldots, (S_n,P_n)\}$, of bids, one from each bidder i (i=1, ..., n), which maximizes the sum $P_1 + \ldots + P_n$, subject to the constraint that the $S_i$ are disjoint subsets of $\Omega$. Stated differently, for every i (i= 1, ..., n) and for every j≠i (j=1, ..., n), it is required that $(S_i,P_i)$ be a new or previous bid entered on behalf of bidder i, $(S_j,P_j)$ be a new or previous bid entered on behalf of bidder j, and $S_i \cap S_j = \emptyset$, i.e. no item of set $S_i$ is a member of the set $S_j$ if i≠j.

In performing the above calculation, the computer may take as implicit the existence of a zero bid, i.e. the pair $(\emptyset,0)$, associated with each bidder. The calculated n-tuple, $\{(S_1, P_1), \ldots, (S_n,P_n)\}$, of bids solving the above optimization problem is defined to be the provisionally-winning bids; and the calculated sum $P_1 + \ldots + P_n$ is defined to be the provisional revenues. However, in other preferred embodiments: (a) only some of the bids that were previously entered into the auction remain in effect for subsequent calculations of the provisionally-winning bids; (b) not all bids that are entered on behalf of a given bidder are treated as being mutually exclusive, so that the optimization problem may allow two or more bids by a single bidder to be selected; and (c) the auction may be an auction to buy, a procurement auction or a reverse auction (rather than an auction to sell), so that the optimization problem for calculating provisionally-winning bids may involve the minimization of payments associated with selected bids, or some other optimization problem, rather than the maximization problem stated above. Also, in many preferred embodiments, a computer stores the calculated provisionally-winning bids and provisional revenues in memory or on a data storage device for future use. In step 134, a computer determines whether the auction should continue. One exemplary way to perform step 134 is for the auction server to compare the current provisional revenues with a function of the provisional revenues obtained in previous iteration(s) of the loop, and to continue the auction if and only if the current provisional revenues exceed the function of the provisional revenues obtained in previous iteration(s). However, this particular stopping rule is only exemplary, and many other embodiments are also possible: for example, the rule applied may be different, it may be performed on a different computer, and the computer may only produce a recommendation of stopping the auction which is then transmitted to the auctioneer computer or terminal for final approval.

Figure 8A:
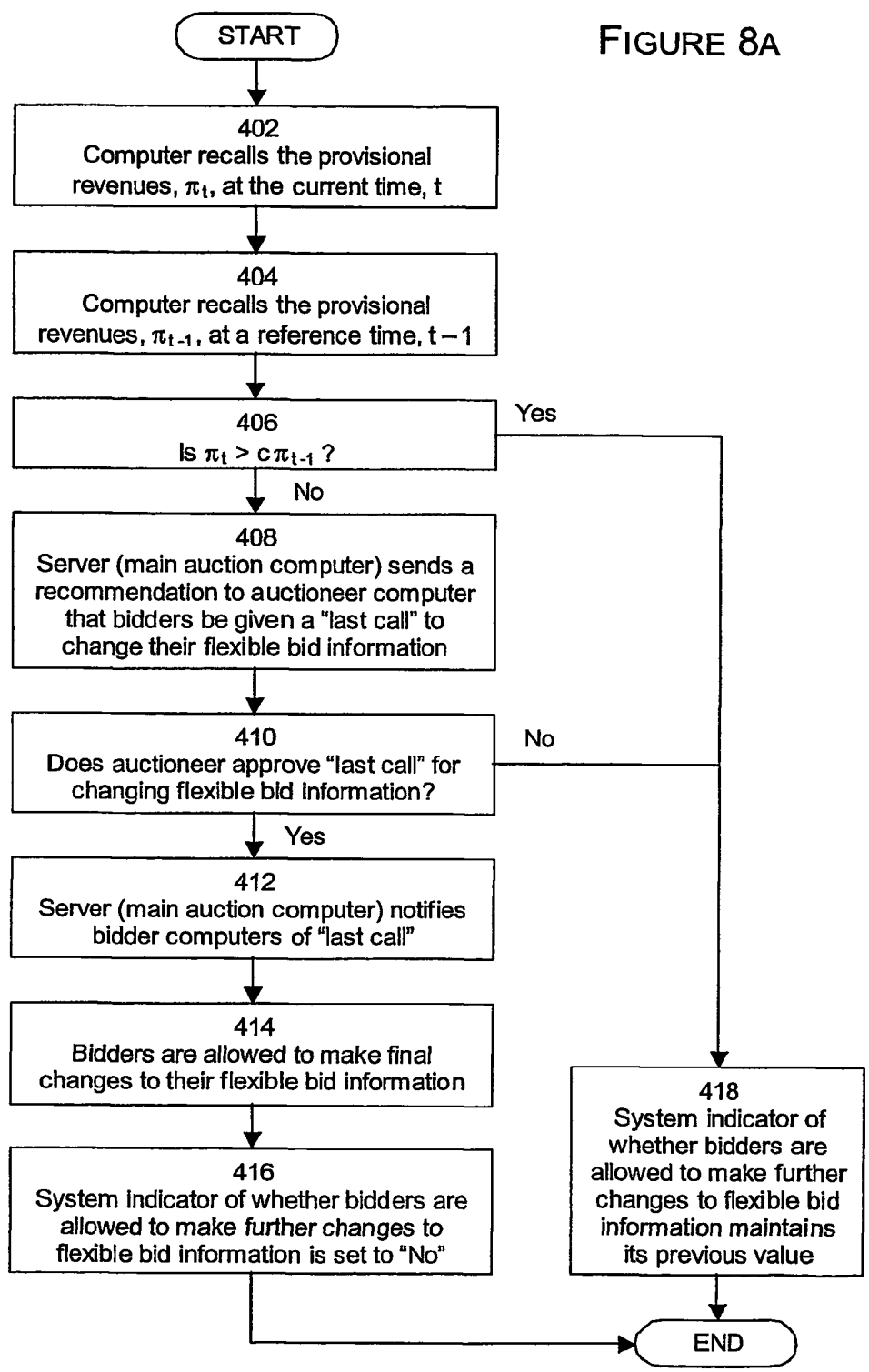
FIGS. 8a and 8b are flow diagrams illustrating, in greater detail, elements of the flow diagram of FIGS. 5b and 5c.
Figure 8B:
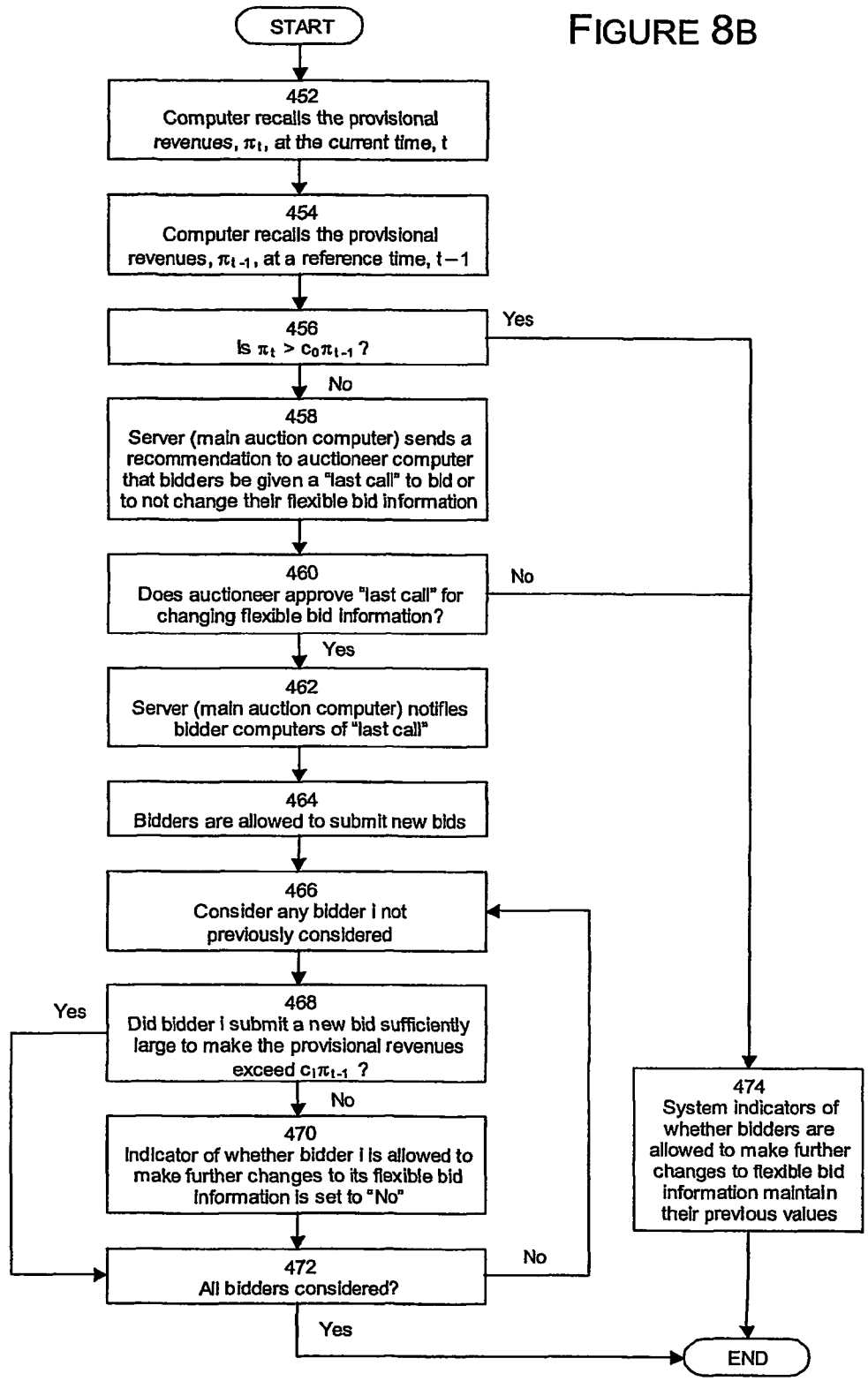

If the auction should continue, the process goes to step 136, where it is determined whether one or more bidders should be given a "last call" to change their flexible bid information. This step is illustrated in greater detail in FIGS. 8a and 8b. FIGS. 8a and 8b are two examples of preferred embodiments in which the auction server recommends a decision on whether bidders should be given a "last call" and transmits this recommendation via the network to the auctioneer computer or terminal. The auctioneer computer or terminal then receives the recommendation through its network interface and displays it to the auctioneer through its user interface. The auctioneer either approves or modifies the recommendation through the user interface of the auctioneer terminal, which then outputs the final decision through its network interface and transmits it via the network. The auction server then receives the final decision through its network interface for use in subsequent steps. The process then goes to step 138, in which the state of the auction system and the current auction information are updated. In one preferred embodiment, the auction server: adds the newly-submitted bids that were entered in step 130 to the list of previous bids that remain in effect; replaces the previous provisionally-winning bids with the provisionally-winning bids that were calculated in the most recent execution of step 132; and replaces the previous provisional revenues with the provisional revenues that were calculated in the most recent execution of step 132. In a second preferred embodiment, the auction server additionally deletes some of the bids from the list of previous bids that remain in effect, in order to reduce the size of the problem that the computer will face at the next iteration of step 132. This step is illustrated in greater detail in FIG. 10a. The process then loops to step 124.

If the auction should not continue, the process goes to step 140, in which a computer outputs a final message, including the allocation of items among bidders and the payments of the bidders. In one preferred embodiment, the auction server recalls its calculation of the provisionally-winning bids at the most recent execution of step 132 and outputs this in a final message as the determined allocation of items among bidders and the payments of the bidders. The auction server outputs this final message through its network interface and transmits it via the network. The bidder and auctioneer computers or terminals then receive the final message through their network interfaces and display the information to bidders and the auctioneer through their user interfaces. The process then ends.

Flow Diagram of Auction Process with and without Proxy Bidding

Figure 5C:
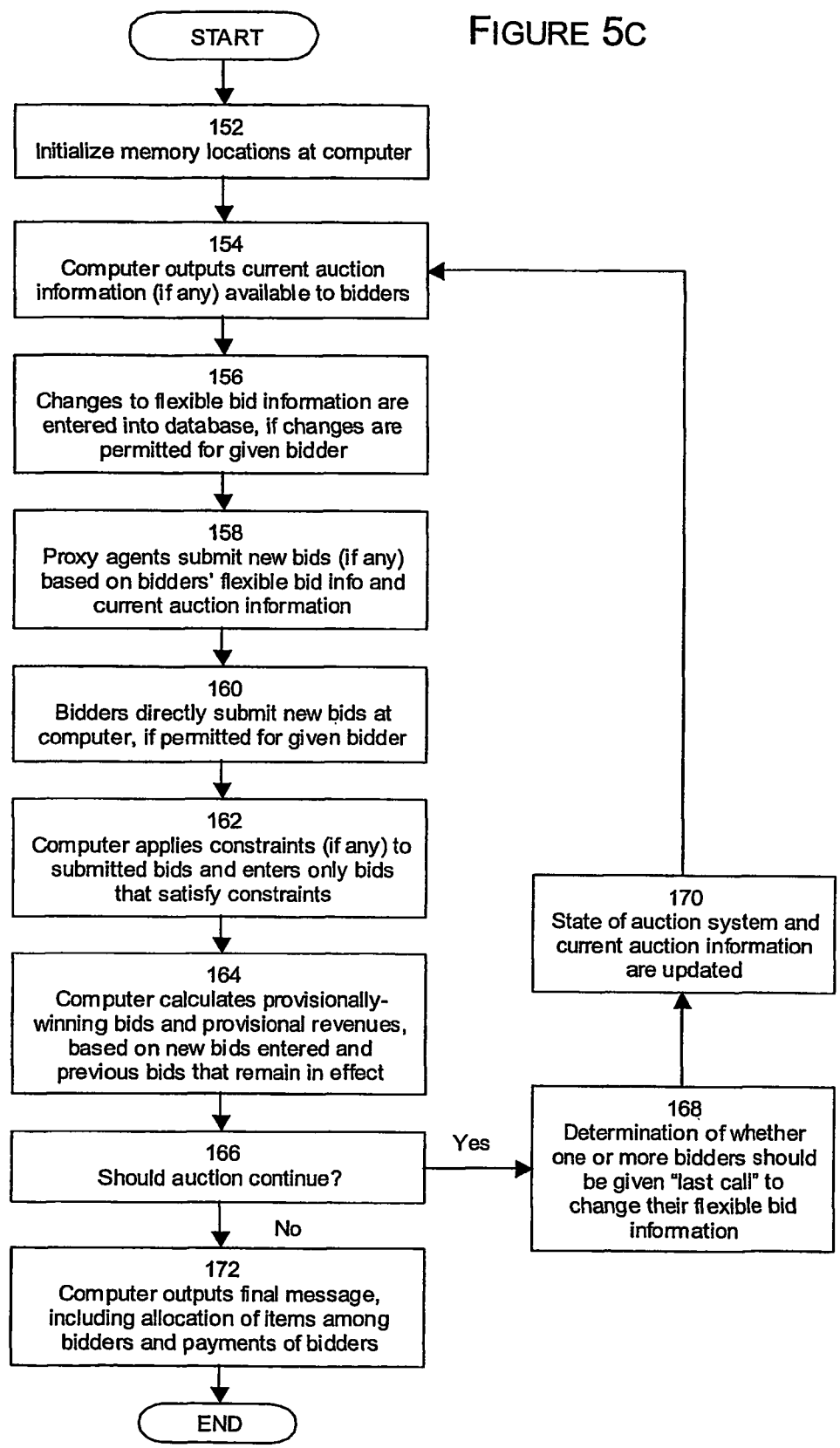

FIG. 5c is a flow diagram of an auction in accordance with one embodiment of the present invention, in which, at various times and for various bidders, bidding may be intermediated by proxy agents or bids may be submitted directly by bidders. The process starts with step 152, in which memory locations of a computer are initialized. In one preferred embodiment, the appropriate memory locations of the auction server are initialized with information such as the items in the auction, the auction schedule, the minimum opening bids or reserve prices, a list of bidder ID's, a list of passwords, and a list of constraints on bids. In step 154, a computer outputs the current auction information (if any) available to bidders, possibly including, for example, the minimum opening bids or current high bids, and whether one or more bidders have been given a "last call" for making changes to their flexible bid information. In one preferred embodiment, the auction server outputs the auction information through its network interface and transmits it via the network. The bidder and auctioneer computers or terminals then receive the auction information through their network interfaces and display the information to bidders and the auctioneer through their user interfaces. In step 156, changes to the flexible bid information for given bidders are entered into computer databases or memory, provided that changes are permitted for the respective bidders (and provided that the bidders wish to make changes to their flexible bid information). This step is illustrated in greater detail in FIGS. 6a and 6b. In one preferred embodiment, a bidder inputs his (or her) flexible bid information through the user interface of the bidder computer or terminal, which then (if necessary) outputs the auction information through its network interface and transmits it via the network. The proxy agent corresponding to that bidder (if located on another computer) then receives the flexible bid information through its network interface for use in the next step. In step 158, the proxy agents compute new bids, based on the flexible bid information and the current auction information, to submit on behalf of their respective bidders, and the proxy agents submit new bids (if any) in the auction process on behalf of their respective bidders. This step is illustrated in greater detail in FIGS. 7a and 7b. In one preferred embodiment, the proxy agents reside on the auction server, so that they can submit new package bids without making use of the network. In a second preferred embodiment, the proxy agents reside on the bidder computers or terminals, in which case the bidder computers or terminals output the submitted new bids through their network interfaces and transmit them via the network. The auction server then receives the submitted new bids through its network interface for use in the next step. In step 160, bidders directly submit new bids (if permitted for a given bidder) without any intermediation by a proxy agent. In one preferred embodiment, a bidder inputs his (or her) package bid(s) through the user interface of the bidder computer or terminal, which then outputs the bid(s) through its network interface and transmits it via the network to the auction server. In step 162, a computer applies constraints, if any, to the new bids submitted by the proxy agents or directly by bidders, and enters only those bids that satisfy said constraints. This process is illustrated in greater detail in FIG. 9 and in FIGS. 11a, b and c. In one preferred embodiment, the constraints are applied at the auction server, although they may also easily be applied at the bidder computers or terminals, or at other computers.

In step 164, a computer calculates the provisionally-winning bids and provisional revenues, based on the new bids entered and the previous bids that remain in effect. In one preferred embodiment, all bids take the form of package bids, all bids that are entered at any time during the auction remain in effect for the duration of the auction, and all bids that are entered by or on behalf of a given bidder are treated as being mutually exclusive. Therefore, in this preferred embodiment, a computer (which may be the auction server or some other computer) calculates a solution to the following problem of optimizing bid revenues over compatible bids:

Find an n-tuple, $\{(S_1,P_1), \ldots, (S_n,P_n)\}$, of bids, one from each bidder i (i=1, ..., n), which maximizes the sum $P_1 + \ldots + P_n$, subject to the constraint that the $S_i$ are disjoint subsets of $\Omega$. Stated differently, for every i (i= 1, ..., n) and for every j≠i (j=1, ..., n), it is required that $(S_i,P_i)$ be a new or previous bid entered on behalf of bidder i, $(S_j,P_j)$ be a new or previous bid entered on behalf of bidder j, and $S_i \cap S_j = \emptyset$, i.e. no item of set $S_i$ is a member of the set $S_j$ if i≠j.

In performing the above calculation, the computer may take as implicit the existence of a zero bid, i.e. the pair $(\emptyset,0)$, associated with each bidder. The calculated n-tuple, $\{(S_1, P_1), \ldots, (S_n,P_n)\}$, of bids solving the above optimization problem is defined to be the provisionally-winning bids; and the calculated sum $P_1 + \ldots + P_n$ is defined to be the provisional revenues. However, in other preferred embodiments: (a) only some of the bids that were previously entered into the auction remain in effect for subsequent calculations of the provisionally-winning bids; (b) not all bids that are entered by or on behalf of a given bidder are treated as being mutually exclusive, so that the optimization problem may allow two or more bids by a single bidder to be selected; and (c) the auction may be an auction to buy, a procurement auction or a reverse auction (rather than an auction to sell), so that the optimization problem for calculating provisionally-winning bids may involve the minimization of payments associated with selected bids, or some other optimization problem, rather than the maximization problem stated above. Also, in many preferred embodiments, a computer stores the calculated provisionally-winning bids and provisional revenues in memory or on a data storage device for future use. In step 166, a computer determines whether the auction should continue. One exemplary way to perform step 166 is for the auction server to compare the current provisional revenues with a function of the provisional revenues obtained in previous iteration(s) of the loop, and to continue the auction if and only if the current provisional revenues exceed the function of the provisional revenues obtained in previous iteration(s). However, this particular stopping rule is only exemplary, and many other embodiments are also possible: for example, the rule applied may be different, it may be performed on a different computer, and the computer may only produce a recommendation of stopping the auction which is then transmitted to the auctioneer computer or terminal for final approval.

If the auction should continue, the process goes to step 168, where it is determined whether one or more bidders should be given a "last call" to change their flexible bid information. This step is illustrated in greater detail in FIGS. 8a and 8b. FIGS. 8a and 8b are two examples of preferred embodiments in which the auction server recommends a decision on whether bidders should be given a "last call" and transmits this recommendation via the network to the auctioneer computer or terminal. The auctioneer computer or terminal then receives the recommendation through its network interface and displays it to the auctioneer through its user interface. The auctioneer either approves or modifies the recommendation through the user interface of the auctioneer terminal, which then outputs the final decision through its network interface and transmits it via the network. The auction server then receives the final decision through its network interface for use in subsequent steps. The process then goes to step 170, in which the state of the auction system and the current auction information are updated. In one preferred embodiment, the auction server: adds the newly-submitted bids that were entered in step 162 to the list of previous bids that remain in effect; replaces the previous provisionally-winning bids with the provisionally-winning bids that were calculated in the most recent execution of step 164; and replaces the previous provisional revenues with the provisional revenues that were calculated in the most recent execution of step 164. In a second preferred embodiment, the auction server additionally deletes some of the bids from the list of previous bids that remain in effect, in order to reduce the size of the problem that the computer will face at the next iteration of step 164. This step is illustrated in greater detail in FIG. 10*a*. The process then loops to step 154.

If the auction should not continue, the process goes to step 172, in which a computer outputs a final message, including the allocation of items among bidders and the payments of the bidders. In one preferred embodiment, the auction server recalls its calculation of the provisionally-winning bids at the most recent execution of step 164 and outputs this in a final message as the determined allocation of items among bidders and the payments of the bidders. The auction server outputs this final message through its network interface and transmits it via the network. The bidder and auctioneer computers or terminals then receive the final message through their network interfaces and display the information to bidders and the auctioneer through their user interfaces. The process then ends.

Flow Diagram of Augmented Dynamic Package-Bidding Auction Process

In dynamic package-bidding auction processes in the prior art, a bid comprises a package of items and an associated price for the package. That is, bidders merely submit bids comprising pairs, (S, P), where $S \subset \Omega$ is a subset of the set of all items being auctioned and P is a price at which the bidder is offering to transact for the subset S. There is no scope for bidders to include other information, beyond S and P, in their bids. Furthermore, the provisional revenues are computed simply by optimizing an objective function comprising the sum of the prices in the selected bids, subject to a selection constraint that the bids are compatible (e.g., at most one bid is selected for each item being auctioned). There is no scope for the auction computer to include, in the objective function being optimized or in the selection constraint being applied, the other information that might be explicitly included in bids. Nor is there scope for the auction computer to include, in the objective function being optimized or in the selection constraint being applied, bidder-specific attributes that might be implicitly included in bids (via the identity of the qualified bidder submitting a given bid).

The limitations in the prior art, as summarized in the previous paragraph, limit the applicability and usefulness of dynamic package-bidding auction processes. Conversely, an "augmented dynamic package-bidding auction process," in which any of the limitations summarized in the previous paragraph (or combinations thereof) are eliminated, offers a myriad of new and useful applications. An augmented dynamic package-bidding auction process is thus defined to be any dynamic auction in which package bids are allowed, which includes one or more of the following features: bidders may include other information; beyond a package of items and an associated price for the package, in their bids; the auction computer may include, in the objective function being optimized or in the selection constraint being applied, the other information that might be explicitly included in bids; and the auction computer may include, in the objective function being optimized or in the selection constraint being applied, bidder-specific attributes that might be implicitly included in bids (via the identity of the qualified bidder submitting a given bid). An augmented dynamic package-bidding auction process may yield efficient outcomes, taking the other information and bidder-specific attributes into account.

The following are some examples of the "other information" that might explicitly be included in bids, to useful effect:
- The terms of payment (e.g., cash-on-delivery versus payment in 30 days)
- The use to which the auctioned items will be put, in a government auction
- The quality of the items being provided, in a procurement auction
- The delivery times of the items being provided, in a procurement auction The following are some examples of the "bidder-specific information" that might implicitly be taken to be included in bids of qualified bidders, to useful effect:
- The length of time that the bidder has been in business
- The credit-rating of the bidder
- The location of the bidder
- The status of the bidder as a minority-owned business or a small business
- The status of the bidder as a domestic or foreign firm The following are some examples of how the "other information" or "bidder-specific information" might be included, in the objective function being optimized, to useful effect:
- A higher rating may be assigned to higher-quality items being provided
- A higher rating may be assigned to a selection of bids which includes at least two provisional winners that are minority-owned businesses or small businesses
- A higher rating may be assigned to a selection of bids for which at least 50% of each type of good is available for delivery within one week The following are some examples of how the "other information" or "bidder-specific information" might be included, in the selection constraint, to useful effect:
- A selection constraint may be applied that at least one-third of each type of good be provided by an alternate supplier (second-sourcing)
- A selection constraint may be applied requiring that at least two provisional winners be minority-owned businesses or small businesses
- A selection constraint may be applied requiring that at least 50% of each type of good be available for delivery within one week An augmented dynamic package-bidding auction process may be implemented on a computer in a system without proxy bidding (according to FIG. 5*a*), with mandatory proxy bidding (according to FIG. 5*b*), or with voluntary proxy bidding (according to FIG. 5*c*). The flow process will only be described in detail with reference to FIG. 5*a*, but the implementation according to FIGS. 5*b* and *c* will then be clear to anybody skilled in the art.

FIG. 5*a* is a flow diagram of an auction in accordance with one embodiment of the present invention, in which proxy bidding is not used. The process starts as before with step 102, in which memory locations of a computer are initialized. The initialization may now include bidder-specific attributes, $A_i$ for each bidder i, that may be used in subsequent calculations. As before, in step 104, a computer outputs the current auction information (if any) available to bidders, possibly including, for example, the minimum opening bids or current high bids. In step 106, bidders submit new bids at a computer. In many preferred embodiments, bids comprise triplets, (S, P, R), where S∩Ω is a subset of the set of all items being auctioned, P is a price at which the bidder is offering to transact for the subset S, and R is a scalar or vector comprising other information, that is, any information other than the subset S or price P that may be explicitly included in a bid. Stated differently, a bid comprises a package of items, an associated price for the package, and other information (e.g., the terms of payment or the quality of the items being provided). As before, in step 108, a computer applies constraints, if any, to the new bids submitted by bidders, and enters only those bids that satisfy said constraints.

In step 110, a computer calculates the provisionally-winning bids and provisional objective, based on the new bids entered and the previous bids that remain "in effect" (i.e., the previous bids that remain active, or remain subject to being selected as winning bids). In one preferred embodiment, all bids take the form of triplets (S, P, R), all bids that are entered at any time during the auction remain in effect for the duration of the auction, and all bids that are entered for a given bidder are treated as being mutually exclusive. If the bid (S, P, R) was submitted by bidder i, the auction computer may append the implied bidder-specific attributes, $A_i$, to the explicit components of the bid, creating a quadruplet (S, P, R, $A_i$). Therefore, in this preferred embodiment, a computer (which may be the auction server or some other computer) calculates a solution to the following problem of optimizing an objective function, $f$ subject to selection constraints, $g \leq 0$:

find an n-tuple, $\{(S_1,P_1,R_1), \ldots, (S_n,P_n,R_n)\}$, of bids, one from each bidder i (i=1, ..., n), which maximizes the objective function:

$$f((S_1,P_1,R_1,A_1), \ldots, (S_n,P_n,R_n,A_n)),$$

subject to the selection constraints:

$$g((S_1,P_1,R_1,A_1), \ldots, (S_n,P_n,R_n,A_n)) \leq 0,$$

where g may be any vector-valued function (so that the notation for selection constraints $g \leq 0$ may effectively represent a multiplicity of constraints).

In performing the above calculation, the computer may take as implicit the existence of a zero bid, i.e. the triplet (Ø,0,0), associated with each bidder. In some preferred embodiments, the objective function $f(S_1,P_1,R_1,A_1), \ldots, (S_n,P_n,R_n,A_n))$ will include a term for the total revenues $P_1+ \ldots +P_n$ associated with the selected bids, but they may also include some additional terms, reflecting the "other information" $R_i$ and the "bidder-specific attributes" $A_i$, that may be added to, multiplied by, or combined in any other way with the total revenues. In some preferred embodiments, the selection constraints $g((S_1,P_1,R_1,A_1), \ldots, (S_n,P_n,R_n,A_n)) \leq 0$ will include constraints reflecting that the selected bids must be compatible (i.e., $S_i \cap S_j = \emptyset$, if $i \neq j$, that is, no item of set $S_i$ is a member of the set $S_j$ if $i \neq j$), but they may also include some additional constraints reflecting the "other information" $R_i$ and the "bidder-specific attributes" $A_i$, such additional constraints applied in addition to the bid-compatibility constraints.

The calculated n-tuple, $\{(S_1,P_1,R_1), \ldots, (S_n,P_n,R_n)\}$, of bids solving the above optimization problem is defined to be the provisionally-winning bids; and the calculated $f((S_1,P_1,R_1,A_1), \ldots, (S_n,P_n,R_n,A_n))$ is defined to be the provisional objective. However, in other preferred embodiments, the above optimization problem may be modified, for example, as follows: (a) only some of the bids that were previously entered into the auction remain in effect for subsequent calculations of the provisionally-winning bids; (b) not all bids that are entered by a given bidder are treated as being mutually exclusive, so that the optimization problem may allow two or more bids by a single bidder to be selected; and (c) the auction may be an auction to buy, a procurement auction or a reverse auction (rather than an auction to sell), so that the optimization problem for calculating provisionally-winning bids may involve the minimization of payments associated with selected bids, or some other optimization problem, rather than the maximization problem stated above. Also, in many preferred embodiments, a computer stores the calculated provisionally-winning bids and provisional objective in memory or on a data storage device for future use. As before, in step 112, a computer determines whether the auction should continue. One exemplary way to perform step 112 is for the auction server to compare the current provisional objective with a function of the provisional objective obtained in previous iteration(s) of the loop, and to continue the auction if and only if the current provisional objective exceed the function of the provisional objective obtained in previous iteration(s). However, this particular stopping rule is only exemplary, and many other embodiments are also possible: for example, the rule applied may be different, it may be performed on a different computer, and the computer may only produce a recommendation of stopping the auction which is then transmitted to the auctioneer computer or terminal for final approval.

If the auction should continue, the process goes as before to step 114, in which the state of the auction system and the current auction information are updated. In one preferred embodiment, the auction server: adds the newly-submitted bids that were entered in step 108 to the list of previous bids that remain in effect; replaces the previous provisionally-winning bids with the provisionally-winning bids that were calculated in the most recent execution of step 110; and replaces the previous provisional objective with the provisional objective that was calculated in the most recent execution of step 110. In a second preferred embodiment, the auction server additionally deletes some of the bids from the list of previous bids that remain in effect, in order to reduce the size of the problem that the computer will face at the next iteration of step 110. This step is illustrated in greater detail in FIG. 10a. The process then loops, as before, to step 104.

If the auction should not continue, the process goes as before to step 116, in which a computer outputs a final message, including the allocation of items among bidders and the payments of the bidders. In one preferred embodiment, the auction server recalls its calculation of the provisionally-winning bids at the most recent execution of step 110 and outputs this in a final message as the determined allocation of items among bidders and the payments of the bidders. The auction server outputs this final message through its network interface and transmits it via the network. The bidder and auctioneer computers or terminals then receive the final message through their network interfaces and display the information to bidders and the auctioneer through their user interfaces. The process then ends.

Detail Elements Concerning Bidders Changing Flexible Bid Information

Figure 6A:
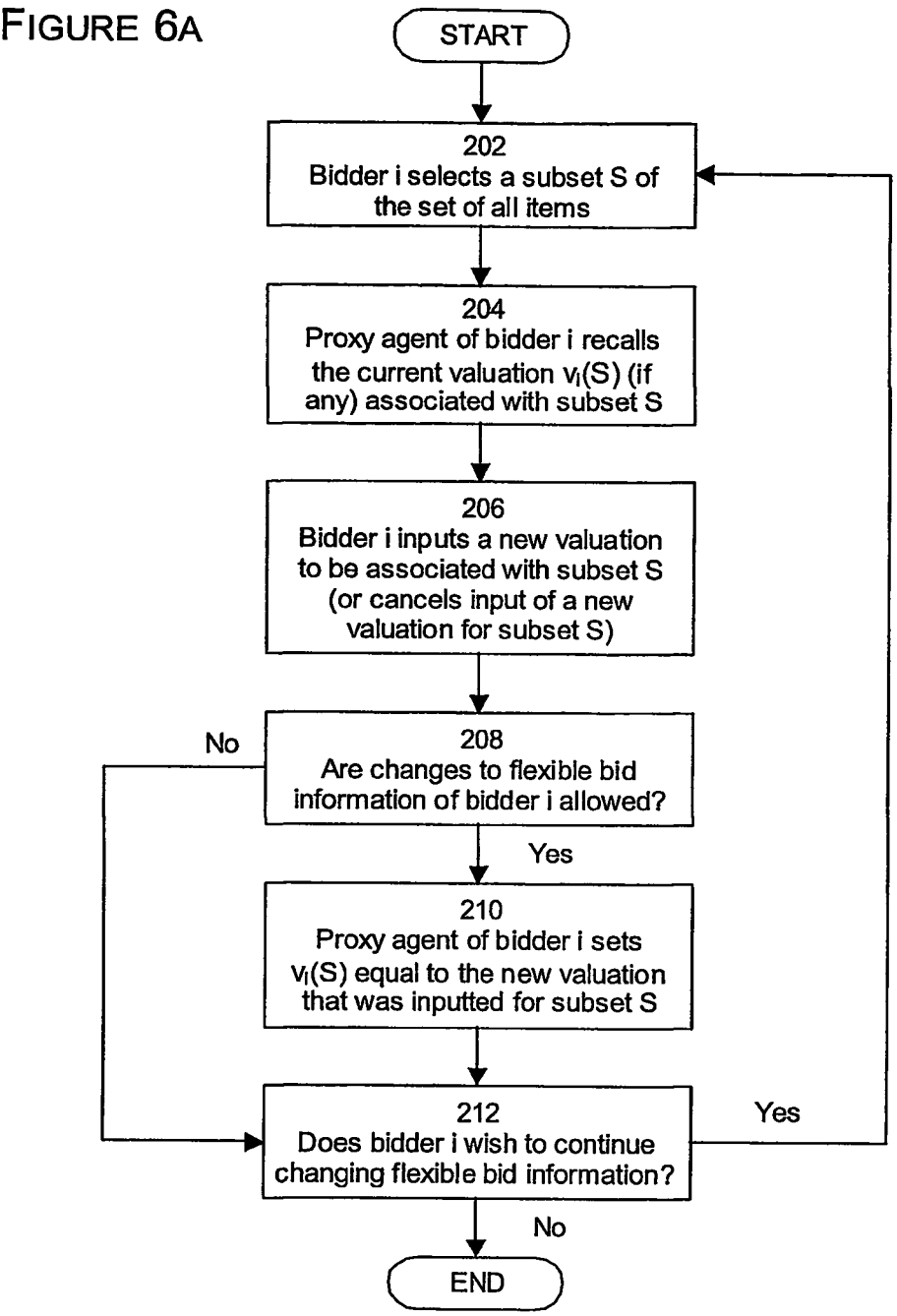
FIGS. 6a and 6b are flow diagrams illustrating, in greater detail, elements of the flow diagrams of FIGS. 5b and 5c.

FIG. 6a is a flow diagram illustrating an exemplary process by which a bidder may enter flexible bid information into a computer database or change existing flexible bid information. Thus, FIG. 6a illustrates, in greater detail, step 126 of FIG. 5b and step 156 of FIG. 5c. The flexible bid information of FIG. 6a concerns the bidder's valuations for various items in the auction.

The process starts with step 202, in which bidder i selects a subset S∩Ω of the set of all items being auctioned. In one preferred embodiment, bidder i enters his (or her) selection of subset S through the user interface of his bidder computer or terminal, which then (if necessary) outputs his selection through its network interface and transmits it via the network. The proxy agent of bidder i (if located on another computer) then receives the selection of subset S through its network interface for use in the next step. In step 204, the proxy agent of bidder i recalls the current valuation, $v_i(S)$ (if any), currently associated with subset S. In one preferred embodiment, the proxy agent of bidder i queries its database to obtain the current valuation $v_i(S)$, and then (if necessary) outputs the current valuation $v_i(S)$ through its network interface and transmits it via the network. The bidder computer or terminal of bidder i then receives the current valuation $v_i(S)$ through its network interface (if the proxy agent is located on a different computer) and displays it on its user interface. In step 206, bidder i inputs a new valuation to be associated with subset S (or cancels input of a new valuation for subset S). As before, in one preferred embodiment, bidder i enters the new valuation through the user interface of his bidder computer or terminal, which then (if necessary) outputs the new valuation through its network interface and transmits it via the network. The proxy agent of bidder i (if located on another computer) then receives the new valuation through its network interface for use in the following steps. In step 208, a computer determines whether changes to the flexible bid information of bidder i are allowed. In one preferred embodiment, the proxy agent of bidder i merely refers to a variable located in the memory of the same computer on which the proxy agent of bidder i resides. If this variable equals one, then changes to the flexible bid information of bidder i are allowed; and if this variable equals zero, then changes to the flexible bid information of bidder i are not allowed. If changes to the flexible bid information of bidder i are allowed, the process continues with step 210, where the proxy agent of bidder i sets $v_i(S)$ equal to the new valuation that was inputted for subset S in step 206. If changes to the flexible bid information are not allowed, or following step 210, the process goes to step 212, in which it is determined whether bidder i wishes to continue changing his flexible bid information. In one preferred embodiment, the bidder computer or terminal of bidder i displays this as a question through its user interface, bidder i responds to this question through its user interface, and bidder i's response is transmitted to any other components of the system requiring his response through the network. If bidder i wishes to continue changing his flexible bid information, the process loops back to step 202; otherwise, the process ends.

Figure 6B:
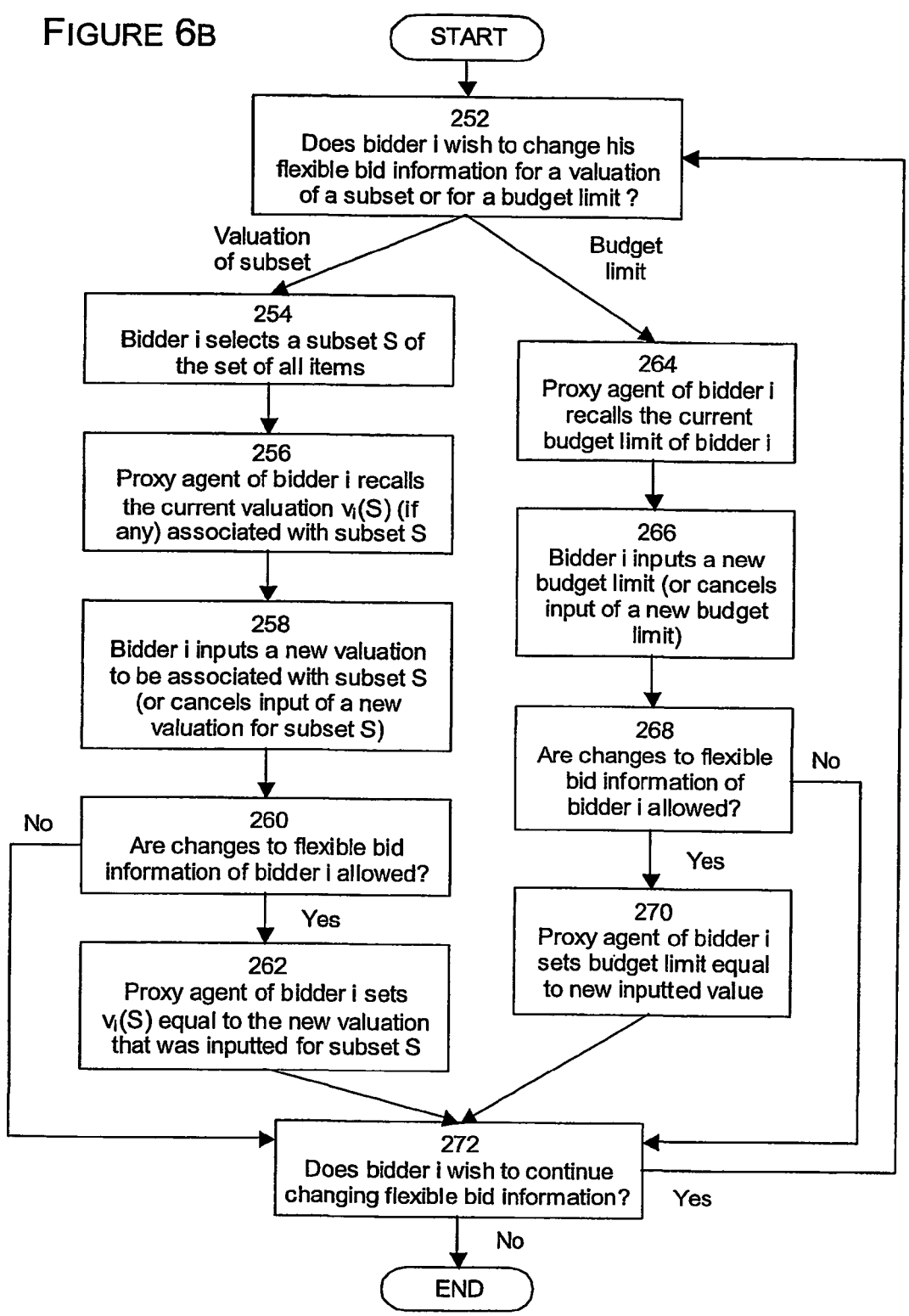

FIG. 6b is a flow diagram illustrating another exemplary process by which a bidder may enter flexible bid information into a computer database or change his existing flexible bid information. Thus, FIG. 6b illustrates, in greater detail, step 126 of FIG. 5b and step 156 of FIG. 5c. The flexible bid information of FIG. 6b may concern the bidder's valuations for various items in the auction or may concern a budget limit or parameter.

The process starts with step 252, in which bidder i indicates whether he wishes to change his valuation of a subset, or whether he wishes to change his budget limit or parameter. If bidder i wishes to change his flexible bid information for a valuation of a subset, then the process goes to step 254, in which bidder i selects a subset S∩Ω of the set of all items being auctioned. In one preferred embodiment, bidder i enters his selection of subset S through the user interface of his bidder computer or terminal, which then (if necessary) outputs his selection through its network interface and transmits it via the network. The proxy agent of bidder i (if located on another computer) then receives the selection of subset S through its network interface for use in the next step. In step 256, the proxy agent of bidder i recalls the current valuation, $v_i(S)$ (if any), currently associated with subset S. In one preferred embodiment, the proxy agent of bidder i queries its database to obtain the current valuation $v_i(S)$, and then (if necessary) outputs the current valuation $v_i(S)$ through its network interface and transmits it via the network. The bidder computer or terminal of bidder i then receives the current valuation $v_i(S)$ through its network interface (if the proxy agent is located on a different computer) and displays it on its user interface. In step 258, bidder i inputs a new valuation to be associated with subset S (or cancels input of a new valuation for subset S). As before, in one preferred embodiment, bidder i enters the new valuation through the user interface of his bidder computer or terminal, which then (if necessary) outputs the new valuation through its network interface and transmits it via the network. The proxy agent of bidder i (if located on another computer) then receives the new valuation through its network interface for use in the following steps. In step 260, a computer determines whether changes to the flexible bid information of bidder i are allowed. In one preferred embodiment, the proxy agent of bidder i merely refers to a variable located in the memory of the same computer on which the proxy agent of bidder i resides. If this variable equals one, then changes to the flexible bid information of bidder i are allowed; and if this variable equals zero, then changes to the flexible bid information of bidder i are not allowed. If changes to the flexible bid information of bidder i are allowed, the process continues with step 262, where the proxy agent of bidder i sets $v_i(S)$ equal to the new valuation that was inputted for subset S in step 258. If changes to the flexible bid information are not allowed, or following step 262, the process goes to step 272.

If bidder i wishes to change his flexible bid information for a budget limit or parameter, then the process goes to step 264, in which the proxy agent of bidder i recalls the current budget limit or parameter. In one preferred embodiment, the proxy agent of bidder i queries its database to obtain the current budget limit or parameter, and then (if necessary) outputs the current budget limit or parameter through its network interface and transmits it via the network. The bidder computer or terminal of bidder i then receives the current budget limit or parameter through its network interface (if the proxy agent is located on a different computer) and displays it on its user interface. In step 266, bidder i inputs a new budget limit or parameter (or cancels input of a new budget limit or parameter). In one preferred embodiment, bidder i enters the new budget limit or parameter through the user interface of his bidder computer or terminal, which then (if necessary) outputs the new budget limit or parameter through its network interface and transmits it via the network. The proxy agent of bidder i (if located on another computer) then receives the new budget limit or parameter through its network interface for use in the following steps. In step 268, a computer determines whether changes to the flexible bid information of bidder i are allowed. In one preferred embodiment, the proxy agent of bidder i merely refers to a variable located in the memory of the same computer on which the proxy agent of bidder i resides. If this variable equals one, then changes to the flexible bid information of bidder i are allowed; and if this variable equals zero, then changes to the flexible bid information of bidder i are not allowed. If changes to the flexible bid information of bidder i are allowed, the process continues with step 270, where the proxy agent of bidder i sets the budget limit or parameter equal to the new value that was inputted in step 266. If changes to the flexible bid information are not allowed, or following step 270, the process goes to step 272.

In step 272, it is determined whether bidder i wishes to continue changing his flexible bid information. In one preferred embodiment, the bidder computer or terminal of bidder i displays this as a question through its user interface, bidder i responds to this question through its user interface, and bidder i's response is transmitted to any other components of the system requiring his response through the network. If bidder i wishes to continue changing his flexible bid information, the process loops back to step 252; otherwise, the process ends.

Detail Elements Concerning Bid Submission by Proxy Agents

Figure 7A:
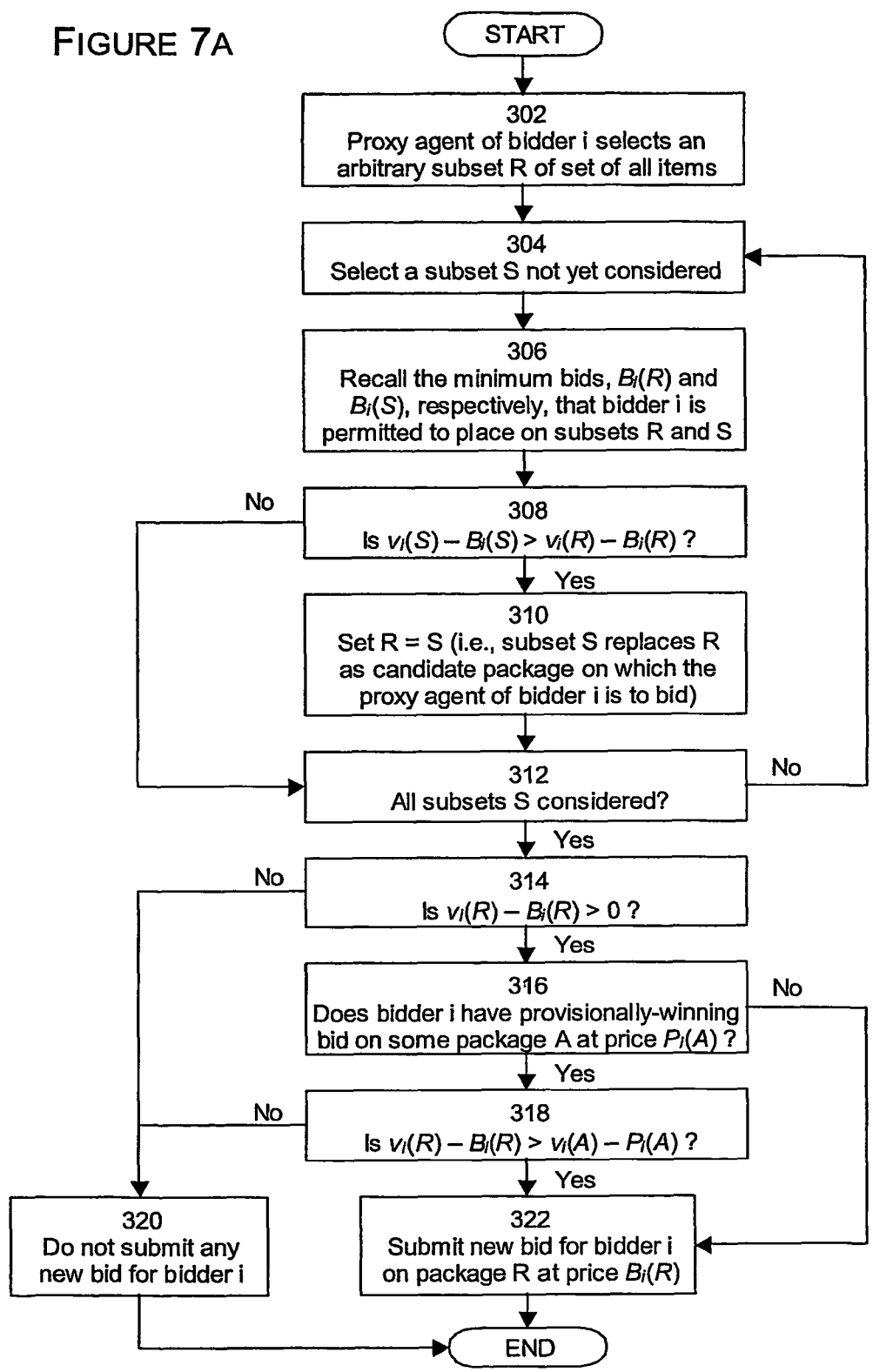

FIG. 7a is a flow diagram illustrating an exemplary process by which a proxy agent may submit new bids based on a bidder's flexible bid information and the current auction information. Thus, FIG. 7a illustrates, in greater detail, step 128 of FIG. 5b and step 158 of FIG. 5c. The flexible bid information of FIG. 7a concerns the bidder's valuations for various items in the auction.

The process starts with step 302, in which the proxy agent of bidder i selects an arbitrary subset $R \cap \Omega$ of the set of all items being auctioned. Subset R is treated as the candidate package on which bidder i is to bid (until a better subset is found). The process goes to step 304, in which the proxy agent of bidder i selects a subset S c n that has not yet been considered. At step 306, the proxy agent recalls the minimum bids, $B_i(R)$ and $B_i(S)$, that bidder i is permitted to place on subsets R and S, respectively. In one preferred embodiment, the proxy agent of bidder i queries a database as to the values of $B_i(R)$ and $B_i(S)$. (If the proxy agent of bidder i and the database containing the values of $B_i(R)$ and $B_i(S)$ are located on different computers, then this communication occurs through the network interfaces of the respective computers and via the network.) In another preferred embodiment, the proxy agent of bidder i outputs the query through the network interface of the computer on which it is located and transmits the query via the network. The auction server then receives the query through its network interface (if located on another computer). The auction server then determines the values of $B_i(R)$ and $B_i(S)$ by calculations on data in the state of the auction system. The auction server then outputs the values of $B_i(R)$ and $B_i(S)$ through its network interface and transmits them via the network (if necessary). The proxy agent of bidder i then receives the values of $B_i(R)$ and $B_i(S)$ through the network interface of the computer on which it is located (if the proxy agent is located on a different computer), making it available for later steps. One exemplary calculation for determining the values of $B_i(R)$ and $B_i(S)$ is for the auction server to take the previous high prices bid for R and S and to multiply each by a positive constant. A second exemplary calculation for determining the value of $B_i(R)$ is for the auction server to solve the following problem: what is the minimum bid (R, P) that could be submitted by bidder i such that, if provisionally-winning bids were calculated (see step 132 or 164, above) with the extra bid (R, P) included, then (R, P) would be a provisionally-winning bid? (An analogous calculation would then determine $B_i(S)$.) The process then goes to step 308, in which a computer determines whether $v_i(S)-B_i(S)>v_i(R)-B_i(R)$. In one preferred embodiment, the proxy agent of bidder i merely refers to variables $v_i(R)$ and $v_i(S)$, located in the memory of the same computer on which the proxy agent of bidder i resides, and performs this determination. If $v_i(S)-B_i(S)>v_i(R)-B_i(R)$, then the process goes to step 310, where a computer sets R=S (i.e., subset S replaces subset R as the candidate package on which the proxy agent of bidder i is to bid). If $v_i(S)-B_i(S) \leq v_i(R)-B_i(R)$, or after step 310, the process continues to step 312, in which a computer determines whether all subsets $S \cap \Omega$ have been considered. If not all subsets $S \cap \Omega$ have been considered, the process loops back to step 304.

If all subsets $S \cap \Omega$ have been considered, the process goes to step 314, in which a computer determines whether $v_i(R)-B_i(R)>0$, that is, whether bidder i would receive positive surplus from a winning bid of (R, $B_i(R)$). If $v_i(R)-B_i(R)$ is determined not to be greater than zero, the process jumps to step 320, in which the proxy agent does not place any new bids on behalf of bidder i, and the process ends. If $v_i(R)-B_i(R)$ is determined to be greater than zero, the process continues to step 316, in which the proxy agent of bidder i determines whether bidder i currently has a provisionally-winning bid on some package A at price $P_i(A)$. In one preferred embodiment, the proxy agent of bidder i merely refers to variables, representing the current provisionally-winning bids of bidder i, located in the memory of the same computer on which the proxy agent of bidder i resides, and performs this determination. If bidder i does not currently have a provisionally-winning bid, the process skips to step 322. If bidder i does currently have a provisionally-winning bid on some package A at price $P_i(A)$, the process goes to step 318, in which a computer determines whether $v_i(R)-B_i(R)>v_i(A)-P_i(A)$, that is, whether bidder i would receive greater positive surplus from a winning bid of (R, $B_i(R)$) than from a winning bid of (A, $P_i(A)$). If $v_i(R)-B_i(R)$ is determined not to be greater than $v_i(A)-P_i(A)$, the process continues to step 320, in which the proxy agent does not place any new bids on behalf of bidder i, and the process ends. If $v_i(R)-B_i(R)$ is determined to be greater than $v_i(A)-P_i(A)$, the process continues to step 322.

At step 322, the proxy agent submits a new bid on behalf of bidder i for package R at price $B_i(R)$. In one preferred embodiment, the proxy agent of bidder i outputs the bid (R, $B_i(R)$) through the network interface of the computer on which it is located and transmits the submitted bid via the network. The auction server then receives the submitted bid through its network interface (if located on another computer), and utilizes the submitted bid in subsequent steps (for example, step 130 or step 162). After step 322, the process ends.

In another embodiment of the present invention, FIG. 7a may be modified so that the proxy agent of bidder i submits two or more new bids, if bidder i would be indifferent among these bids. Step 308 would be expanded so that a computer determines whether $v_i(S)-B_i(S)=v_i(R)-B_i(R)$. In that event, step 310 would maintain both R and S as candidate packages on which the proxy agent of bidder i is to bid, and step 322 would have the proxy agent submit bids both of (R, $B_i(R)$) and (S, $B_i(S)$).

In other embodiments of the present invention, FIG. 7a is easily modified so that the proxy agent of bidder i bids on behalf of bidder i in a reverse auction or procurement auction. In one such embodiment, Step 306 is modified so that the bids, $B_i(R)$ and $B_i(S)$, are maximum bids that bidder i is permitted to place on subsets R and S, respectively. Step 308 is modified so that a computer determines whether $B_i(S)-v_i(S)>B_i(R)-v_i(R)$, since $B_i(R)$ and $B_i(S)$ now represent payments that the bidder is willing to accept, while $v_i(R)$ and $v_i(S)$ now represent costs of the bidder. Step 314 is modified so that a computer determines whether $B_i(R)-v_i(R)>0$, since this now determines whether bidder i would receive positive surplus from a winning bid of $(R, B_i(R))$. Step 318 is modified so that a computer determines whether $B_i(R)-v_i(R)>B_i(A)-v_i(A)$, since this now determines whether bidder i would receive greater positive surplus from a winning bid of $(R, B_i(R))$ than from a winning bid of $(A, P_i(A))$.

FIG. 7b is a flow diagram illustrating another exemplary process by which a proxy agent may submit new bids based on a bidder's flexible bid information and the current auction information. Thus, FIG. 7b illustrates, in greater detail, step 128 of FIG. 5b and step 158 of FIG. 5c. The flexible bid information of FIG. 7b concerns the bidder's valuations for various items in the auction and a budget limit or parameter.

The process starts with step 352, in which the proxy agent of bidder i selects a subset $R \cap \Omega$ of the set of all items being auctioned such that the minimum bid, $B_i(R)$, that bidder i is permitted to place on subset R is less than or equal to the budget limit or parameter of bidder i. (The proxy agent of bidder i recalls the minimum bid for subset R in the same way as described in step 306 above. If no subset R exists such that the minimum bid, $B_i(R)$, is within bidder i's budget limit or parameter, then the process jumps all the way to step 372 and does not submit any new bid for bidder i.) Subset R is treated as the candidate package on which bidder i is to bid (until a better subset is found). The process goes to step 354, in which the proxy agent of bidder i selects a subset $S \cap \Omega$ that has not yet been considered. At step 356, the proxy agent recalls the minimum bids, $B_i(R)$ and $B_i(S)$, that bidder i is permitted to place on subsets R and S, respectively. In one preferred embodiment, the proxy agent of bidder i queries a database as to the values of $B_i(R)$ and $B_i(S)$. (If the proxy agent of bidder i and the database containing the values of $B_i(R)$ and $B_i(S)$ are located on different computers, then this communication occurs through the network interfaces of the respective computers and via the network.) In another preferred embodiment, the proxy agent of bidder i outputs the query through the network interface of the computer on which it is located and transmits the query via the network. The auction server then receives the query through its network interface (if located on another computer). The auction server then determines the values of $B_i(R)$ and $B_i(S)$ by calculations on data in the state of the auction system. The auction server then outputs the values of $B_i(R)$ and $B_i(S)$ through its network interface and transmits them via the network (if necessary). The proxy agent of bidder i then receives the values of $B_i(R)$ and $B_i(S)$ through the network interface of the computer on which it is located (if the proxy agent is located on a different computer), making it available for later steps. One exemplary calculation for determining the values of $B_i(R)$ and $B_i(S)$ is for the auction server to take the previous high prices bid for R and S and to multiply each by a positive constant. A second exemplary calculation for determining the value of $B_i(R)$ is for the auction server to solve the following problem: what is the minimum bid (R, P) that could be submitted by bidder i such that, if provisionally-winning bids were calculated (see step 132 or 164, above) with the extra bid (R, P) included, then (R, P) would be a provisionally-winning bid? (An analogous calculation would then determine $B_i(S)$.)

The process then goes to step 358, in which a computer determines whether $B_i(S)$ is less than or equal to the budget limit or parameter of bidder i. If $B_i(S)$ is greater than bidder i's budget limit or parameter, then the process skips to step 364. If $B_i(S)$ is less than or equal to bidder i's budget limit or parameter, then the process continues to step 360, where a computer determines whether $v_i(S)-B_i(S)>v_i(R)-B_i(R)$. In one preferred embodiment, the proxy agent of bidder i merely refers to variables $v_i(R)$ and $v_i(S)$, located in the memory of the same computer on which the proxy agent of bidder i resides, and performs this determination. If $v_i(S)-B_i(S) \leq v_i(R)-B_i(R)$, then the process skips to step 364. If $v_i(S)-B_i(S) > v_i(R)-B_i(R)$, then the process continues with step 362, where a computer sets R=S (i.e., subset S replaces subset R as the candidate package on which the proxy agent of bidder i is to bid), and then proceeds to step 364. At step 364, a computer determines whether all subsets $S \cap \Omega$ have been considered. If not all subsets $S \cap \Omega$ have been considered, the process loops back to step 354.

If all subsets $S \cap \Omega$ have been considered, the process goes to step 366, in which a computer determines whether $v_i(R)-B_i(R)>0$, that is, whether bidder i would receive positive surplus from a winning bid of $(R, B_i(R))$. If $v_i(R)-B_i(R)$ is determined not to be greater than zero, the process jumps to step 372, in which the proxy agent does not place any new bids on behalf of bidder i, and the process ends. If $v_i(R)-B_i(R)$ is determined to be greater than zero, the process continues to step 368, in which the proxy agent of bidder i determines whether bidder i currently has a provisionally-winning bid on some package A at price $P_i(A)$. In one preferred embodiment, the proxy agent of bidder i merely refers to variables, representing the current provisionally-winning bids of bidder i, located in the memory of the same computer on which the proxy agent of bidder i resides, and performs this determination. If bidder i does not currently have a provisionally-winning bid, the process skips to step 374. If bidder i does currently have a provisionally-winning bid on some package A at price $P_i(A)$, the process goes to step 370, in which a computer determines whether $v_i(R)-B_i(R)>v_i(A)-P_i(A)$, that is, whether bidder i would receive greater positive surplus from a winning bid of $(R, B_i(R))$ than from a winning bid of $(A, P_i(A))$. If $v_i(R)-B_i(R)$ is determined not to be greater than $v_i(A)-P_i(A)$, the process continues to step 372, in which the proxy agent does not place any new bids on behalf of bidder i, and the process ends. If $v_i(R)-B_i(R)$ is determined to be greater than $v_i(A)-P_i(A)$, the process continues to step 374.

At step 374, the proxy agent submits a new bid on behalf of bidder i for package R at price $B_i(R)$. In one preferred embodiment, the proxy agent of bidder i outputs the bid $(R, B_i(R))$ through the network interface of the computer on which it is located and transmits the submitted bid via the network. The auction server then receives the submitted bid through its network interface (if located on another computer), and utilizes the submitted bid in subsequent steps (for example, step 130 or step 162). After step 374, the process ends.

In another embodiment of the present invention, FIG. 7b may be modified so that the proxy agent of bidder i submits two or more new bids, if bidder i would be indifferent among these bids. Step 360 would be expanded so that a computer determines whether $v_i(S)-B_i(S)=v_i(R)-B_i(R)$. In that event, step 362 would maintain both R and S as candidate packages on which the proxy agent of bidder i is to bid, and step 374 would have the proxy agent submit bids both of $(R, B_i(R))$ and $(S, B_i(S))$.

Detail Elements Concerning Whether Bidders are Allowed to Change Flexible Bid Information In some embodiments, the current invention is a computer-implemented method and system for conducting an auction among a plurality of bidders where the bidders use agents for generating proxy bids based on information received from bidders, wherein the auction system responds to a change indicator parameter applicable to at least one bidder i. When the change indicator parameter is set equal to one (i.e., $CHANGE_i=1$) during the course of the auction, the proxy agent for bidder i responds to inputs from bidder i (i.e., bidder i is able to change the proxy instructions or flexible bid information in this state). However, when the change indicator parameter is set equal to zero (i.e., $CHANGE_i=0$) during the course of the auction, the proxy agent for bidder i is prevented from responding to inputs from bidder i (i.e., bidder i is unable to change the proxy instructions or flexible bid information in this state). The auction computer or server receives proxy bids from the agents and processes the proxy bids to generate updated auction state information. At least one instance of the auction state information results in the auction computer or server transmitting a command or message to alter a change indicator parameter which changes the proxy agent for some bidder i from a status of responding to inputs from bidder i to a status of not responding to inputs from bidder i (i.e., modifying the value of the change indicator parameter from $CHANGE_i=1$ to $CHANGE_i=0$). Optionally, at least one instance of the auction state information also results in the auction computer or server transmitting a command or message to alter a change indicator parameter, which changes the proxy agent for some bidder i from a status of not responding to inputs from bidder i to a status of responding to inputs from bidder i (i.e., modifying the value of the change indicator parameter from $CHANGE_i=0$ to $CHANGE_i=1$).

FIG. 8a is a flow diagram illustrating an exemplary process by which the state of the auction system may be changed so that bidders are not allowed to make changes to their proxy instructions or flexible bid information. Thus, FIG. 8a illustrates, in greater detail, various steps of FIGS. 5b and 5c. In FIG. 8a, bidders are notified of a "last call" for changing their proxy instructions or flexible bid information, and later, bidders are not allowed to make changes to their proxy instructions or flexible bid information.

Steps 402 to 412 are detail elements of step 136 of FIG. 5b and step 168 of FIG. 5c. The process starts with step 402, in which a computer recalls the provisional revenues, $\pi_t$, at the current time, t. In one preferred embodiment, the auction server recalls, from memory or a data storage device, the calculated sum $P_1 + \ldots + P_n$ associated with the most recent calculation of provisional revenues at step 132 of FIG. 5b or at step 164 of FIG. 5c. The process continues with step 404, in which a computer recalls the provisional revenues, $\pi_{t-1}$, at a reference time, t−1. In one preferred embodiment, in which the auction is conducted in discrete rounds, the auction server recalls, from memory or a data storage device, the calculated sum $P_1 + \ldots + P_n$ associated with the calculation of provisional revenues one round earlier at step 132 of FIG. 5b or at step 164 of FIG. 5c. The process continues with step 406, in which in one preferred embodiment, a computer determines whether $\pi_t > c\pi_{t-1}$, where c is a positive constant of at least one. If $\pi_t > c\pi_{t-1}$, the process goes to step 418, in which an auction system indicator parameter of whether bidders are allowed to make changes to their flexible bid information maintains its previous value, and the process ends. In other embodiments of the present invention, criteria other than $\pi_t > c\pi_{t-1}$ may be used, for example, whether any new bids were entered on behalf of any bidder in the most recent iteration of step 130 of FIG. 5b or step 162 of FIG. 5c.

If $\pi_t \leq c\pi_{t-1}$, the process goes to step 408, in which the auction server sends a recommendation to the auctioneer computer or terminal that bidders be given a "last call" to change their flexible bid information. (However, in some preferred embodiments, step 408 and the subsequent step 410 are omitted. Without any human intervention, the process continues directly to step 412, in which bidder computers are notified of the "last call.") In one preferred embodiment, the auction server outputs the recommendation through its network interface and transmits it via the network. The auctioneer computer or terminal then receives the recommendation through its network interface and displays the recommendation to the auctioneer through its user interface. The process then goes to step 410, in which it is determined whether the auctioneer approves a "last call" for changing flexible bid information. In one preferred embodiment, the auctioneer either approves or does not approve the recommendation through the user interface of the auctioneer computer or terminal, which then outputs the auctioneer's decision through its network interface and transmits it via the network. The auction server then receives the auctioneer's decision through its network interface. If the auctioneer does not approve a "last call," then the process goes to step 418, in which an auction system indicator parameter of whether bidders are allowed to make changes to their flexible bid information maintains its previous value, and the process ends. If the auctioneer approves a "last call," then the process continues to step 412, in which the auction server notifies bidder computers or terminals of the "last call." In one preferred embodiment, the auction server outputs the notifications of the "last call" through its network interface and transmits them via the network. The bidder computers or terminals then receive the notifications through their network interfaces and display the notifications to the bidders through their user interfaces. In some preferred embodiments, step 412 may instead be performed as part of step 124 of FIG. 5b or step 154 of FIG. 5c. The process then continues to step 414.

Step 414 refers to a step of the process that is performed in the next iteration of step 126 of FIG. 5b or step 156 of FIG. 5c. At step 414, bidders are allowed one final opportunity to make changes to their flexible bid information. This step is illustrated in greater detail in FIGS. 6a and 6b. In one preferred embodiment, a bidder inputs flexible bid information through the user interface of the bidder computer or terminal, which then (if necessary) outputs the auction information through its network interface and transmits it via the network. The proxy agent corresponding to that bidder (if located on another computer) then receives the flexible bid information through its network interface and stores it in a database. The process then goes to step 416, in which an auction system indicator parameter of whether bidders are allowed to make changes to their flexible bid information is set to "No." In one preferred embodiment, this change is permeated throughout the auction system at the time of the next execution of step 138 of FIG. 5b or step 170 of FIG. 5c. After step 416, the process ends, and bidders are no longer permitted to make changes to their flexible bid information.

FIG. 8b is a flow diagram illustrating an exemplary process by which the state of the auction system may be changed so that one or more bidders are not allowed to make changes to their flexible bid information. Thus, FIG. 8b illustrates, in greater detail, various steps of FIGS. 5b and 5c. In FIG. 8b, bidders are notified of a "last call" for changing their flexible bid information, and later, unless a given bidder i raises his bids sufficiently to meet a target for increased revenue, bidder i is not allowed to make further changes to its flexible bid information.

Steps 452 to 462 are detail elements of step 136 of FIG. 5b and step 168 of FIG. 5c. The process starts with step 452, in which a computer recalls the provisional revenues, $\pi_t$, at the current time, t. In one preferred embodiment, the auction server recalls, from memory or a data storage device, the calculated sum $P_1 + \ldots + P_n$ associated with the most recent calculation of provisional revenues at step 132 of FIG. 5b or at step 164 of FIG. 5c. The process continues with step 454, in which a computer recalls the provisional revenues, $\pi_{t-1}$, at a reference time, t−1. In one preferred embodiment, in which the auction is conducted in discrete rounds, the auction server recalls, from memory or a data storage device, the calculated sum $P_1 + \ldots + P_n$ associated with the calculation of provisional revenues one round earlier at step 132 of FIG. 5b or at step 164 of FIG. 5c. The process continues with step 456, in which in one preferred embodiment, a computer determines whether $\pi_t > c_0 \pi_{t-1}$, where $c_0$ is a positive constant of at least one. If $\pi_t > c_0 \pi_{t-1}$, the process goes to step 474, in which auction system indicator parameters of whether bidders are allowed to make further changes to their flexible bid information maintain their previous values, and the process ends. In other embodiments of the present invention, criteria other than $\pi_t > c_0 \pi_{t-1}$ may be used, for example, whether any new bids were entered on behalf of any bidder in the most recent iteration of step 130 of FIG. 5b or step 162 of FIG. 5c.

If $\pi_t \leq c_0 \pi_{t-1}$, the process goes to step 458, in which the auction server sends a recommendation to the auctioneer computer or terminal that bidders be given a "last call" to bid sufficiently or not to be allowed to make further changes to their flexible bid information. (However, in some preferred embodiments, step 458 and the subsequent step 460 are omitted. Without any human intervention, the process continues directly to step 462, in which bidder computers are notified of the "last call.") In one preferred embodiment, the auction server outputs the recommendation through its network interface and transmits it via the network. The auctioneer computer or terminal then receives the recommendation through its network interface and displays the recommendation to the auctioneer through its user interface. The process then goes to step 460, in which it is determined whether the auctioneer approves a "last call" for changing flexible bid information. In one preferred embodiment, the auctioneer either approves or does not approve the recommendation through the user interface of the auctioneer computer or terminal, which then outputs the auctioneer's decision through its network interface and transmits it via the network. The auction server then receives the auctioneer's decision through its network interface. If the auctioneer does not approve a "last call," then the process skips to step 474, in which auction system indicator parameters of whether bidders are allowed to make further changes to their flexible bid information maintain their previous values, and the process ends. If the auctioneer approves a "last call," then the process continues to step 462, in which the auction server notifies bidder computers or terminals of the "last call." In one preferred embodiment, the auction server outputs the notifications of the "last call" through its network interface and transmits them via the network. The bidder computers or terminals then receive the notifications through their network interfaces and display the notifications to the bidders through their user interfaces. In some preferred embodiments, step 462 may instead be performed as part of step 124 of FIG. 5b or step 154 of FIG. 5c. The process then continues to step 464.

Step 464 refers to a step of the process that is performed in the next iteration of step 126 of FIG. 5b, or the next iteration of step 156 or step 160 of FIG. 5c. At step 464, bidders are allowed an opportunity to make new bids and/or to make changes to their flexible bid information which cause their proxy agents to submit new bids. If changes are made to the flexible bid information, this step is illustrated in greater detail in FIGS. 6a and 6b. In one preferred embodiment, a bidder inputs flexible bid information through the user interface of the bidder computer or terminal, which then (if necessary) outputs the auction information through its network interface and transmits it via the network. The proxy agent corresponding to that bidder (if located on another computer) then receives the flexible bid information through its network interface and stores it in a database. The process then goes to step 466, in which the auction server considers a bidder i who has not previously been considered. The process continues with step 468, in which in one preferred embodiment, a computer determines whether bidder i (or bidder i's proxy agent) submitted a new bid or bids sufficiently large to make the provisional revenues exceed $c_i \pi_{t-1}$, where $c_i$ is a positive constant of at least one. (The provisional revenues are calculated using both new bids and earlier bids of bidder i, and using only the earlier bids of other bidders.) If the provisional revenues exceed $c_i \pi_{t-1}$, the process skips to step 472, in which the auction server determines whether all bidders have been considered. In other embodiments of the present invention, criteria other than whether the provisional revenues exceed $c_i \pi_{t-1}$ may be used, for example, whether any new bids were entered on or behalf of bidder i in the most recent iteration of step 130 of FIG. 5b or step 162 of FIG. 5c.

If the provisional revenues do not exceed $c_i \pi_{t-1}$, the process goes to step 470, in which an auction system indicator parameter of whether bidder i is allowed to make further changes to its flexible bid information is set to "No." In one preferred embodiment, this change is permeated throughout the auction system at the time of the next execution of step 138 of FIG. 5b or step 170 of FIG. 5c. After step 470, the process continues to step 472, in which the auction server determines whether all bidders have been considered. If not all bidders have been considered, then the process goes to step 466, in which the auction server considers another bidder i who has not previously been considered. If all bidders have been considered, the process ends, and bidders whose indicators were turned to "No" (at step 470) are no longer permitted to make changes to their flexible bid information.

Bid Quality Indices and Bid Improvement Rules

The problem of computing the provisionally-winning bids and provisional revenues at time t may be restated as the following integer programming problem:

$$\max_{x_{iS}^t} \sum_{i=1}^{n} \sum_{S \subset \Omega} x_{iS}^t B_{iS}^t \qquad (1)$$

subject to $\qquad (2)$ $$\sum_{i=1}^{n} \sum_{S \supset \{\omega\}} x_{iS}^t \leq 1 \quad \text{for all } \omega \in \Omega$$

$$\sum_{S \subset \Omega} x_{iS}^t \leq 1 \quad \text{for all } i = 1, \ldots, n$$

$$x_{iS}^t \in \{0, 1\} \quad \text{for all } i = 1, \ldots, n \text{ and } S \subset \Omega$$

where $$B_{iS}^t$$

denotes the highest bid made by bidder i for package S up to time t, $$x_{iS}^t = 1$$

if bidder i is the provisional winner of package S at time t, and $$x_{iS}^t = 0$$

if bidder i is not the provisional winner of package S at time t. The first inequality of (2) represents the constraint that each item ω can be assigned to only one bidder (i.e. items are available in limited supply), the second inequality of (2) represents the constraint that each bidder i can be assigned only one package (i.e. bids are mutually exclusive), and the third inequality of (2) represents the constraint that each package should either be assigned to a given bidder or not assigned to a given bidder.

It is useful to consider a relaxation of the above integer programming problem, in which the constraints $$x_{iS}^t \in \{0,1\}$$

are replaced by the constraints $$x_{iS}^t \geq 0.$$

The relaxed problem is a linear program whose solution is an upper bound of the solution for the original problem. The corresponding dual problem is the following:

$$\min_{p_\omega^t, q_i^t} \sum_{\omega \in \Omega} p_\omega^t + \sum_{i=1}^n q_i^t \quad (3)$$

subject to (4)

$$\sum_{\omega \in \Omega} p_\omega^t + q_i^t \geq B_{iS}^t \text{ for } i = 1, \ldots, n \text{ and } S \subset \Omega$$

$$p_\omega^t \geq 0, q_i^t \geq 0 \text{ for } \omega \in \Omega \text{ and } i = 1, \ldots, n$$

The dual variables comprise shadow prices $(p^t, q^t)$, where $$p^t = \{p_\omega^t\}_{\omega \in \Omega}$$

is the vector of prices for the constraints that each item is in limited supply and $$q^t = \{q_i^t\}_{i=1}^n$$

is the vector of prices for the constraints that each bidder is assigned just one package. In case the dual linear programming problem (3)-(4) has multiple solutions, those solutions form a convex set. The choice among the solutions appears to be unimportant to the analysis of the auction.

In the case of multiple solutions, one possibility is to choose among the dual optimal solutions as follows. Let V* be the minimum value of the program. Add the constraint that $$\sum_{\omega \in \Omega} p_\omega^t + \sum_{i=1}^n q_i^t = V^*$$

and minimize the strictly convex objective $$\sum_{\omega \in \Omega} (p_\omega^t - p_\omega^{t-1})^2.$$

This computationally easy process always leads to a unique solution for the price vector $p^t$, and one that somewhat simplifies the bidding task by keeping the valuation prices as stable as possible during the auction.

A relative value index is a measure of the value attached to each subset $S \cap \Omega$ of the set of all items, based on the bids submitted by or on behalf of bidders in the auction process. In many preferred embodiments, a relative value index is a way of representing an imputed value for subsets of the set of all items. The description of the previous several paragraphs provides one preferred way of constructing a relative value index. The auction server computes a solution to the dual linear programming problem (3)-(4) after time t. Using the prices, $p^t$, in this solution, the auction server further computes a relative value index, $R_S^t$, for each package S after any time t by the equation:

$$R_S^t = \sum_{\omega \in S} p_\omega^t.$$

Of course, this particular relative value index is merely one preferred embodiment of the invention, and other relative value indices are also possible.

A bid quality index is a measure of the quality of a given bidder's bid for a given package, again based on the bids submitted by or on behalf of bidders in the auction process. The description of the previous several paragraphs provides one preferred way of constructing a bid quality index. The auction server computes a bid quality index, $$Q_{iS}^t,$$

of bidder i's bid for package S after any time t by:

$$Q_{iS}^t = B_{iS}^t - R_S^t,$$

which gives the excess between i's bid over the relative value index of the corresponding package. Of course, this particular bid quality index is merely one preferred embodiment of the invention, and other bid quality indices are also possible.

An overall bid quality index is a measure of the quality of all of a given bidder's bids, again based on the bids submitted by or on behalf of bidders in the auction process. The description of the previous several paragraphs provides one preferred way of constructing an overall bid quality index. The auction server computes an overall bid quality index, $Q_i^t$, of bidder i's bids after any time t by:

$$Q_i^t = \max_S Q_{iS}^t,$$

which gives the highest bid quality index among all of i's bids. Of course, this particular overall bid quality index is merely one preferred embodiment of the invention, and other overall bid quality indices are also possible.

Finally, a bid improvement rule specifies that the new bids received from a given bidder are acceptable (and should be entered into the pool of bids in effect) if at least one combination of new bids from the given bidder satisfies a relation with respect to the prior bids of the given bidder. In some preferred embodiments, the relation with respect to the prior bids that is required to be satisfied, in order for new bids to be entered, is that adding the new bids to the bidder's prior bids increases the bidder's overall bid quality index by at least a required amount. When bids from a given bidder are treated as mutually exclusive (i.e., at most one bid from bidder i can be selected as provisionally-winning), then it is oftentimes sufficient to check whether at least one new bid from the given bidder satisfies the relation with respect to the prior bids of the given bidder. For more general treatments of bids (including, but not limited to, when bids from a given bidder are not mutually exclusive, so that a "combination" of bids from bidder i can simultaneously be selected as provisionally-winning), then it is oftentimes sufficient to check whether at least one combination of new bids from the given bidder satisfies the relation with respect to the prior bids of the given bidder.

Note, here, that the usage of "combination of bids" with respect to the present invention is intended to include both single bids and groups of two or more bids (that could simultaneously be selected as provisionally-winning).

The description of the previous several paragraphs provides one preferred way of constructing a bid improvement rule. The auction server determines whether adding a new bid $b_i^t$ to bidder i's prior bids improves the overall bid quality index of bidder i by a required amount. In one preferred embodiment, $b_i^t$ is required to increase the overall bid quality index of bidder i by at least one increment, meaning that $b_i^t$ includes a bid $$b_{iS}^t$$

on some package S such that $$b_{iS}^t - R_S^{t-1} - Q_i^{t-1} \geq I_S^t,$$

where $I_S^t$ is a minimum bid increment on package S at time t. In another preferred embodiment, $b_i^t$ is required to increase the overall bid quality index of bidder i by at least a multiplicative constant c, meaning that $b_i^t$ includes a bid $$b_{iS}^t$$

on some package S such that $$b_{iS}^t - R_S^{t-1} \geq cQ_i^{t-1}.$$

Of course, this particular bid improvement rule is merely one preferred embodiment of the invention, and other bid improvement rules are also possible. In general, the overall bid quality index required to be yielded by a new bid $b_i^t$ can be any function of the state of the auction system; and the relative bid index, the bid quality index, and the overall bid quality index used in the calculations can be other than the preferred embodiments described in the previous paragraphs.

Many other embodiments of a relative value index, a bid quality index, an overall bid quality index, and a bid improvement rule are also possible. For example, in a communications spectrum auction, let A denote the average price per MHz-pop of the provisionally-winning bids (i.e., A is based on the dollar amount of provisional revenues, divided by the number of megahertz of spectrum covered by the communications licenses and the population covered by the communications licenses). Then, an imputed value for each license may be obtained by multiplying A by the MHz-pop of the license. A relative value index, $R_S^t$, for each package S may then be obtained by summing these imputed values of all the licenses in the package. A bid quality index, $$Q_{iS}^t,$$

of bidder i's bid for package S is then determined from this relative value index by:

$$Q_{iS}^t = B_{iS}^t - R_S^t,$$

which gives the excess between i's bid over this relative value index of the corresponding package. An overall bid quality index is defined from this bid quality index by:

$$Q_i^t = \max_S Q_{iS}^t,$$

which gives the highest bid quality index among all of i's bids. Finally, a bid improvement rule can be defined with reference to this overall bid quality index.

Moreover, in other embodiments of the present invention, the descriptions of bid quality index, overall bid quality index, and bid improvement rules are easily modified so as to also work in a reverse auction or procurement auction. For example, in one embodiment, a bid quality index, $$Q_{iS}^t,$$

of bidder i's bid for package S is instead determined from a relative value index by:

$$Q_{iS}^t = R_S^t - B_{iS}^t,$$

which gives the discount of bidder i's bid to the relative value index of the corresponding package. An overall bid quality index continues to be defined from the bid quality index by:

$$Q_i^t = \max_S Q_{iS}^t,$$

which gives the highest bid quality index among all of i's bids. Finally, a bid improvement rule can be defined with reference to the overall bid quality index.

To ensure activity during the auction, a bid improvement rule can be used in conjunction with an exemplary activity rule that counts a bidder as "active" at a round when it either makes an acceptable new bid or when it is a provisional winner from the previous round. According to this exemplary activity rule, as soon as a bidder fails to be active in some pre-specified number of rounds, the bidder faces reduced or zero eligibility to make new bids.

Figure 9:
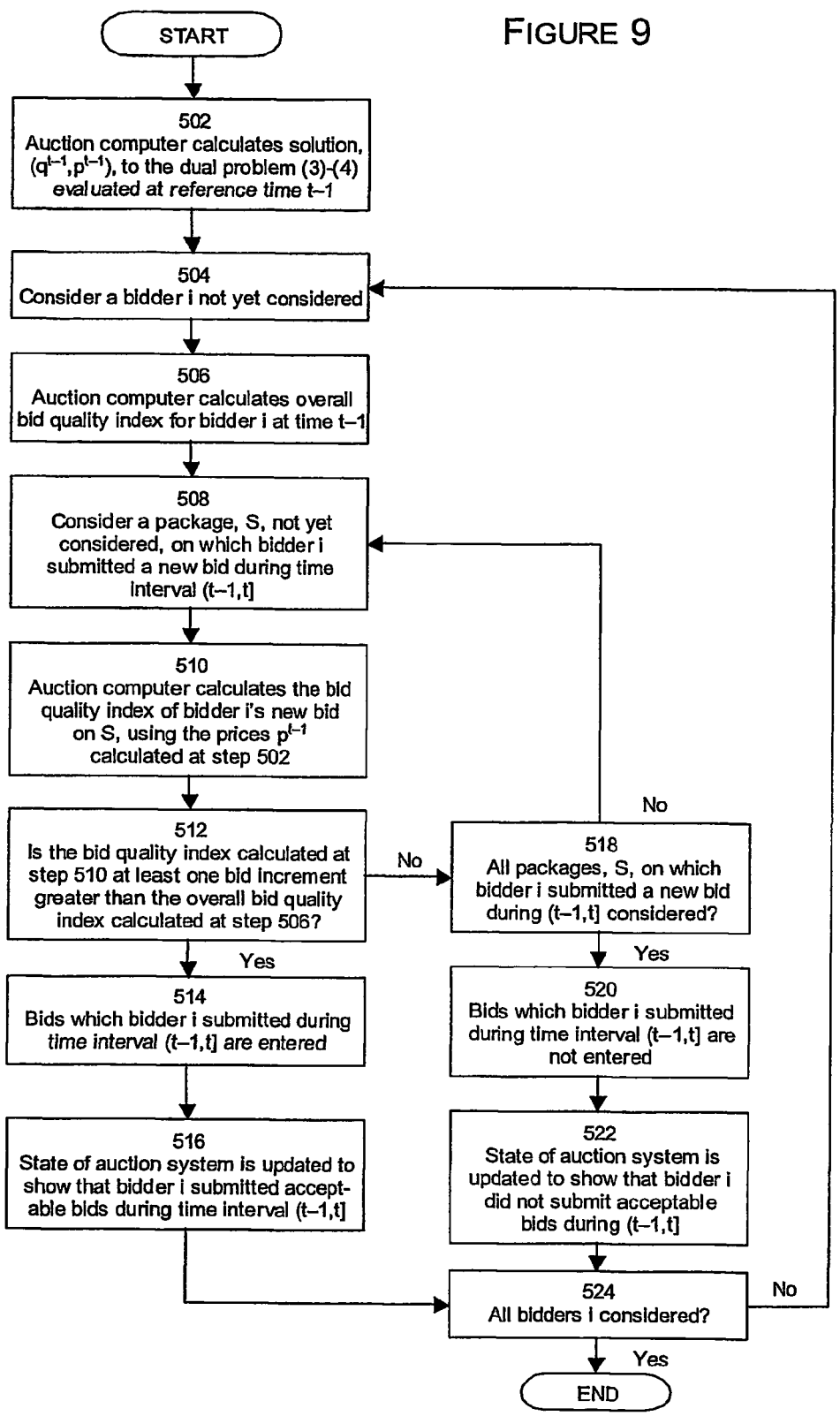
FIG. 9 is a flow diagram illustrating, in greater detail, an element of the flow diagrams of FIGS. 5a, 5b and 5c.

FIG. 9 is a flow diagram illustrating an exemplary process by which a bid improvement rule is applied, in an auction in which bids from a given bidder are treated as mutually exclusive (i.e., at most one bid from bidder i can be selected as provisionally-winning). Thus, FIG. 9 illustrates, in greater detail, a part of step 108 of FIG. 5a, step 130 of FIG. 5b or step 162 of FIG. 5c.

The process starts with step 502, in which the auction server calculates a solution $(p^{t-1}, q^{t-1})$ to the dual problem (3)-(4) evaluated at reference time t-1. It continues with step 504, in which the auction server considers a bidder i who has not previously been considered. In some preferred embodiments of the invention, the auction server at step 504 considers only bidders who were not provisional winners at time t-1. In some other preferred embodiments, the auction server at step 504 also considers bidders who were provisional winners at time t-1, but steps 516 and 522 (described below) are skipped for such bidders. The process goes to step 506, in which the auction server calculates the overall bid quality index, $$Q_i^{t-1},$$

for bidder i at reference time t-1. The process then continues with step 508, in which the auction server considers a package S, not previously considered, on which bidder i submitted a bid $$b_{iS}^t$$

during the time interval (t-1,t]. The process goes to step 510, in which the auction server calculates the bid quality index, $$b_{iS}^t - R_S^{t-1},$$

of bidder i's bid on package S during the time interval (t-1,t], evaluated using the prices $p^{t-1}$ (calculated at step 502). The process continues with step 512, in which the auction server determines whether $$b_{iS}^t - R_S^{t-1} \geq Q_i^{t-1} + I_S^t,$$

where $I_S^t$ is a minimum bid increment on package S at time t. In other words, it is determined whether the bid quality index calculated at step 510 is at least one bid-increment greater than the overall bid quality index calculated at step 506. If $$b_{iS}^t - R_S^{t-1} \geq Q_i^{t-1} + I_S^t,$$

then the process continues to step 514, at which the auction server concludes that bidder i's bids $b_i^t$, submitted during the time interval (t-1,t], should be entered. The process then goes to step 516, in which the state of the auction system is updated to show that bidder i submitted acceptable bids during the time interval (t-1,t]. (However, in some preferred embodiments, step 516 is skipped for bidders who were provisional winners at time t-1.) It then proceeds to step 524, in which it is determined if all bidders i have been considered.

If $$b_{iS}^t - R_S^{t-1} < Q_i^{t-1} + I_S^t,$$

then the process continues with step 518, in which it is determined if all packages, S, on which bidder i submitted a new bid during the time interval (t-1,t], have been considered. If not all such packages have been considered, then the process returns to step 508, in which the auction server considers another such package S that has not previously been considered. If all such packages have been considered, then the process goes to step 520, at which the auction server concludes that bidder i's bids $b_i^t$, submitted during the time interval (t-1,t], should not be entered. The process then goes to step 522, in which the state of the auction system is updated to reflect the fact that bidder i did not submit any acceptable bids during the time interval (t-1,t]. (However, in some preferred embodiments, step 522 is skipped for bidders who were provisional winners at time t-1.) In one preferred embodiment, bidder i who is not a provisional winner is allowed K opportunities (K a positive integer) to submit an acceptable bid; if K opportunities elapse without bidder i submitting an acceptable bid, then bidder i is not allowed to submit any further bids. In another preferred embodiment, where bidding is intermediated by a proxy agent, bidder i who is not a provisional winner (or the associated proxy agent) is also allowed K opportunities (K a positive integer) to submit an acceptable bid; if K opportunities elapse without bidder i submitting an acceptable bid, then bidder i is not allowed to make any further changes to his flexible bid information. In other preferred embodiments, bidder i does not completely lose the ability to submit further bids or to make further changes to his flexible bid information, but the size or value of packages on which bidder i is subsequently allowed to submit bids is reduced. The process then continues with step 524, in which it is determined if all bidders i have been considered. If not all bidders have been considered, then the process returns to step 504, in which the auction server considers another bidder i who has not previously been considered. If all bidders have been considered, then the process ends.

For more general treatments of bids (including, but not limited to, when bids from a given bidder are not mutually exclusive, so that a "combination" of bids from bidder i can simultaneously be selected as provisionally-winning), define a combination of bids from bidder i to be a subset of the set of bidder i's bids which can simultaneously be selected as provisionally-winning. For example, consider an auction with package bidding for a set of four items, {A,B,C,D}. In this example, suppose that the set of bidder i's bids are ({A,B}, $P_1$), ({B,C},$P_2$) and ({D},$P_3$). Then, in this example (in which bids are assumed not to be mutually exclusive), ({A,B},$P_1$) and ({D},$P_3$) are a "combination" of bids. Also, in this example, ({B,C},$P_2$) and ({D},$P_3$) are a "combination" of bids. However, ({A,B},$P_1$) and ({B,C},$P_2$) are not a "combination" of bids, since the two bids both contain item {B}, and so it is impossible for both bids to be honored; the two bids can never be selected simultaneously as provisionally-winning. Note, here, that the usage of "combination of bids" with respect to the present invention is intended to include both single bids and groups of two or more bids (that could simultaneously be selected as provisionally-winning).

For more general treatments of bids (including, but not limited to, when bids from a given bidder are not mutually exclusive, so that a "combination" of bids from bidder i can simultaneously be selected as provisionally-winning), a bid improvement rule can be implemented by considering "combinations" of bids. In this process, a computer receives bids, determines whether to enter new bids, and processes the entered bids to allocate the items among the bidders, wherein the determining whether to enter new bids includes: determining whether at least one combination of new bids from a given bidder satisfies a relation with respect to the previous bids of the given bidder, entering all of the new bids from the given bidder if at least one combination of new bids from the given bidder satisfies said relation, and entering no new bids from the given bidder if no combination of new bids from the given bidder satisfies said relation.

FIG. 9 can be modified to illustrate a bid improvement rule in accordance with the previous paragraph, as follows. In Step 502, the dual problem (3)-(4) which is solved for $(p^{t-1}, q^{t-1})$ may require modification to reflect the new assumption that bids from a given bidder are not mutually exclusive. As before, at step 504, the computer considers a bidder i who has not previously been considered. The process goes to step 506, in which the computer calculates the overall bid quality index, $$Q_i^{t-1},$$

for bidder i at reference time t−1. The process then continues with step 508, in which the computer considers a combination, not previously considered, of bids which bidder i submitted during the time interval (t−1,t]. Let $\Pi_i^t$ denote the sum of the bid amounts over the combination of bids being considered, and let $\sigma_i^t$ denote the union of the items in the combination of bids being considered. The process goes to step 510, in which the computer calculates the bid quality index, $$\Pi_i^t - R_S^{t-1},$$

of the combination of bids being considered, evaluated using the prices $p^{t-1}$ (calculated at step 502). The process continues with step 512, in which the computer determines whether $$\Pi_i^t - R_S^{t-1} \geq Q_i^{t-1} + I_\sigma^t,$$

where $I_\sigma^t$ is a minimum bid increment on package $\sigma_i^t$ at time t. In other words, it is determined whether the bid quality index calculated at step 510 is at least one bid increment greater than the overall bid quality index calculated at step 506. If $$\Pi_i^t - R_S^{t-1} \geq Q_i^{t-1} + I_\sigma^t,$$

then the process continues to step 514, at which the computer concludes that bidder i's bids submitted during the time interval (t−1,t] should be entered. The process then goes to step 516, in which the state of the auction system is updated to show that bidder i submitted acceptable bids during the time interval (t−1,t]. It then proceeds to step 524, in which it is determined if all bidders i have been considered.

If $$\Pi_i^t - R_S^{t-1} < Q_i^{t-1} + I_\sigma^t,$$

then the process continues with step 518, in which it is determined if all combinations of new bids which bidder i submitted during the time interval (t−1,t] have been considered. If not all such combinations have been considered, then the process returns to step 508, in which the computer considers another such combination that has not previously been considered. If all such combinations have been considered, then the process goes to step 520, at which the computer concludes that bidder i's bids submitted during the time interval (t−1,t] should not be entered. The process then goes to step 522, in which the state of the auction system is updated to reflect the fact that bidder i did not submit any acceptable bids during the time interval (t−1,t]. The process then continues with step 524, in which it is determined if all bidders i have been considered. If not all bidders have been considered, then the process returns to step 504, in which the computer considers another bidder i who has not previously been considered. If all bidders have been considered, then the process ends.

In other embodiments of the present invention, FIG. 9 is easily modified to illustrate an exemplar process by which a bid improvement rule is applied in a reverse auction or procurement auction. In one such embodiment, the optimization problem (1)-(2) is now a minimization problem (since the auctioneer is attempting to minimize the cost of procuring the items). Consequently, the dual problem (3)-(4) solved at step 502 is now a maximization problem. Steps 506 and 510 are modified so that the bid quality indexes calculated take the form of $$Q_{iS}^{t-1} = R_S^{t-1} - B_{iS}^{t-1} \text{ or } R_S^{t-1} - b_{iS}^t,$$

which give the discount of bidder i's bid to the relative value index of the corresponding package. Step 512 is modified so that a computer determines whether $$R_S^{t-1} - b_{iS}^t \geq Q_i^{t-1} + I_S^t,$$

which now determines whether the bid quality index calculated at step 510 is at least one bid increment greater than the overall bid quality index calculated at step 506.

Bid Quality Indices and Reducing the Computational Size of the Optimization Problem The technique described in the previous section and in FIG. 9, in which a relative value index and a bid quality index are computed, can further be extended to reduce the size of the optimization problem to be solved in the auction with package bidding. This extended technique may be extremely useful, as the optimization problem is believed to be NP-complete, and so the time required to solve for provisionally-wining bids and provisional winners may become unmanageable as the number of bids that need to be considered becomes unbounded.

One exemplary way to reduce the computational size of the problem is by limiting, for a given bidder i, the number of previous bids that are kept in effect to $M_i$, and the number of newly-submitted bids that are considered to $N_i$. Thus, the total number of bids for a given bidder i that needs to be considered at each optimization problem is no greater than $M_i+N_i$. The number of previous bids that are kept in effect is limited to $M_i$ by computing a bid quality index for a given bidder, and by deleting all but the $M_i$ bids that are rated the best.

In a preferred embodiment, the number of previous bids that are kept in effect is limited using a variation on the bid quality index described above. At time t, a relative value index $R_S^t$ is determined based on at most $M_i+N_i$ previous and current bids for a given bidder i. The relative value index is computed by solving the dual linear programming problem (3)-(4) at time t based on at most $M_i+N_i$ previous and current bids for a given bidder i, yielding a solution $(p^t, q^t)$. The relative value index is then $$R_S^t = \sum_{\omega \in S} p_\omega^t.$$

Let $$B_{iS}^t$$

denote the highest bid submitted by bidder i for some package S among the $M_i+N_i$ previous and current bids for a given bidder i. The preliminary bid quality index, $$Q_{iS}^t = B_{iS}^t - R_S^t,$$

is calculated for each such bid, $$B_{iS}^t,$$

using the relative value index $R_S^t$. Let $\overline{Q}_i^t = \max_S Q_{iS}^t$ be the preliminary overall bid quality for bidder i at time t. If bidder i is then a provisional winner, then its provisionally winning bids are adjusted to be $\overline{Q}_i^t+1$ or any other number higher than $\overline{Q}_i^t$. The resulting values of $Q_{iS}^t$ compose the (revised) bid quality index. The bids, $$B_{iS}^t,$$

are then sorted, in descending order of quality (that is, in descending order of bid quality index $$Q_{iS}^t),$$

and only the $M_i$ highest-quality bids of bidder i are kept. (Bidder i's bids that are ranked $M_i+1$ and below, according to the (revised) bid quality index $$Q_{iS}^t,$$

are discarded, and no longer remain in effect). Then, during time interval (t, t+1], bidder i is limited to submitting no more than $N_i$ new packages. Thus, at time t+1, when the provisionally winning bids and qualities are again determined, there are again at most $M_i+N_i$ previous and newly-submitted bids of bidder i to consider. After this, the process repeats, and so the optimization problems never need to be performed using any more than $M_i+N_i$ bids of bidder i, limiting the size of (and time required for) the computation.

Figure 10A:
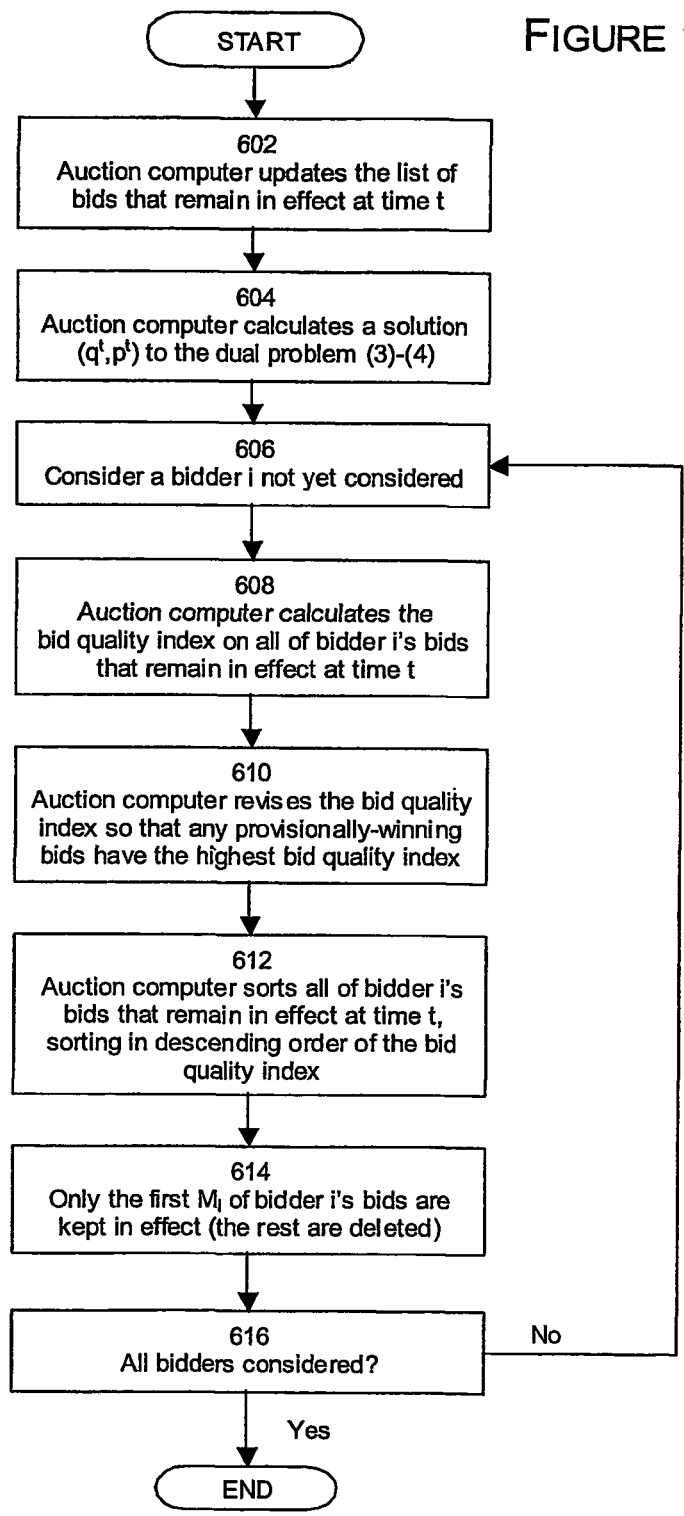
FIGS. 10a and 10b are flow diagrams illustrating, in greater detail, elements of the flow diagrams of FIGS. 5a, 5b and 5c.

FIG. 10a is a flow diagram illustrating an exemplary process by which the size of the optimization problem within the package auction is reduced by limiting the number of bids that are kept "in effect" (i.e., the number of bids that remain active, or remain subject to being selected as winning bids) during the auction. Thus, FIG. 10a illustrates, in greater detail, a part of step 114 of FIG. 5a, step 138 of FIG. 5b or step 170 of FIG. 5c.

The process starts with step 602, in which the auction server updates the list of bids, $$B_{iS}^t,$$

that remain in effect at time t. It does this by setting $$B_{iS}^t = \max\{b_{iS}^t, B_{iS}^{t-1}\},$$

for each bidder i and for each package S on which a new bid, $$b_{iS}^t,$$

was entered on behalf of bidder i since the previous execution of FIG. 10a or for which an earlier bid, $$B_{iS}^{t-1},$$

was kept in effect after the previous execution of FIG. 10a (Observe that, if a given bidder i had both a new bid and a kept bid on the same package S, this step also has the effect of discarding the duplicate record, and keeping only the higher bid on package S.) The process continues with step 604, in which the auction server calculates a solution $(p^t, q^t)$ to the dual problem (3)-(4) evaluated at the current time t. It next goes to step 606, in which the auction server considers a bidder i who has not previously been considered. The process goes to step 608, in which the auction server calculates the bid quality index, $$B_{iS}^t - R_S^t,$$

on all of bidder i's bids, $$B_{iS}^t,$$

that remain in effect at time t. The process then goes to step 610, in which the auction server revises the bid quality index so that any provisionally-winning bids have the highest bid quality index. In one exemplary version of this step, the auction server first calculates the (preliminary) overall bid quality index, $$\overline{Q}_i^t = \max_S Q_{iS}^t,$$

for bidder i at time t, and then sets the (revised) bid quality index for any provisionally-winning bids, $$B_{iS}^t,$$

equal to $\overline{Q}_i^t + 1$. The process continues to step 612, in which the auction server sorts all of bidder i's bids, $$B_{iS}^t,$$

that remain in effect at time t, sorting by descending order of the (revised) bid quality index. The process then goes to step 614, in which only the first $M_i$ bids (from the sorting of step 612) are kept, and in which any bids beyond the first $M_i$ bids are deleted from the list of bids, $$B_{iS}^t,$$

that remain in effect after time t. The process then continues with step 616, in which it is determined if all bidders have been considered. If not all bidders have been considered, then the process returns to step 606, in which the auction server considers another bidder i who has not previously been considered. If all bidders have been considered, then the process ends.

Figure 10B:
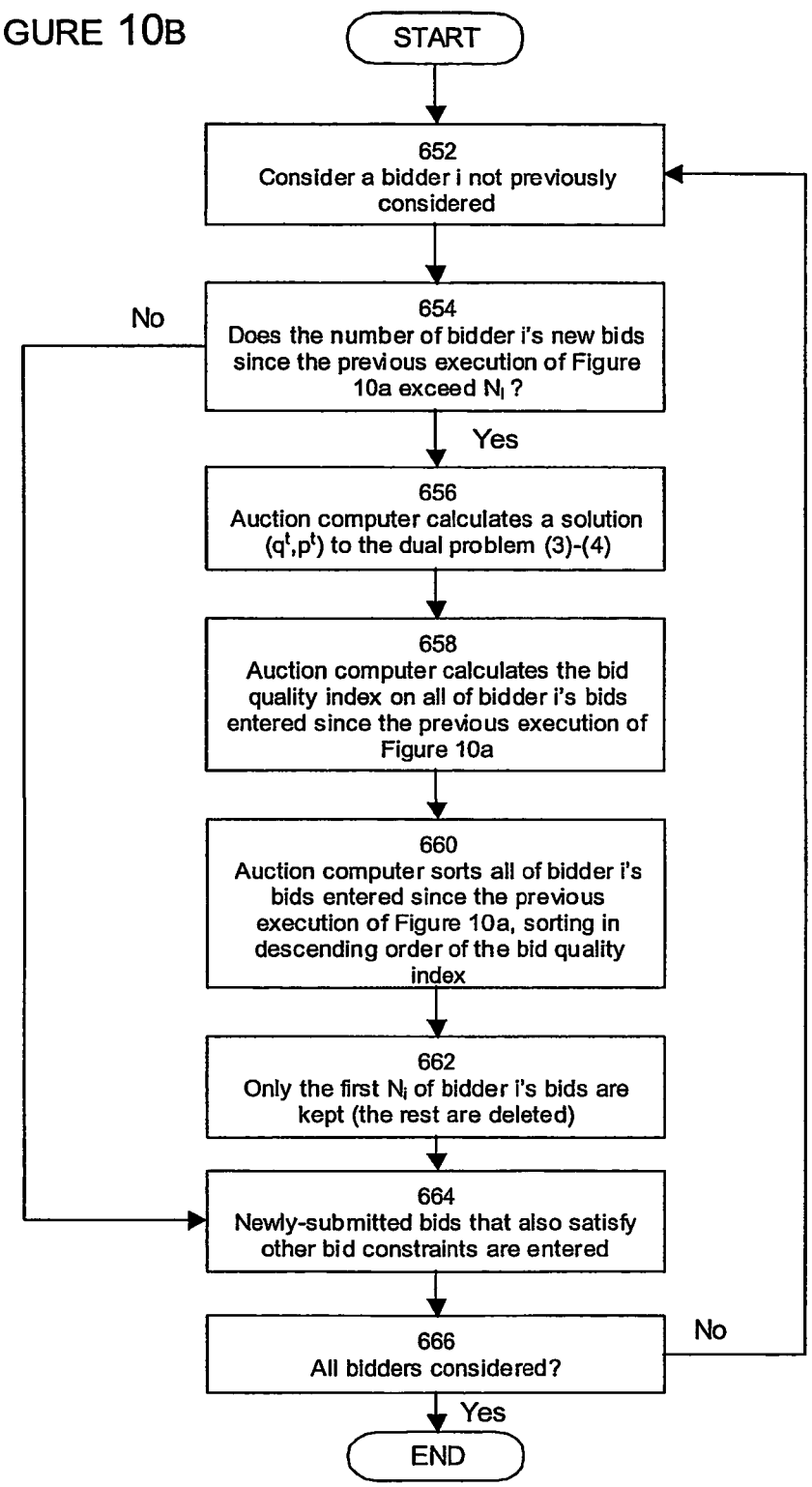

FIG. 10b is a flow diagram illustrating an exemplary process by which the number of new bids that can be entered by a bidder is limited. It operates in conjunction with FIG. 10a to limit the size of the optimization problem that needs to be performed within the package auction. Thus, FIG. 10b illustrates, in greater detail, a part of step 108 of FIG. 5a, step 130 of FIG. 5b or step 162 of FIG. 5c.

The process starts with step 652, in which the auction server considers a bidder i who has not previously been considered. It next goes to step 654, in which the auction server determines whether the number of new bids, $$b_{iS}^{t+1},$$

that were submitted by or on behalf of bidder i since the previous execution of FIG. 10a (i.e., since time t) exceeds $N_i$. If the number does not exceed $N_i$, then the process skips to step 664, in which the newly-submitted bids of bidder i that also satisfy the other bid constraints are entered. However, if the number exceeds $N_i$, then the process continues with step 656, in which the auction server calculates (or recalls) a solution $(p^t, q^t)$ to the dual problem (3)-(4) evaluated at time t. The process goes to step 658, in which the auction server calculates the bid quality index, $$b_{iS}^{t+1} - R_S^t,$$

on all of bidder i's bids, $$b_{iS}^{t+1},$$

that were entered by or on behalf of bidder i since the previous execution of FIG. 10a (i.e., since time t). The process continues to step 660, in which the auction server sorts all of bidder i's bids, $$b_{iS}^{t+1},$$

that were entered by or on behalf of bidder i since the previous execution of FIG. 10a (i.e., since time t), sorting by descending order of the bid quality index, $$b_{iS}^{t+1} - R_S^t.$$

The process then goes to step 662, in which only the first $N_i$ bids (from the sorting of step 660) are kept, and in which any bids beyond the first $N_i$ bids are deleted from the list of bids, $$b_{iS}^{t+1},$$

that were entered by or on behalf of bidder i since the previous execution of FIG. 10a (i.e., since time t). The process continues with step 664, in which the newly-submitted bids of bidder i that also satisfy the other bid constraints are entered. The process then goes to step 666, in which it is determined if all bidders have been considered. If not all bidders have been considered, then the process returns to step 652, in which the auction server considers another bidder i who has not previously been considered. If all bidders have been considered, then the process ends.

Price-Based Bidding Constraints and Revealed-Preference-Based Bidding Constraints In many auctions, it is desirable to impose constraints on bidders that require them to bid significantly on items early in the auction in order for them to be allowed to bid on items later in the auction. Otherwise, one may find oneself in a situation where bidders refrain from submitting bids until near the very end of the auction, defeating the purpose of an open ascending auction.

In what follows, we describe a new and useful class of constraints on bidders that may be especially useful in the computer implementation of package auctions. The guiding principle behind these constraints is as follows: In order to force bidders to bid significantly on items early in an auction, one should place constraints on bidders that would not interfere with a bidder who is bidding "sincerely" (that is, a bidder who is bidding non-strategically and who is simply expressing his valuations for the items through his bidding).

The theory behind some of these constraints is sometimes known as "revealed preference" in economics. Let v(R) denote a bidder's valuation for package R and let v(S) denote a bidder's valuation for package S. Suppose that these packages were available for minimum acceptable bids of $$\pi_R^{t-1} \text{ and } \pi_S^{t-1},$$

respectively, at time t−1; and for minimum acceptable bids of $\pi_R^t$ and $\pi_S^t$, respectively, at time t. Further suppose that a given bidder chose to bid for package R, but not S, at time t−1; and that the same bidder chose to bid for package S, but not R, at time t. Then we should expect that the following two inequalities hold:

$$v(R) - \pi_R^{t-1} \geq v(S) - \pi_S^{t-1}, \tag{5}$$

and:

$$v(S) - \pi_S^t \geq v(R) - \pi_R^t. \tag{6}$$

Adding inequalities (5) and (6) yields:

$$\pi_R^t - \pi_R^{t-1} \geq \pi_S^t - \pi_S^{t-1}. \tag{7}$$

A bidder i will be said to have been active on package R at time u if bidder i was the standing high bidder (provisional winner) on package R at time u−1 or if bidder i entered a new bid on package R during the time interval (u−1, u]. Using this terminology, we may now state a simple version of a revealed-preference-based bidding constraint as follows: A bidder i is permitted to place a bid on package S at time t only if there exists a package R such that bidder i was active on package R at time t−1 and the minimum acceptable bids on packages R and S at times t−1 and t satisfy inequality (7).

Moreover, the reasoning behind inequality (7) is not confined to holding only between successive times. The analogous reasoning also holds between any times t and u. Consequently, one can also define a more complicated version of a revealed-preference-based bidding constraint as follows: A bidder i is permitted to place a bid on package S at time t only if, for each earlier time u at which provisional winners were determined, there exists a package R(u) such that bidder i was active on package R(u) at time u, and the minimum acceptable bids on packages R(u) and S at times u and t satisfy the following inequality, which will be referred to as the revealed-preference inequality:

$$\pi_{R(u)}^t - \pi_{R(u)}^u \geq \pi_S^t - \pi_S^u. \tag{8}$$

Figure 11A:
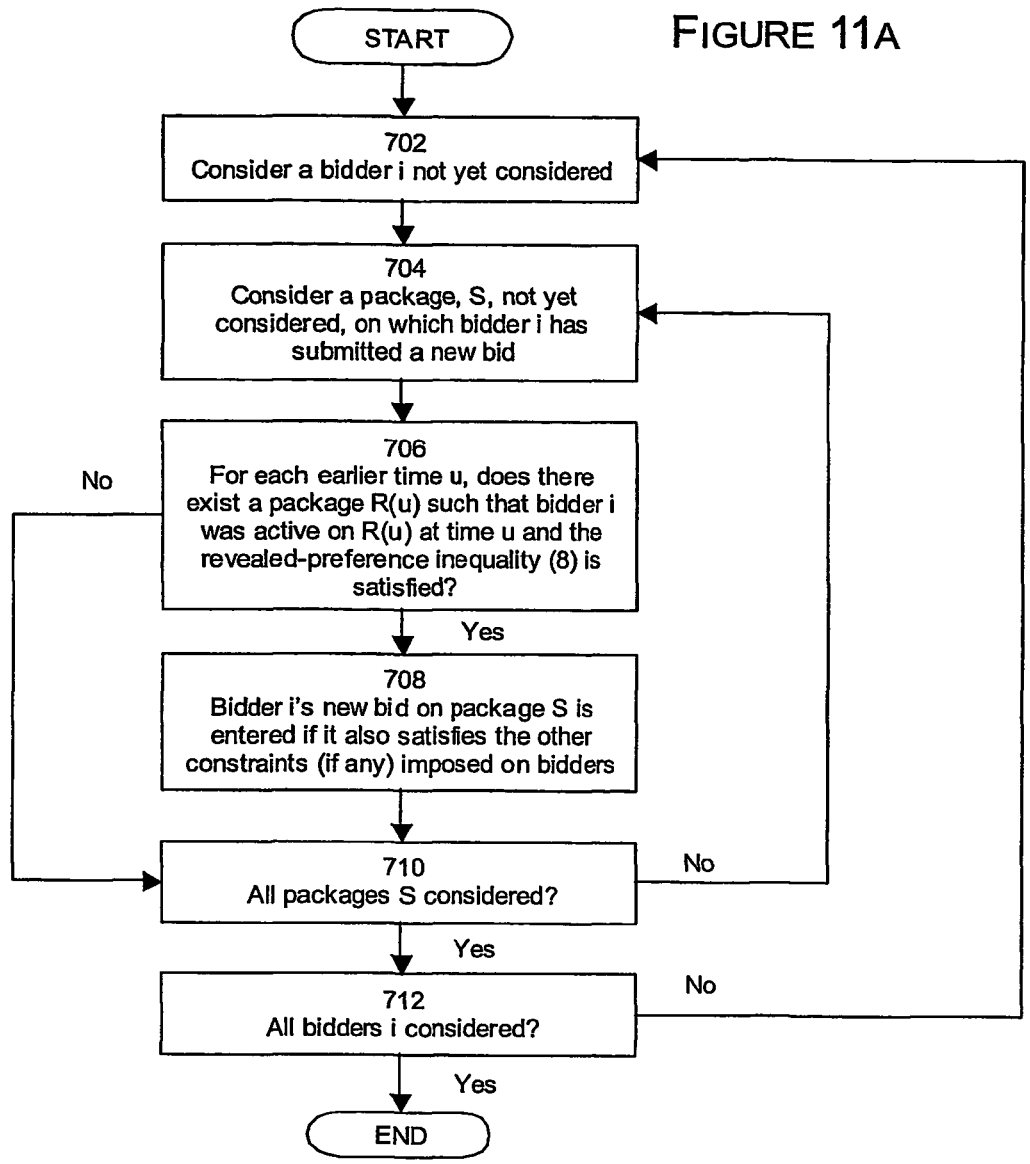
FIGS. 11a, 11b, 11c and 11d are flow diagrams illustrating, in greater detail, elements of the flow diagrams of FIGS. 5a, 5b and 5c.

FIG. 11a is a flow diagram illustrating an exemplary process where bid submission is restricted by a revealed-preference-based bidding constraint. Thus, FIG. 11a illustrates, in greater detail, a part of step 108 of FIG. 5a, step 130 of FIG. 5b or step 162 of FIG. 5c.

The process starts with step 702, in which the auction computer considers a bidder i who has not previously been considered. It continues with step 704, in which the auction computer considers a package S, not previously considered, on which bidder i has submitted a new bid at the current time t. It next goes to step 706, in which the auction computer determines whether, for each earlier time u at which provisional winners were determined, there exists a package R(u) such that bidder i was active on package R(u) at time u and the minimum acceptable bids on packages R(u) and S at times u and t satisfy the revealed-preference inequality (8). In one preferred embodiment, the determining step of step 706 is only performed for a single earlier time, u=t−1. If there exists such a package R(u) satisfying the revealed-preference inequality for each time u, the process continues to step 708, in which bidder i's new bid on package S is entered if it also satisfies the other constraints (if any) imposed on bidders. After step 708, or if there does not exist such a package R(u) satisfying the revealed-preference inequality for each time u, the process goes to step 710. At step 710, it is determined if all packages S have been considered, on which bidder i has submitted a new bid at the current time t. If not all such packages S have been considered, then the process returns to step 704, in which the auction computer considers another package S on which bidder i has submitted a new bid at the current time t. If all such packages S have been considered, the process continues to step 712, in which it is determined if all bidders i have been considered. If not all bidders have been considered, then the process returns to step 702, in which the auction computer considers another bidder i who has not previously been considered. If all bidders have been considered, then the process ends.

The "revealed-preference-based bidding constraint" described in FIG. 11a is exemplary of a more general category of constraints that may be usefully imposed on bidders in dynamic auctions. A price-based bidding constraint is a constraint on the items or sets of items on which a bidder is permitted to enter new bids in a dynamic auction, where the acceptability of a new bid is based on a relation with a prior bid by the same bidder and with the prices in the auction. A revealed-preference-based bidding constraint is one example of a price-based bidding constraint. In some other preferred embodiments of the invention, price-based bidding constraints are applied in which a bidder's ability to bid on a subset of items at a later time in an auction is limited based on the subsets of items on which the bidder has bid at earlier times in the auction; and said limitation includes an evaluation of the earlier subsets of items at the later prices.

In one embodiment of price-based bidding constraints, a bidder i is permitted to place a bid on package S at time t only if, for each earlier time u at which provisional winners were determined, there exists a package R(u) such that bidder i was active on package R(u) at time u, and the minimum acceptable bids on packages R(u) and S at time t satisfy the following inequality, which will be referred to as the exemplary price-based inequality:

$$\pi_{R(u)}^t \geq \pi_S^t. \tag{9}$$

Figure 11B:
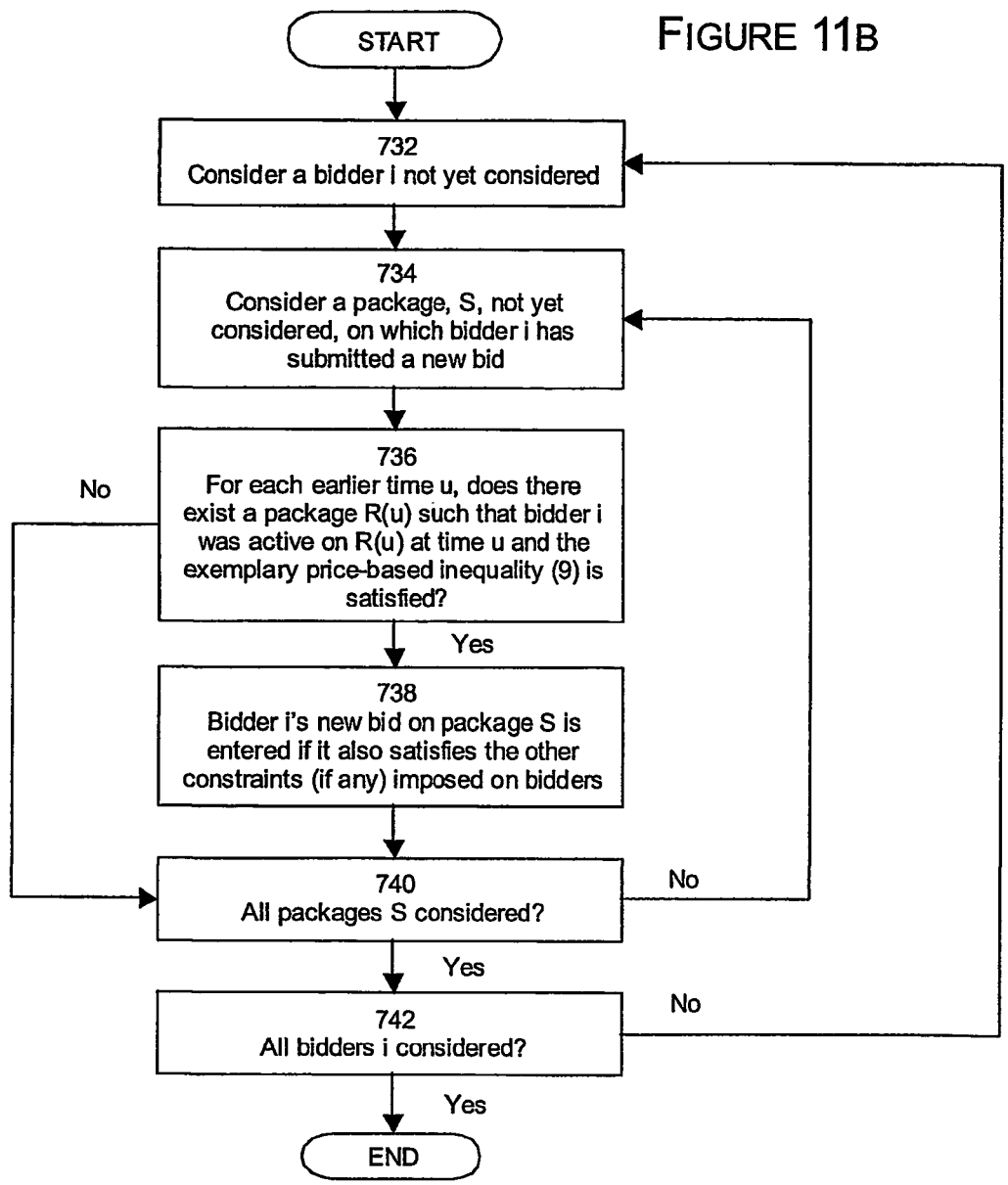

FIG. 11b is a flow diagram illustrating an exemplary process where bid submission is restricted by a price-based bidding constraint. Thus, FIG. 11b illustrates, in greater detail, a part of step 108 of FIG. 5a, step 130 of FIG. 5b or step 162 of FIG. 5c.

The process starts with step 732, in which the auction computer considers a bidder i who has not previously been considered. It continues with step 734, in which the auction computer considers a package S, not previously considered, on which bidder i has submitted a new bid at the current time t. It next goes to step 736, in which the auction computer determines whether, for each earlier time u at which provisional winners were determined, there exists a package R(u) such that bidder i was active on package R(u) at time u, and the minimum acceptable bids on packages R(u) and S at time t satisfy the exemplary price-based inequality (9). In one preferred embodiment, the determining step of step 736 is only performed for a single earlier time, u=t−1. If there exists such a package R(u) satisfying the exemplary price-based inequality for each time u, the process continues to step 738, in which bidder i's new bid on package S is entered if it also satisfies the other constraints (if any) imposed on bidders. After step 738, or if there does not exist such a package R(u) satisfying the exemplary price-based inequality for each time u, the process goes to step 740. At step 740, it is determined if all packages S have been considered, on which bidder i has submitted a new bid at the current time t. If not all such packages S have been considered, then the process returns to step 734, in which the auction computer considers another package S on which bidder i has submitted a new bid at the current time t. If all such packages S have been considered, the process continues to step 742, in which it is determined if all bidders i have been considered. If not all bidders have been considered, then the process returns to step 732, in which the auction computer considers another bidder i who has not previously been considered. If all bidders have been considered, then the process ends.

Similar reasoning, and similar price-based bidding constraints, including revealed-preference-based bidding constraints, can be developed in a simultaneous ascending auction in which bids are submitted only on independent items (and thus package bids cannot be submitted). An example of auctions where this next revealed-preference-based activity rule would be useful is the Federal Communications Commission auctions that have been held prior to the date of this application. Suppose that there are in types of items (1, ..., m) being auctioned, let $$p^{t-1} \equiv (p_1^{t-1}, \ldots, p_m^{t-1})$$

be the minimum acceptable bids (per unit) for the respective types of items at time t−1, and let $p^t \equiv (p_1^t, \ldots, p_m^t)$ be the minimum acceptable bids (per unit) for the respective types of items at time t. Further, for a given bidder, let $$x^{t-1} \equiv (x_1^{t-1}, \ldots, x_m^{t-1})$$

denote the quantities of the respective types of items on which the bidder was active at time t−1, and let $x^t \equiv (x_1^t, \ldots, x_m^t)$ denote the quantities of the respective types of items on which the bidder was active at time t. Finally, let $v(x^{t-1})$ denote the bidder's valuation for the vector of quantities $x^{t-1}$ on which the bidder was active at time t−1, and let $v(x^t)$ denote the bidder's valuation for the vector of quantities $x^t$ on which the bidder was active at time t. Then we should expect that the following two inequalities hold:

$$v(x^{t-1}) - p^{t-1} \cdot x^{t-1} \geq v(x^t) - p^{t-1} \cdot x^t \quad (10)$$

and:

$$v(x^t) - p^t \cdot x^t \geq v(x^{t-1}) - p^t \cdot x^{t-1} \quad (11)$$

Adding inequalities (10) and (11) yields:

$$(p^t - p^{t-1}) \cdot (x^t - x^{t-1}) \leq 0. \quad (12)$$

In the above equations, "·" denotes "dot product": for example, $p^t \cdot x^t = p_1^t x_1^t + \ldots + p_m^t x_m^t$.

We may now state a simple version of a revealed-preference-based constraint for dynamic auctions in which bids are submitted only on independent items (and cannot be submitted on packages): A bidder i is permitted to be active on the vector of quantities $x^t$ at time t only if the vector of quantities $x^{t-1}$ on which bidder i was active at time t−1 and the minimum acceptable bids (per unit) on the various types of items at times t−1 and t satisfy inequality (12).

Moreover, the reasoning behind inequality (12) is not confined to holding only between successive times. The analogous reasoning also holds between any times t and u. Consequently, one can also define a more complicated version of a revealed-preference-based constraint as follows: A bidder i is permitted to be active on the vector of quantities $x^t$ at time t only if, for each earlier time u at which provisional winners were determined, the vector of quantities $x^u$ on which bidder i was active at time u and the minimum acceptable bids (per unit) on the various types of items at times u and t satisfy the following inequality, which will be referred to as the revealed-preference inequality:

$$(p^t - p^u) \cdot (x^t - x^u) \leq 0. \quad (13)$$

Figure 11C:
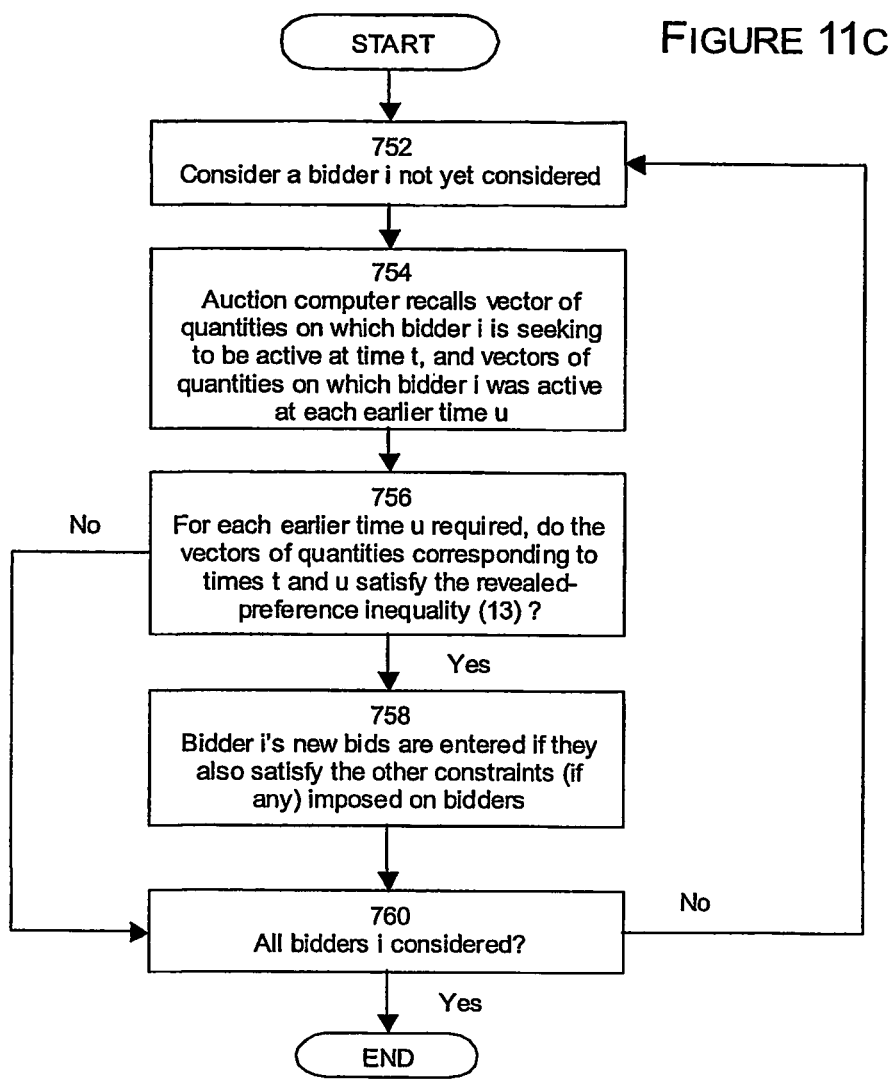

FIG. 11c is a flow diagram illustrating an exemplary process where bid submission is restricted by a revealed-preference-based constraint, in a dynamic auction in which bids are submitted only on independent items rather than on packages. Thus, FIG. 11c illustrates, in greater detail, a part of step 108 of FIG. 5a, step 130 of FIG. 5b or step 162 of FIG. 5c. The above descriptions of FIGS. 5a-c would require minor modification in order to describe dynamic auction in which bids are submitted only on independent items rather than on packages. For example, in FIG. 5a, step 106 would now have the description that bids comprise pairs, (ω, P), where ω∈Ω is an element of the set of all items being auctioned and P is a price at which the bidder is offering to transact for the item ω. Step 110 would now have the description that a computer (which may be the auction server or some other computer) calculates provisionally-winning bids simply by determining the highest bid that has been submitted for each item, ω, and the computer calculates provisional revenues by taking the sum of the provisionally-winning bids. Step 108 is described by FIG. 11c, whose flow is now described in detail.

The process starts with step 752, in which the auction computer considers a bidder i who has not previously been considered. It continues with step 754, in which the auction computer recalls $x_i^t$, the vector of quantities of the respective types of items on which the bidder is seeking to be active at time t, and $x_i^u$, the vector of quantities of the respective types of items on which the bidder was active for each prior time u at which provisional winners were determined. It next goes to step 756, in which the auction computer determines whether, for each earlier time u at which provisional winners were determined (and evaluated at the minimum acceptable bids on the various types of items at times u and t), $x_i^t$ and $x_i^u$ satisfy the revealed-preference inequality (13). In one preferred embodiment, the determining step of step 756 is only performed for a single earlier time, u=t−1. If the revealed-preference inequality is satisfied for each required earlier time u, the process continues to step 758, in which bidder i's new bids are entered if they also satisfy the other constraints (if any) imposed on bidders. After step 758, or if the revealed-preference inequality is not satisfied for some required earlier time u, the process goes to step 760. At step 760, it is determined if all bidders i have been considered. If not all bidders have been considered, then the process returns to step 752, in which the auction computer considers another bidder i who has not previously been considered. If all bidders have been considered, then the process ends.

Figure 11D:
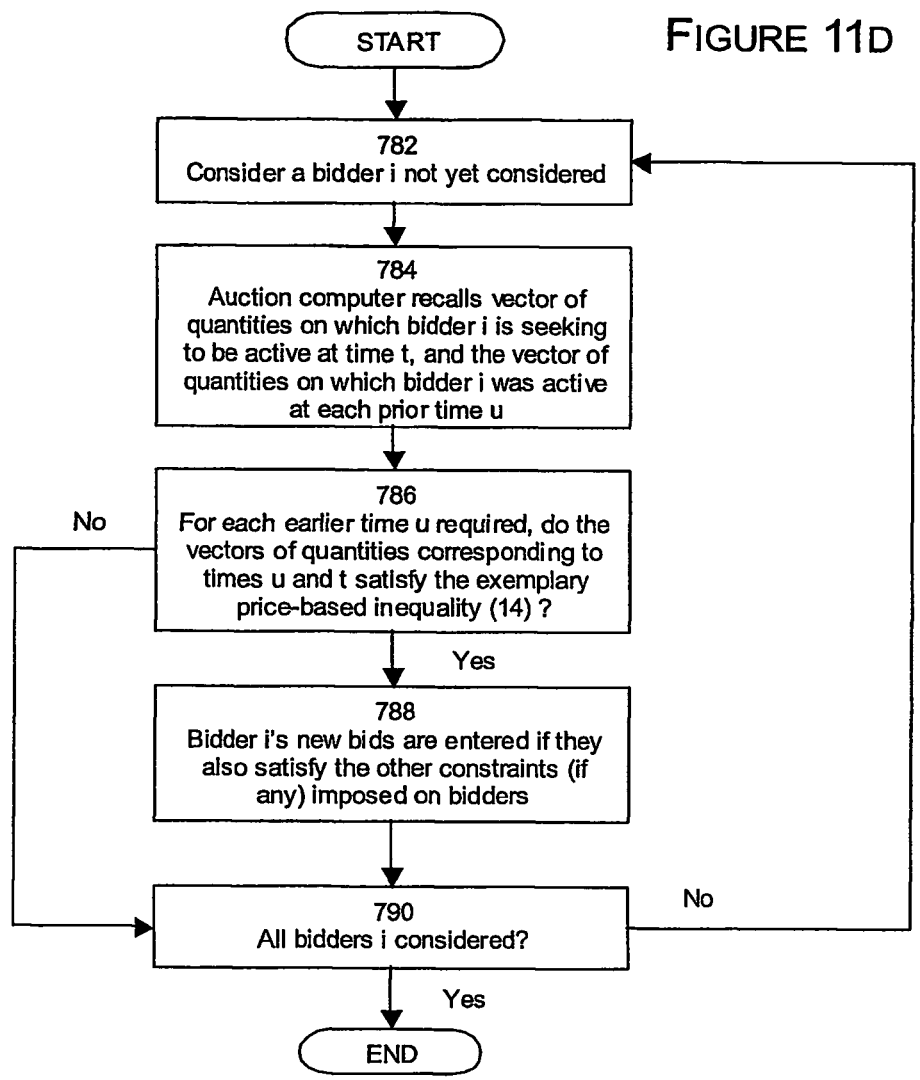

FIG. 11d is a flow diagram illustrating an exemplary process where bid submission is restricted by an exemplary price-based constraint, in a dynamic auction in which bids are submitted only on independent items rather than on packages. Thus, FIG. 11d illustrates, in greater detail, a part of step 108 of FIG. 5a, step 130 of FIG. 5b or step 162 of FIG. 5c. The above descriptions of FIGS. 5a-c would require minor modification in order to describe dynamic auction in which bids are submitted only on independent items rather than on packages. For example, in FIG. 5a, step 106 would now have the description that bids comprise pairs, ($\omega$, P), where $\omega \in \Omega$ is an element of the set of all items being auctioned and P is a price at which the bidder is offering to transact for the item $\omega$. Step 110 would now have the description that a computer (which may be the auction server or some other computer) calculates provisionally-winning bids simply by determining the highest bid that has been submitted for each item, $\omega$, and the computer calculates provisional revenues by taking the sum of the provisionally-winning bids. Step 108 is described by FIG. 11d, whose flow is now described in detail.

The process starts with step 782, in which the auction computer considers a bidder i who has not previously been considered. It continues with step 784, in which the auction computer recalls $x_i^t$, the vector of quantities of the respective types of items on which the bidder is seeking to be active at time t, and $x_i^u$, the vector of quantities of the respective types of items on which the bidder was active for each prior time u at which provisional winners were determined. It next goes to step 786, in which the auction computer determines whether the inequality, $p^t \cdot x_i^t \leq p^t \cdot x_i^u$, is satisfied for each prior time u at which provisional winners were determined. In one preferred embodiment, the determining step of step 786 is only performed for a single earlier time, u=t−1. If this inequality is satisfied, the process continues to step 788, in which bidder i's new bids are entered if they also satisfy the other constraints (if any) imposed on bidders. After step 788, or if the inequality is not satisfied, the process goes to step 790. At step 790, it is determined if all bidders i have been considered. If not all bidders have been considered, then the process returns to step 782, in which the auction computer considers another bidder i who has not previously been considered. If all bidders have been considered, then the process ends.

The price-based and revealed-preference-based constraints on bidders illustrated in FIGS. 11c and 11d can equally usefully be applied in dynamic clock auctions, where the auction system announces the current price vector and bidders respond with bids comprising quantity vectors. The process of FIG. 11c would merely need to be reinterpreted as follows. The process starts with step 752, in which the auction computer considers a bidder i who has not previously been considered. It continues with step 754, in which the auction computer recalls $x_i^t$, the vector of quantities expressed in bidder i's bid at time t, and $x_i^u$, the vector of quantities expressed in bidder i's bid for each prior time u. It next goes to step 756, in which the auction computer determines whether, for each earlier time u (and evaluated at the price announced by the auction system for the various types of items at times u and t), $x_i^t$ and $x_i^u$ satisfy the revealed-preference inequality (13). In one preferred embodiment, the determining step of step 756 is only performed for a single earlier time, u=t−1. If the revealed-preference inequality is satisfied for each required earlier time u, the process continues to step 758, in which bidder i's bid $x_i^t$ is entered if it also satisfies the other constraints (if any) imposed on bidders. After step 758, or if the revealed-preference inequality is not satisfied for some required earlier time u, the process goes to step 760. At step 760, it is determined if all bidders i have been considered. If not all bidders have been considered, then the process returns to step 752, in which the auction computer considers another bidder i who has not previously been considered. If all bidders have been considered, then the process ends.

The process of FIG. 11d would merely need to be reinterpreted as follows. The process starts with step 782, in which the auction computer considers a bidder i who has not previously been considered. It continues with step 784, in which the auction computer recalls $x_i^t$, the vector of quantities expressed in bidder i's bid at time t, and $x_i^u$, the vector of quantities expressed in bidder i's bid at each prior time u. It next goes to step 786, in which the auction computer determines whether, for each earlier time u (and evaluated at the price announced by the auction system for the various types of items at times u and t), $x_i^t$ and $x_i^u$ satisfy the inequality, $p^t \cdot x_i^t \leq p^t \cdot x_i^u$, for each earlier time u. In one preferred embodiment, the determining step of step 786 is only performed for a single earlier time, u=t−1. If this inequality is satisfied, the process continues to step 788, in which bidder i's bid $x_i^t$ is entered if it also satisfies the other constraints (if any) imposed on bidders. After step 788, or if the inequality is not satisfied, the process goes to step 790. At step 790, it is determined if all bidders i have been considered. If not all bidders have been considered, then the process returns to step 782, in which the auction computer considers another bidder i who has not previously been considered. If all bidders have been considered, then the process ends.

Auction-Like Optimization Problems and Machine-Generated Bids

In the course of this application, a method and apparatus for a dynamic auction with package bidding has been described. The method and apparatus which have been described allow users to participate in various auctions with a level of attention which varies from continuous, down to the input of information into a proxy agent on a single occasion. It should also be apparent that the required level of attention by the "auctioneer" may vary from continuous to essentially zero—aside from setting the rules for initiating the auction. Thus for all intents and purposes, once the basic auction description is selected and the users input desired information, the auction implemented by the invention can be essentially automatic, i.e., devoid of human interaction.

Because in the past auctions have generally been considered to be processes engaged in by persons, the feature of an automatic auction may be, by itself, considered relatively new. There are, however, many other automatic systems which interact in a way which is entirely analogous to an auction and to which the present invention could be applied. Hence, the present invention can be applied to improve the efficiency of computers which are used to operate the automatic systems, by economizing on the collection of informational inputs needed for the system and to speed the computational of optimal resource assignments. At the same time, many optimization problems encountered in the field of operations research have similar mathematical structures to the problem of determining the winners of an auction with package bidding. Hence, the present invention can be applied to improve the efficiency of computer systems which are used to solve the similar optimization problems, by enabling the computations to be implemented on a system with parallel processing or generally by speeding the computation of solutions.

For example, the air conditioning plant in an office building can allocate cool air among individual offices in the building via a dynamic auction. Periodically, the central computer of the air conditioning system serves the role of the "auction computer" in an auction, while computers interfaced with the thermostats in each suite of offices serve the role of "bidder computers." Each bidder computer is programmed to send back bids consisting of a desired quantity of cooled air based on: the current temperature reading of the thermostat, the desired temperature in the office, and the use (if any) to which the office is currently being put. In addition, it is desirable for the auction-like automatic system to allow package bidding, in the same way that it is desirable for a conventional auction system for geographically-defined spectrum licenses to allow package bidding. (Cooling an individual office requires less cooled air if the adjacent offices are also being cooled, just as the value of a New York-region spectrum license may be enhanced by owning a Washington-region spectrum license or a Boston-region spectrum license.) Based on the parameters to which it has been programmed, the central computer of the air conditioning system then provides the results of the auction in its allocation of cooled air among the bidding offices.

In another context, a communications, transportation or energy transmission network faces the technical problem of how to allocate its scarce network resources. The optimization problem in allocating its network resources (e.g., bandwidth, switches, etc.) has a very similar structure to the auction problem. Moreover, package bidding is again well suited to the problem, since a network provider attempting to connect point A to point B needs to utilize various networks links and switches in combination. Hence, the present invention can be usefully applied to improving the solution to this technical problem.

In another context, computational resources on a distributed computer system can be allocated via a dynamic auction. Whenever a new job requiring a given quantity of CPU time enters the system, an auction is conducted. Each member of the distributed computer system indicates the quantity of CPU time which it can make available at a given priority level or a given price. In this case, the "auctioneer computer" selects and allocates the resources to be applied to the new job in accordance with some programmed schedule and hence in this fashion provides the results of the auction.

The several examples described herein are exemplary of the invention, whose scope is not limited thereby but rather is indicated in the attached claims.

What is claimed is:

1. A computer system for determining an allocation of a plurality of items, including at least two types of items, to a plurality of bidders in an auction wherein bids are received at the system and an allocation of the items to the bidders is determined by the system based on the bids, comprising:
   means for receiving bids, wherein said means receives bids for plural items in an auction,
   means for processing the bids to determine an allocation of the items to the bidders, and
   means for imposing a price-based bidding constraint on a given bidder, said constraint limiting a bid that the given bidder is permitted to enter based on a relation among the bid and a prior bid by the same bidder and prices associated with at least two types of the items.

2. The system as recited in claim 1 wherein the means for imposing imposes a revealed-preference-based bidding constraint on the given bidder, wherein the revealed-preference-based bidding constraint limits the bid that the given bidder is permitted to enter based on whether the new bid satisfies a revealed-preference inequality.

3. The system as recited in claim 2 wherein the bids include package bids.

4. The system as recited in claim 2 wherein the means for receiving bids receives bids only on independent items.

5. A method implemented in a system, said system comprising a first computer and a plurality of other computers which are located remotely from the first computer, said plurality of other computers interconnected to the first computer by a communication system, said method for determining an allocation of a plurality of items, including at least two types of items in an auction to a plurality of bidders wherein bids are received and an allocation of the items to the bidders is determined by the computers based on the bids, comprising:
   receiving bids using the other computers and communicating the bids to the first computer, wherein bids are received for plural items in an auction,
   processing the bids using the first computer to determine an allocation of the items among the bidders, and
   imposing a price-based bidding constraint on a given bidder, said constraint limiting a bid that the given bidder is permitted to enter based on a relation among the bid and a prior bid by the same bidder and prices associated with at least two types of the items.

6. The method as recited in claim 5 wherein the imposing of the price-based bidding constraint on the given bidder includes imposing a revealed-preference-based bidding constraint on the given bidder, wherein the revealed-preference-based bidding constraint limits the bid that the given bidder is permitted to enter based on whether the new bid satisfies a revealed-preference inequality.

7. The method as recited in claim 6 wherein the bids include package bids.

8. The method as recited in claim 6 wherein only bids on independent items are received.

9. The computer system as recited in claim 1 which conducts a dynamic auction of a plurality of items wherein said means for receiving bids receives new bids from a bidder and wherein said means for imposing a price-based bidding constraint operates on new bids by determining, at a given time, whether said new bids should be processed by effecting a comparison between bids for items on which the bidder has bid at the given time and bids for items on which the bidder has bid at times earlier than the given time, wherein said comparison includes use of prices.

10. The computer system as recited in claim 9 wherein said means for imposing a price-based bidding constraint includes means for comparing a first and a second difference, where the first difference is a difference between a minimum price for first items at the given time and a minimum price for the first items at a particular time earlier than the given time, and where the second difference is a difference between a minimum price for second items at the given time and a minimum price for the second items at the particular time earlier than the given time, and wherein
   said means for imposing a price-based bidding constraint determines that new bids should be processed only if the first difference is at least as great as the second difference.

11. The computer system as recited in claim 10 wherein the first items comprise the items on which the bidder has bid at the particular time earlier than the given time, and the second items comprise the items on which the bidder has bid at the given time.

12. The computer system as recited in claim 10 wherein the first items comprise items on which the bidder has bid in combinations of bids at the particular time earlier than the given time, and wherein the second items comprise items on which the bidder has bid in combinations of bids at the given time.

13. The computer system as recited in claim 9 wherein the bids comprise package bids and the means for imposing a price-based bidding constraint includes:
   means for comparing a first and second difference, where the first difference is a difference between a minimum price for a first package of items at the given time and a minimum price for the first package at a particular time earlier than the given time, and where the second difference is a difference between a minimum price for a second package of items at the given time and a minimum price for the second package at the particular time earlier than the given time, and
   the means for imposing a price-based bidding constraint determines that the new bids should be processed only if the first difference is at least as great as the second difference.

14. The computer system as recited in claim 13 wherein the first package comprises a package on which the bidder has bid at the particular time earlier than the given time, and wherein the second package comprises a package on which the bidder has bid at the given time.

15. The computer system as recited in claim 9 wherein said means for imposing a price-based bidding constraint includes means for comparing a first and second difference, where the first difference is a difference between a price for first items at the given time and a price for the first items at a particular time earlier than the given time, and where the second difference is a difference between a price for second items at the given time and a price for the second items at the particular time earlier than the given time, and
   wherein said means for comparing determines that new bids should be processed only if the first difference is at least as great as the second difference.

16. The computer system as recited in claim 15 wherein the first items comprise the items on which the bidder has bid at the particular time earlier than the given time, and wherein the second items comprise the items on which the bidder has bid at the given time.

17. The computer system as recited in claim 15 wherein the first items comprise items on which the bidder has bid in combinations of bids at the particular time earlier than the given time, and wherein the second items comprise items on which the bidder has bid in combinations of bids at the given time.

18. The computer system as recited in claim 9 wherein the bids comprise package bids and the means for imposing a price-based bidding constraint includes:
   means for comparing a first and second difference, where the first difference is a difference between a price for a first package of items at the given time and a price for the first package at a particular time earlier than the given time, and where the second difference is a difference between a price for a second package of items at the given time and a price for the second package at the particular time earlier than the given time, and
   the means for imposing a price-based bidding constraint determines that new bids should be processed only if the first difference is at least as great as the second difference.

19. The computer system as recited in claim 18 wherein the first package comprises a package on which the bidder has bid at the particular time earlier than the given time, and wherein the second package comprises a package on which the bidder has bid at the given time.

20. The computer system as recited in claim 10 wherein the auction is carried out in sequential bidding opportunities and the means for comparing compares said first and second differences for each bidding opportunity prior to the entering of the new bid and the means for imposing a price-based bidding constraint determines the new bids should be processed only if the first difference is at least as great as the second difference for each comparison.

21. The computer implemented method as recited in claim 5 for conducting a dynamic auction of a plurality of items, wherein the receiving of bids includes receiving new bids and wherein imposing a price-based bidding constraint includes
   determining whether said new bids should be processed by effecting a comparison between bids for items on which the bidder has bid at the given time and bids for items on which the bidder has bid at times earlier than the given time, wherein said comparison includes use of prices.

22. The computer implemented method as recited in claim 21 wherein the comparison comprises:
   comparing a first and second difference, where the first difference is a difference between a minimum price for first items at the given time and a minimum price for the first items at a particular time earlier than the given time, and where the second difference is a difference between a minimum price for second items at the given time and a minimum price for the second items at the particular time earlier than the given time, and
   processing the new bids only if the first difference is at least as great as the second difference.

23. The computer implemented method as recited in claim 22 wherein the first items comprise the items on which the bidder has bid at the particular time earlier than the given time, and wherein the second items comprise the items on which the bidder has bid at the given time.

24. The computer implemented method as recited in claim 22 wherein the first items comprise items on which the bidder has bid in combinations of bids at the particular time earlier than the given time, and wherein the second items comprise items on which the bidder has bid in combinations of bids at the given time.

25. The computer implemented method as recited in claim 21 wherein the bids comprise package bids and the comparison comprises:
   comparing a first and second difference, where the first difference is a difference between a minimum price for a first package of items at the given time and a minimum price for the first package at a particular time earlier than the given time, and where the second difference is a difference between a minimum price for a second package of items at the given time and a minimum price for the second package at the particular time earlier than the given time, and
   processing the new bids only if the first difference is at least as great as the second difference.

26. The computer implemented method as recited in claim 25 wherein the first package comprises a package on which the bidder has bid at the particular time earlier than the given time, and wherein the second package comprises a package on which the bidder has bid at the given time.

27. The computer implemented method as recited in claim 21 wherein the comparison comprises:
   comparing a first and second difference, where the first difference is a difference between a price for first items at the given time and a price for the first items at a particular time earlier than the given time, and where the second difference is a difference between a price for second items at the given time and a price for the second items at the particular time earlier than the given time, and processing the new bids only if the first difference is at least as great as the second difference.

28. The computer implemented method as recited in claim 27 wherein the first items comprise the items on which the bidder has bid at the particular time earlier than the given time, and wherein the second items comprise the items on which the bidder has bid at the given time.

29. The computer implemented method as recited in claim 27 wherein the first items comprise items on which the bidder has bid in combinations of bids at the particular time earlier than the given time, and wherein the second items comprise items on which the bidder has bid in combinations of bids at the given time.

30. The computer implemented method as recited in claim 21 wherein the bids comprise package bids and the comparison comprises:

comparing a first and second difference, where the first difference is a difference between a price for a first package of items at the given time and a price for the first package at a particular time earlier than the given time, and where the second difference is a difference between a price for a second package of items at the given time and a price for the second package at the particular time earlier than the given time, and processing the new bids only if the first difference is at least as great as the second difference.

31. The computer implemented method as recited in claim 30 wherein the first package comprises a package on which the bidder has bid at the particular time earlier than the given time, and wherein the second package comprises a package on which the bidder has bid at the given time.

32. The computer implemented method as recited in claim 21 wherein the auction is carried out in sequential bidding opportunities and the comparing is implemented for each bidding opportunity prior to the entering of the new bids and the new bids are processed only if the first difference is at least as great as the second difference for each comparison.

33. A non-transitory computer readable medium storing a sequence of instructions which, when executed, implements a program for determining an allocation of a plurality of items, including at least two types of items, in an auction to a plurality of bidders wherein bids are received at a computer and an allocation of the items to the bidders is determined by the computer based on the bids, the program comprising:

receiving bids, wherein bids are received for plural items in an auction;

processing the bids to determine an allocation of the items among the bidders, and, imposing a price-based bidding constraint on a given bidder, said constraint limiting a bid that the given bidder is permitted to enter based on a relation among the bid and a prior bid by the same bidder and prices associated with at least two types of the items.

34. The computer readable medium as recited in claim 33 wherein the imposing of the price-based bidding constraint on the given bidder includes imposing a revealed-preference-based bidding constraint on the given bidder, wherein the revealed-preference-based bidding constraint limits the bid the given bidder is permitted to enter based on whether the new bid satisfies a revealed-preference inequality.

35. The computer readable medium as recited in claim 34 wherein the bids include package bids.

36. The computer readable medium as recited in claim 34 wherein only bids on independent items are received.

37. The computer readable medium as recited in claim 33 wherein the program implements a dynamic auction for a plurality of items in which new bids are received at a computer and wherein imposing a price-based bidding constraint includes determining whether said new bids should be processed by effecting a comparison between bids for items on which the bidder has bid at the given time and bids for items on which the bidder has bid at times earlier than the given time, wherein said comparison includes use of prices.

38. The computer readable medium as recited in claim 37 wherein the comparison comprises:

comparing a first and second difference, where the first difference is a difference between a minimum price for first items at the given time and a minimum price for the first items at a particular time earlier than the given time, and where the second difference is a difference between a minimum price for second items at the given time and a minimum price for the second items at the particular time earlier than the given time, and processing the new bids only if the first difference is at least as great as the second difference.

39. The computer readable medium as recited in claim 38 wherein the first items comprise the items on which the bidder has bid at the particular time earlier than the given time, and wherein the second items comprise the items on which the bidder has bid at the given time.

40. The computer readable medium as recited in claim 38 wherein the first items comprise items on which the bidder has bid in combinations of bids at the particular time earlier than the given time, and wherein the second items comprise items on which the bidder has bid in combinations of bids at the given time.

41. The computer readable medium as recited in claim 37 wherein the bids comprise package bids and the comparison comprises:

comparing a first and second difference, where the first difference is a difference between a minimum price for a first package of items at the given time and a minimum price for the first package at a particular time earlier than the given time, and where the second difference is a difference between a minimum price for a second package of items at the given time and a minimum price for the second package at the particular time earlier than the given time, and processing the new bids only if the first difference is at least as great as the second difference.

42. The computer readable medium as recited in claim 41 wherein the first package comprises a package on which the bidder has bid at the particular time earlier than the given time, and wherein the second package comprises a package on which the bidder has bid at the given time.

43. The computer readable medium as recited in claim 37 wherein the comparison comprises:

comparing a first and second difference, where the first difference is a difference between a price for first items at the given time and a price for the first items at a particular time earlier than the given time, and where the second difference is a difference between a price for second items at the given time and a price for the second items at the particular time earlier than the given time, and processing the new bids only if the first difference is at least as great as the second difference.

44. The computer readable medium as recited in claim 43 wherein the first items comprise the items on which the bidder has bid at the particular time earlier than the given time, and wherein the second items comprise the items on which the bidder has bid at the given time.

45. The computer readable medium as recited in claim 43 wherein the first items comprise items on which the bidder has bid in combinations of bids at the particular time earlier than the given time, and wherein the second items comprise items on which the bidder has bid in combinations of bids at the given time.

46. The computer readable medium as recited in claim 37 wherein the bids comprise package bids and the comparison comprises:
  comparing a first and second difference, where the first difference is a difference between a price for a first package of items at the given time and a price for the first package at a particular time earlier than the given time, and where the second difference is a difference between a price for a second package of items at the given time and a price for the second package at the particular time earlier than the given time, and
  processing the new bids only if the first difference is at least as great as the second difference.

47. The computer readable medium as recited in claim 46 wherein the first package comprises a package on which the bidder has bid at the particular time earlier than the given time, and wherein the second package comprises a package on which the bidder has bid at the given time.

48. The computer readable medium as recited in claim 37 wherein the auction is carried out in sequential bidding opportunities and the comparing is implemented for each bidding opportunity prior to the entering of the new bids and the new bids are processed only if the first difference is at least as great as the second difference for each comparison.

49. The system as recited in claim 1 wherein the bids include package bids.

50. The method as recited in claim 5 wherein the bids include package bids.

51. The computer readable medium as recited in claim 33 wherein said bids include package bids.

52. The system as recited in claim 1 wherein the auction is a dynamic clock auction.

53. The system as recited in claim 2 wherein the auction is a dynamic clock auction.

54. The system as recited in claim 1 wherein the auction is a simultaneous ascending auction or a simultaneous descending auction.

55. The system as recited in claim 2 wherein the auction is a simultaneous ascending auction or a simultaneous descending auction.

56. The method as recited in claim 5 wherein the auction is a dynamic clock auction.

57. The method as recited in claim 6 wherein the auction is a dynamic clock auction.

58. The method as recited in claim 5 wherein the auction is a simultaneous ascending auction or a simultaneous descending auction.

59. The method as recited in claim 6 wherein the auction is a simultaneous ascending auction or a simultaneous descending auction.

60. The computer readable medium as recited in claim 33 wherein the auction is a dynamic clock auction.

61. The computer readable medium as recited in claim 34 wherein the auction is a dynamic clock auction.

62. The computer readable medium as recited in claim 33 wherein the auction is a simultaneous ascending auction or a simultaneous descending auction.

63. The computer readable medium as recited in claim 34 wherein the auction is a simultaneous ascending auction or a simultaneous descending auction.

\* \* \* \* \*